(12) United States Patent
Maeda et al.

(10) Patent No.: US 9,166,972 B2
(45) Date of Patent: Oct. 20, 2015

(54) SHARED INFORMATION DISTRIBUTING DEVICE, HOLDING DEVICE, CERTIFICATE AUTHORITY DEVICE, AND SYSTEM

(71) Applicant: Panasonic Corporation, Osaka (JP)

(72) Inventors: Manabu Maeda, Osaka (JP); Masao Nonaka, Osaka (JP); Yuichi Futa, Ishikawa (JP); Kaoru Yokota, Hyogo (JP); Natsume Matsuzaki, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP); Masaki Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/553,084

(22) Filed: Nov. 25, 2014

(65) Prior Publication Data

US 2015/0121079 A1 Apr. 30, 2015

Related U.S. Application Data

(62) Division of application No. 12/526,668, filed as application No. PCT/JP2008/051530 on Jan. 31, 2008, now Pat. No. 8,930,660.

(30) Foreign Application Priority Data

Feb. 16, 2007 (JP) ................................. 2007-036375

(51) Int. Cl.
*H04L 29/06* (2006.01)
*H04L 9/08* (2006.01)

(52) U.S. Cl.
CPC ............ *H04L 63/0823* (2013.01); *H04L 9/085* (2013.01); *H04L 9/0891* (2013.01)

(58) Field of Classification Search
CPC ... G06F 11/1092; H04L 9/085; H04L 9/0891; H04L 63/0823
See application file for complete search history.

(56) References Cited

U.S. PATENT DOCUMENTS

| 5,625,692 A | 4/1997 | Herzberg et al. |
| 6,269,453 B1 * | 7/2001 | Krantz .......................... 714/6.22 |

(Continued)

FOREIGN PATENT DOCUMENTS

| JP | 8-251157 | 9/1996 |
| JP | 10-215245 | 8/1998 |

(Continued)

OTHER PUBLICATIONS

Japanese Office Action issued Dec. 11, 2012 in Japanese Patent Application No. 2008-558035.

(Continued)

*Primary Examiner* — Kalpit Parikh
(74) *Attorney, Agent, or Firm* — Wenderoth, Lind & Ponack, L.L.P.

(57) ABSTRACT

A distributing device for generating private information correctly even if shared information is destroyed or tampered with. A shared information distributing device for use in a system for managing private information by a secret sharing method, including: segmenting unit that segments private information into a first through an $n^{th}$ pieces of shared information; first distribution unit that distributes the n pieces of shared information to n holding devices on a one-to-one basis; and second distribution unit that distributes the n pieces of shared information to the n holding devices so that each holding device holds an $i^{th}$ piece of shared information distributed by the first distribution unit, as well as a pieces of shared information being different from the $i^{th}$ piece of shared information in ordinal position among n pieces of shared information, "i" being an integer in a range from 1 to n.

9 Claims, 41 Drawing Sheets

(56) References Cited

U.S. PATENT DOCUMENTS

| | | | |
|---|---|---|---|
| 6,810,122 | B1 | 10/2004 | Miyazaki et al. |
| 6,957,349 | B1 | 10/2005 | Yasukura |
| 7,188,212 | B2 | 3/2007 | Hajji |
| 7,617,370 | B2 | 11/2009 | Jernigan et al. |
| 2005/0251619 | A1 | 11/2005 | Hajji |
| 2006/0110250 | A1 | 5/2006 | Takemoto |

FOREIGN PATENT DOCUMENTS

| | | |
|---|---|---|
| JP | 2001-34164 | 2/2001 |
| JP | 2002-135247 | 5/2002 |
| JP | 2004-48479 | 2/2004 |
| JP | 2004-336702 | 11/2004 |
| WO | 00/45358 | 8/2000 |
| WO | 2005/109167 | 11/2005 |

OTHER PUBLICATIONS

Mitsuru Ito et al., "Secret Sharing Scheme Realizing General Access Structure" Submission dated Jan. 13, 1988, The Transactions of the Institute of Electronics, Information and Communication Engineers A, vol. J 71-A, No. 8, pp. 1594-1596, Aug. 1988, together with verified English translation thereof.

Wakaha Ogata et al., "Network System and Cryptogram: Crisis Control in Information Society Secret Sharing Scheme", Computer Today, vol. 15, No. 4, pp. 20-22, 1998, together with verified English translation.

ITU-T Recommendation X.509 (1997 E): Information Technology Open Systems Interconnection—The Directory: Authentication Framework, 1997.

Tatsuaki Okamoto, "Generic Conversions for constructing IND-CCA2 public-key encryption in the random oracle model", [online], The 5$^{th}$ Workshop on Elliptical Curve Cryptography (ECC 2001).

Dan Boneh et al., "Efficient Generation of Shared RSA Keys", Journal of the ACM, vol. 48, No. 4, pp. 702-722, Jul. 2001.

International Search Report issued Apr. 15, 2008 in the International (PCT) Application PCT/JP2008/051530.

Ito, M. et al., *Ippanteki na Access Kozo o Jitsugen suru Himitsu Kyoyuho*, The Transactions of the Institute of Electronics, Information and Communication Engineers A, vol. J71-A, No. 8 (1988), pp. 1592-1598.

Ogata, W. et al., Network System to Ango: Denshika Shakai no Kiki Kanri Himitsu Bunsan Kyoyuho, *Computer Today*, vol. 15, No. 4 (1998), pp. 18-23.

Zhou, L. et al., Securing Ad Hoc Networks, *IEEE Network Magazine*, vol. 13, No. 6 (Nov./Dec. 1999), pp. 24-30.

\* cited by examiner

FIG. 4

| Own device ID | 1st other device ID | 2nd other device ID |
|---|---|---|
| ID_1 (Shared info holding device 121) | ID_2 (Shared info holding device 122) | ID_6 (Shared info holding device 126) |
| ID_2 (Shared info holding device 122) | ID_3 (Shared info holding device 123) | ID_1 (Shared info holding device 121) |
| ID_3 (Shared info holding device 123) | ID_4 (Shared info holding device 124) | ID_2 (Shared info holding device 122) |
| ID_4 (Shared info holding device 124) | ID_5 (Shared info holding device 125) | ID_3 (Shared info holding device 123) |
| ID_5 (Shared info holding device 125) | ID_6 (Shared info holding device 126) | ID_4 (Shared info holding device 124) |
| ID_6 (Shared info holding device 126) | ID_1 (Shared info holding device 121) | ID_5 (Shared info holding device 125) |

| Number | Device ID |
|---|---|
| 1 | ID_1<br>(Shared info holding device 121) |
| 2 | ID_2<br>(Shared info holding device 122) |
| 3 | ID_3<br>(Shared info holding device 123) |
| 4 | ID_4<br>(Shared info holding device 124) |
| 5 | ID_5<br>(Shared info holding device 125) |
| 6 | ID_6<br>(Shared info holding device 126) |

FIG. 22
1st update process during withdrawal process
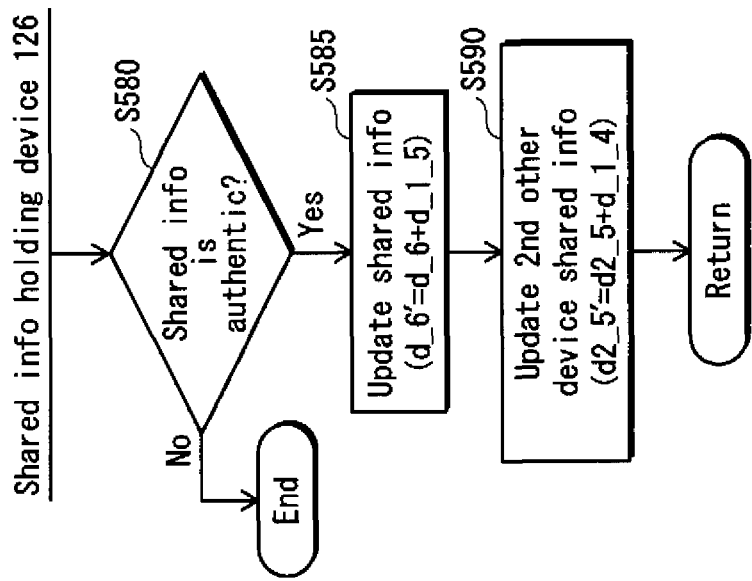
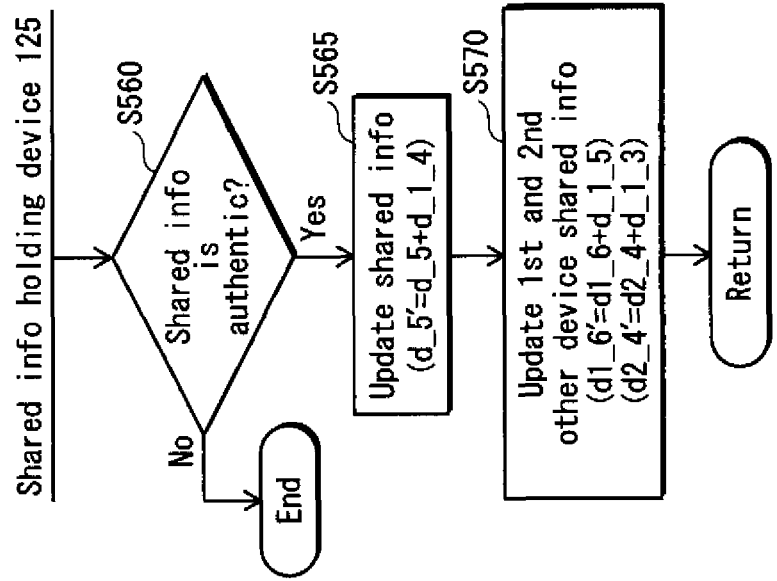

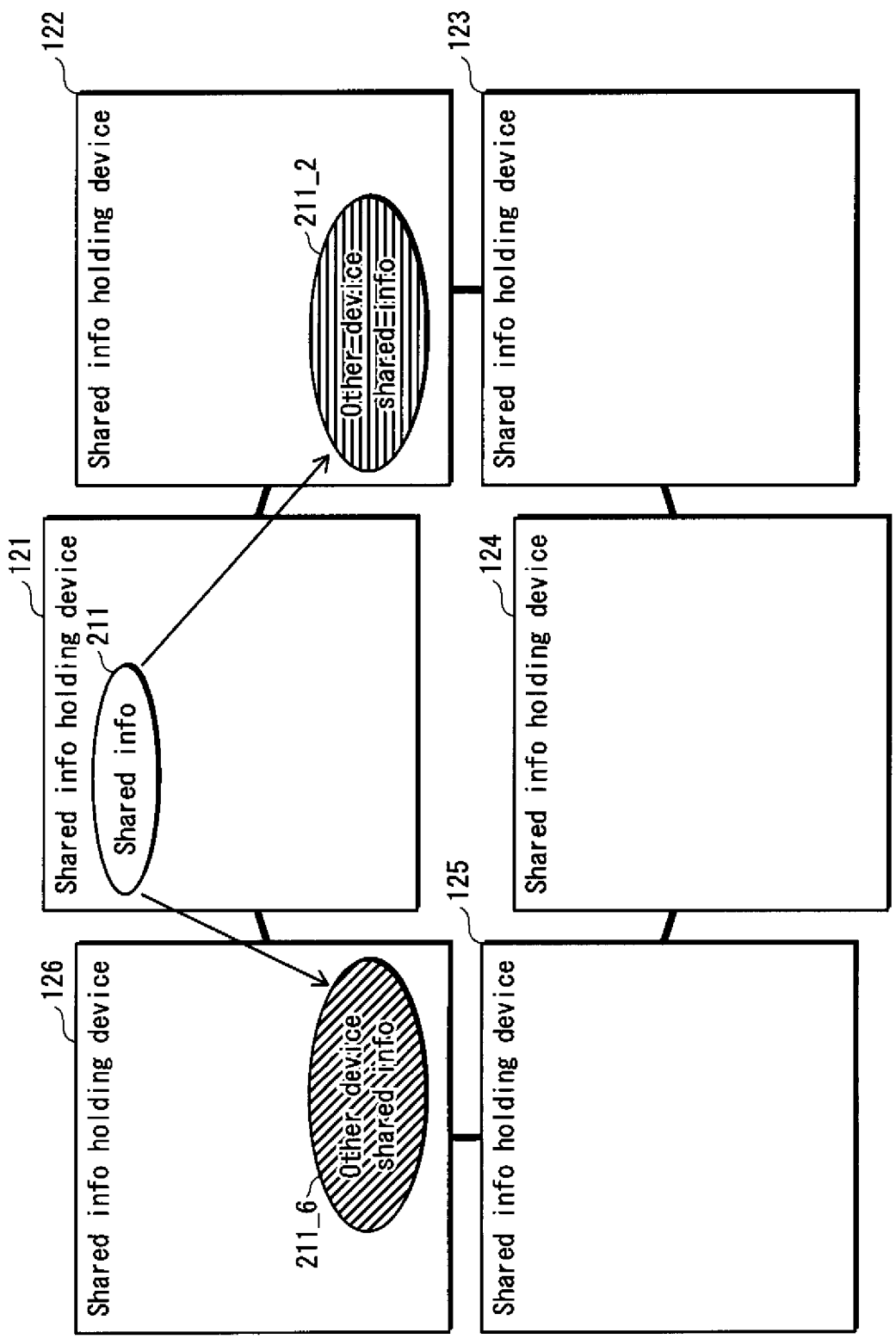

SHARED INFORMATION DISTRIBUTING DEVICE, HOLDING DEVICE, CERTIFICATE AUTHORITY DEVICE, AND SYSTEM

TECHNICAL FIELD

The present invention relates to distribution and management of a plurality of pieces of information generated by segmentation of private information that is important information such as a private key, and to a technology for restoring the original private information by using the plurality of pieces of information.

BACKGROUND ART

In recent years, electronic commerce such as the net banking and the online shopping has been widely used in the Internet. In such electronic commerce, the public key based technology is used to prevent the transactions from being tampered with.

The public key based technology prevents transactions from being tampered with by the structure where an authority called certificate authority issues a certificate (public key certificate) of a public key complying with the public key encryption, to online shopping sites and the like, and the users of the sites use the issued public key certificate. More specifically, the public key based technology prevents spoofing of a site by verifying whether or not the public key certificate has been issued from a reliable certificate authority, and prevents transactions from being tampered with by constructing an encryption transmission path by using the public key. For example, Patent Document 1 identified below discloses an authentication system in which a plurality of devices confirm the reliability thereof with each other by tracing the reliability relationship tree structure.

In such an authentication system, it is necessary to secretly manage a private key corresponding to the public key to prevent the private key from leaking to a malicious third party. This is because if the private key is known to a malicious third party, the malicious third party may spoof the certificate authority and use the private key in an unauthentic manner.

One of technologies for preventing the private key from leaking is managing the private keys by the secret sharing method (Non-Patent Document 1).

According to the secret sharing method, important private information S such as a private key is held in the state of a k pieces of shared information generated from the private information S, where "k" is an integer of 2 or higher. In this case, the original private information S is generated by using the k pieces of shared information. Each piece of shared information is assigned to a different holding device and held by the assigned holding device.

With this structure, even if a piece of shared information is leaked, the private information S is not known. This makes it possible to manage the private information S safely.

Patent Document 1: Japanese Patent Application Publication No. 10-215245

Non-Patent Document 1: Tatsuaki Okamoto and Hirosuke Yamamoto, "*Gendai Angou (Modern Encryption)*", Sangyo Tosho Publishing Co., Ltd., 1997

Non-Patent Document 2: *ITU-T Recommendation X.509 (1997 E): Information Technology—Open Systems Interconnection—The Directory: Authentication Framework*, 1997

Non-Patent Document 3: I. Blake, G. Seroussi and N. Smart, "*Elliptic Curves in Cryptography*", CAMBRIDGE UNIVERSITY PRESS, 1999

Non-Patent Document 4: Tatsuaki Okamoto, "*Generic conversions for constructing IND-CCA2 public-key encryption in the random oracle model*", [online], The 5th Workshop on Elliptic Curve Cryptography (ECC2001), Oct. 30, 2001, [searched on Feb. 15, 2007], Internet <URL: http://www.cacr.math.uwaterloo.ca/conferences/2001/ecc/okamoto.ppt>

Non-Patent Document 5: D. Boneh, M. Franklin, "*Efficient Generation of Shared RSA Keys*", Journal of the ACM, Vol. 48, No. 4, pp. 702-722

DISCLOSURE OF THE INVENTION

The Problems the Invention is Going to Solve

However, according to the secret sharing method, if a piece of shared information is destroyed or tampered with, the original private information S cannot be generated even if all the pieces of shared information are collected.

In view of the above-mentioned problem, it is an object of the present invention to provide a shared information distributing device, holding device, certificate authority device, and system that can generate the private information correctly even if shared information is destroyed or tampered with.

Means to Solve the Problems

The above-stated object is fulfilled by a shared information distributing device for use in a system for managing private information by a secret sharing method, the shared information distributing device comprising: a segmenting unit operable to segment a piece of private information into a first through an $n^{th}$ pieces of shared information; a first distribution unit operable to distribute the first through the $n^{th}$ pieces of shared information to n holding devices on a one-to-one basis; and a second distribution unit operable to distribute the first through the $n^{th}$ pieces of shared information to the n holding devices so that each holding device holds an $i^{th}$ piece of shared information distributed by the first distribution unit, as well as a pieces of shared information being different from the $i^{th}$ piece of shared information in ordinal position among n pieces of shared information, "i" being an integer in a range from 1 to n.

Effects of the Invention

With the above-described structure, the shared information distributing device assigns the first through the $n^{th}$ pieces of shared information respectively to the n holding devices, and distributes a pieces of shared information being different from the $i^{th}$ piece of shared information in ordinal position among n pieces of shared information, to each of the holding devices. This enables each holding device to hold one or more pieces of shared information which were distributed to other devices. This increases the redundancy of a same piece of shared information held by a plurality of holding devices, increasing the possibility of dealing with a case where the shared information held by any holding device was tampered with, destroyed, or made unusable.

In the above-stated shared information distributing device, the n holding devices have been associated with n nodes that have been virtually arranged to form one or more closed paths, and the second distribution unit distributes the first through the $n^{th}$ pieces of shared information to all the n holding devices so that at least the $i^{th}$ piece of shared information is distributed to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device to which the $i^{th}$ piece of shared information is distributed by the first distribution unit.

With the above-described structure, at least the $i^{th}$ piece of shared information is distributed to an $(i-1)^{th}$ and an $(i+1)^{th}$ holding devices which are adjacent, in a same closed path, to the $i^{th}$ holding device to which the $i^{th}$ piece of shared information is distributed. In handling, for example, a case where the $i^{th}$ piece of shared information held by the $i^{th}$ holding device was tampered with, other holding devices holding the $i^{th}$ piece of shared information can be determined easily.

In the above-stated shared information distributing device, the piece of private information may be obtained by adding up, by a predetermined method, all of the first through the $n^{th}$ pieces of shared information.

With the above-described structure, the piece of private information can be obtained by adding up the first through the $n^{th}$ pieces of shared information assigned to all holding devices.

The above-stated object is also fulfilled by a holding device being an $i^{th}$ holding device among n holding devices to which n pieces of shared information, a first through an $n^{th}$ pieces of shared information, have been assigned on a one-to-one basis, an $i^{th}$ piece of shared information having been assigned to the $i^{th}$ holding device, the n pieces of shared information having been generated by segmentation of one piece of private information, "i" being an integer in a range from 1 to n, the $i^{th}$ holding device comprising: a storage unit; a first writing unit operable to obtain the $i^{th}$ piece of shared information having been assigned to the $i^{th}$ holding device, and write the $i^{th}$ piece of shared information into the storage unit; an obtaining unit operable to obtain one or more pieces of shared information having been assigned to one or more holding devices that are different from the $i^{th}$ holding device, the one or more pieces of shared information being different from the $i^{th}$ piece of shared information in ordinal position among the n pieces of shared information; and a second writing unit operable to write the obtained one or more pieces of shared information into the storage unit.

With the above-described structure, the $i^{th}$ holding device can hold one or more pieces of shared information being different from the $i^{th}$ piece of shared information that have been assigned to one or more holding devices that are different from the $i^{th}$ holding device, as well as the $i^{th}$ piece of shared information having been assigned to the $i^{th}$ holding device itself. This increases the redundancy of a same piece of shared information held by a plurality of holding devices, increasing the possibility of dealing with a case where the shared information held by any holding device was tampered with or the like.

In the above-stated holding device, a first through an $n^{th}$ holding devices may have been associated with n nodes that have been virtually arranged to form one or more closed paths, and the obtaining unit may obtain an $(i-1)^{th}$ and an $(i+1)^{th}$ pieces of shared information having been assigned to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device.

With the above-described structure, in handling, for example, a case where the $i^{th}$ piece of shared information held by the $i^{th}$ holding device was tampered with, other holding devices holding the same $i^{th}$ piece of shared information can be determined easily.

In the above-stated holding device, either the $(i-1)^{th}$ or the $(i+1)^{th}$ holding device may be a withdrawal-target holding device that is to withdraw from a group composed of the first through the $n^{th}$ holding devices, and the $i^{th}$ holding device further comprises: a receiving unit operable to receive a segmentation instruction; a reading unit operable to, after the receiving unit receives the segmentation instruction, readout either the $(i-1)^{th}$ or the $(i+1)^{th}$ piece of shared information assigned to the withdrawal-target holding device from the storage unit; a shared information segmenting unit operable to segment the read-out $(i-1)^{th}$ or $(i+1)^{th}$ piece of shared information into $(n-1)$ pieces of partial shared information; and an output unit operable to output the $(n-1)$ pieces of partial shared information to $(n-2)$ holding devices, which are remaining holding devices after the $i^{th}$ holding device and the withdrawal target holding device are excluded, such that a plurality of pieces of partial shared information are assigned to a plurality of pieces of shared information held by the $(n-2)$ holding devices that are arranged at same ordinal positions as the plurality of pieces of partial shared information.

In the above-described structure, it is presumed that a withdrawal-target holding device is to withdraw from a group composed of the first through the $n^{th}$ holding devices. The $i^{th}$ holding device is associated with a node adjacent to a node that is associated with the withdrawal-target holding device. With this structure, $(n-1)$ pieces of partial shared information are generated from the piece of shared information assigned to the withdrawal-target holding device, and the generated $(n-1)$ pieces of partial shared information are output to holding devices that hold shared information corresponding to the shared information, among other $(n-2)$ holding devices excluding the holding device itself and the withdrawal-target holding device. This makes each holding device hold partial shared information generated from the piece of shared information assigned to the withdrawal-target holding device. Therefore, even after the withdrawal-target holding device withdraws from the group, the original private information can be restored from the shared information and partial shared information held by all the holding devices excluding the withdrawal-target holding device.

In the above-stated holding device, the read-out $(i-1)^{th}$ piece of shared information may be obtained by adding up, by a predetermined method, all pieces of partial shared information having been obtained by the shared information segmenting unit.

With the above-described structure, the private information can be obtained by adding up all of the generated pieces of partial shared information and all the other pieces of shared information.

In the above-stated holding device, a $p^{th}$ holding device, which is other than the $(i-1)^{th}$ through the $(i+1)^{th}$ holding devices, may be a withdrawal-target holding device that is to withdraw from a group composed of the first through the $n^{th}$ holding devices, and the $i^{th}$ holding device further comprises: a receiving unit operable to receive a plurality of pieces of partial shared information that are respectively to be assigned to the $(i-1)^{th}$ through the $(i+1)^{th}$ pieces of shared information, from holding devices associated with nodes that are adjacent to a node associated with the withdrawal-target holding device; and a calculating unit operable to add the received pieces of partial shared information and a plurality of pieces of shared information corresponding to the received pieces of partial shared information among the $(i-1)^{th}$ through the $(i+1)^{th}$ pieces of shared information stored in the storage unit, wherein the received pieces of partial shared information have been generated by segmentation of a $p^{th}$ piece of shared information having been assigned to the withdrawal-target holding device.

In the above-described structure, it is presumed that a withdrawal-target holding device is to withdraw from a group composed of the n holding devices. The $i^{th}$ holding device is not the holding device that is associated with a node adjacent to a node that is associated with the withdrawal-target holding device. With this structure, the $i^{th}$ holding device receives one or more pieces of partial shared information from the holding device that is associated with the node adjacent to the node that is associated with the withdrawal-target holding device. The received one or more pieces of partial shared information have been generated from the $p^{th}$ piece of shared information assigned to the withdrawal-target holding device. The $i^{th}$ holding device adds the received pieces of partial shared information and a plurality of pieces of shared information corresponding to the received pieces of partial shared information among the $(i-1)^{th}$ through the $(i+1)^{th}$ pieces of shared information stored in the storage unit. Accordingly, the $i^{th}$ holding device holds the partial shared information having been generated from the $p^{th}$ piece of shared information assigned to the withdrawal-target holding device. Therefore, even after the withdrawal-target holding device withdraws from the group, the original private information can be restored from the shared information and partial shared information held by all the holding devices excluding the withdrawal-target holding device.

In the above-stated holding device, the $p^{th}$ piece of shared information may be obtained by adding up, by a predetermined method, all pieces of partial shared information obtained by the segmentation.

With the above-described structure, the private information can be obtained by adding up all of the generated pieces of partial shared information and all the other pieces of shared information.

In the above-stated holding device, a node is to be newly added adjacent to the $i^{th}$ node associated with the $i^{th}$ holding device in the same closed path, and an additional holding device is to be associated with the newly added node, and the $i^{th}$ holding device further comprises: a receiving unit operable to receive a notification that the additional holding device is to be added; a reading unit operable to, after the receiving unit receives the notification, read out an $i^{th}$ piece of shared information having been assigned to the $i^{th}$ holding device from the storage unit; a generating unit operable to generate additional partial information; a calculating unit operable to perform a calculation onto the read-out $i^{th}$ piece of shared information by using the generated additional partial information, and write a result of the calculation into the storage unit as a new $i^{th}$ piece of shared information to replace the read-out $i^{th}$ piece of shared information; and an output unit operable to output the generated additional partial information to the additional holding device.

In the above-described structure, it is presumed that an additional holding device is to be added to a group composed of the first through the $n^{th}$ holding devices. The $i^{th}$ holding device is associated with a node adjacent to a node that is associated with the additional holding device. With this structure, the additional partial information is generated, and the generated additional partial information is output to the additional holding device. The additional holding device receives and holds the additional holding device. Also, the $i^{th}$ holding device performs a calculation onto the read-out $i^{th}$ piece of shared information by using the generated additional partial information, and writes a result of the calculation into the storage unit as a new $i^{th}$ piece of shared information to replace the read-out $i^{th}$ piece of shared information. Therefore, even after the additional holding device is added to the group, the original private information can be restored from the shared information held by all the holding devices including the additional holding device.

In the above-stated holding device, the calculating unit may obtain the result of the calculation by subtracting the additional partial information from the read-out $i^{th}$ piece of shared information by a predetermined method.

With the above-described structure, the private information can be obtained by adding up all of the generated pieces of additional partial information and all the other pieces of shared information.

In the above-stated holding device, in the $i^{th}$ holding device, the output unit may further output the generated additional partial information to one or more other holding devices that hold the piece of shared information having been assigned to the $i^{th}$ holding device.

With the above-described structure, the generated additional partial information is output to one or more other holding devices that hold the $i^{th}$ piece of shared information having been assigned to the $i^{th}$ holding device. This makes it possible to maintain the redundancy of a same piece of shared information held by a plurality of holding devices.

In the above-stated holding device, the receiving unit may further receive second additional partial information from the $(i-1)^{th}$ or the $(i+1)^{th}$ holding device, the $(i-1)^{th}$ and the $(i+1)^{th}$ holding devices having been respectively associated with the $(i-1)^{th}$ and the $(i+1)^{th}$ nodes that are adjacent to the newly added node, and the calculating unit further generates additional shared information to be assigned to the additional holding device by performing a calculation onto the additional partial information generated by the generating unit and the second additional partial information received by the receiving unit, and writes the generated additional shared information into the storage unit as shared information assigned to the additional holding device to replace the $(i-1)^{th}$ or the $(i+1)^{th}$ piece of shared information, the $(i-1)^{th}$ and the $(i+1)^{th}$ pieces of shared information having been respectively assigned to the $(i-1)^{th}$ and the $(i+1)^{th}$ holding devices which have been associated with the $(i-1)^{th}$ and the $(i+1)^{th}$ nodes that are adjacent to the $i^{th}$ node associated with the $i^{th}$ holding device before the addition of the additional holding device.

With the above-described structure, the holding device can hold the same piece of shared information as the piece of shared information assigned to the additional holding device.

In the above-stated holding device, the calculating unit may obtain the additional shared information by adding the additional partial information and the second partial information by a predetermined method.

With the above-described structure, the private information can be obtained by adding up all of the generated pieces of additional partial information, the second partial information, and all the other pieces of shared information.

In the above-stated holding device, the reading unit may further read out a new $i^{th}$ piece of shared information having been newly assigned to the $i^{th}$ holding device from the storage unit; the calculating unit further segments the read-out new $i^{th}$ piece of shared information into (n+1) pieces of partial shared information, the output unit further outputs, in accordance with a predetermined assignment rule, the (n+1) pieces of partial shared information to other holding devices being holding devices that remain after excluding the $i^{th}$ holding device from (n+1) holding devices that include the additional holding device, and the predetermined assignment rule is that a plurality of pieces of partial shared information should be assigned on a one-to-one basis to a plurality of pieces of shared information held by the other holding devices except for the $i^{th}$ piece of shared information, and all of the plurality of pieces of partial shared information should be assigned to the $i^{th}$ piece of shared information.

In the above-described structure, it is presumed that a piece of shared information is to be newly added and stored. With this structure, (n+1) pieces of partial shared information are generated from the new $i^{th}$ piece of shared information, and the generated pieces of partial shared information are output to each holding device. This makes it possible for each holding device to further update the shared information it holds by using the partial shared information. This ensures that the private information can be restored by using the shared information held by all the holding devices, while increasing the randomness of the shared information held by each holding device.

In the above-stated holding device, a node is to be newly added adjacent to the $(i-1)^{th}$ or the $(i+1)^{th}$ node in the same closed path, the $(i-1)^{th}$ and the $(i+1)^{th}$ nodes being adjacent to the $i^{th}$ node associated with the $i^{th}$ holding device, and an additional holding device is to be associated with the newly added node, and the $i^{th}$ holding device may further comprise: a receiving unit operable to receive additional partial information from the $(i-1)^{th}$ or the $(i+1)^{th}$ holding device that is associated with the $(i-1)^{th}$ or the $(i+1)^{th}$ that is adjacent to the newly added node; a reading unit operable to read out, from the storage unit, the $(i-1)^{th}$ or the $(i+1)^{th}$ piece of shared information assigned to the $(i-1)^{th}$ or the $(i+1)^{th}$ holding device from which the additional partial information was received; and a calculating unit operable to perform a calculation onto the read-out $(i-1)^{th}$ or $(i+1)^{th}$ piece of shared information by using the received additional partial information, and write a result of the calculation into the storage unit as a new $(i-1)^{th}$ or $(i+1)^{th}$ piece of shared information assigned to the $(i-1)^{th}$ or the $(i+1)^{th}$ holding device, to replace the read-out $(i-1)^{th}$ or $(i+1)^{th}$ piece of shared information.

In the above-described structure, it is presumed that an additional holding device is to be added to a group composed of the first through the $n^{th}$ holding devices. A node is newly added adjacent to the node that is adjacent to the node that is associated with the $i^{th}$ holding device, and the new node is associated with the additional holding device. The $i^{th}$ holding device performs a calculation onto the $(i-1)^{th}$ or $(i+1)^{th}$ piece of shared information read out from the storage unit, by using the additional partial information received from the $(i-1)^{th}$ or the $(i+1)^{th}$ holding device, and writes a result of the calculation into the storage unit as a new $(i-1)^{th\ or\ (i+1)^{th}}$ piece of shared information assigned to the $(i-1)^{th}$ or the $(i+1)^{th}$ holding device, to replace the read-out $(i-1)^{th}$ or $(i+1)^{th}$ piece of shared information. Therefore, even after the additional holding device is added to the group, the original private information can be restored from the shared information held by all the holding devices including the additional holding device.

In the above-stated holding device, the receiving unit may further receive, from an adjacent holding device that is a holding device associated with a node adjacent to the newly added node, one or more pieces of partial shared information that are to be assigned to the $(i-1)^{th}$ through the $(i+1)^{th}$ pieces of shared information stored in the storage unit, and the calculating unit further performs a calculation onto the $(i-1)^{th}$ through the $(i+1)^{th}$ pieces of shared information stored in the storage unit by using the received one or more pieces of partial shared information, and writes a result of the calculation into the storage unit as new $(i-1)^{th}$ through $(i+1)^{th}$ pieces of shared information, wherein the received one or more pieces of partial shared information have been generated by segmentation of a piece of shared information having been assigned to the adjacent holding device.

In the above-described structure, it is presumed that, when a piece of shared information is newly assigned, (n+1) pieces of partial shared information are generated from the new piece of shared information, and the generated partial shared information are received. The $i^{th}$ holding device performs a calculation onto the $(i-1)^{th}$ through the $(i+1)^{th}$ pieces of shared information stored in the storage unit by using the received one or more pieces of partial shared information, and writes a result of the calculation into the storage unit as new $(i-1)^{th}$ through $(i+1)^{th}$ pieces of shared information. This makes it possible to further update the shared information held by the holding device. This ensures that the private information can be restored by using the shared information held by all the holding devices, while increasing the randomness of the shared information held by each holding device.

The above-stated object is fulfilled by a holding device to be newly added to a group composed of a first through an $n^{th}$ holding devices which respectively hold a first through an $n^{th}$ pieces of shared information, the holding device comprising: a receiving unit operable to receive a piece of additional partial information from each of at least two existing holding devices; a generating unit operable to generate a piece of shared information to be assigned to the holding device itself, by using all pieces of additional partial information received by the receiving unit; and a storage unit operable to store the generated piece of shared information.

In the above-described structure, it is presumed that an additional holding device is to be added to a group composed of the first through the $n^{th}$ holding devices. The holding device is the additional holding device, and a node associated with the additional holding device is adjacent to nodes associated with at least two existing holding devices. With this structure, the additional holding device generates apiece of shared information to be assigned to the holding device itself, by using all pieces of additional partial information received from the at least two existing holding devices, and stores the generated piece of shared information. Therefore, even after the additional holding device is added to the group, the original private information can be restored from the shared information held by all the holding devices including the additional holding device.

In the above-stated holding device, the generating unit may generate the piece of shared information by adding up the all pieces of additional partial information received by the receiving unit, by a predetermined method.

With the above-described structure, the original private information can be restored by adding up all of the generated pieces of shared information and shared information assigned to the other holding devices.

In the above-stated holding device, the receiving unit may further receive additional partial information from at least one of the two existing holding devices from which pieces of additional partial information have been received, and the generating unit further performs a calculation onto the shared information stored in the storage unit by using the received additional partial information, and writes a result of the calculation into the storage unit as new shared information assigned to the holding device itself, wherein the received additional partial information has been generated from the shared information assigned to the existing holding device.

In the above-described structure, it is presumed that, when a piece of shared information is newly assigned, (n+1) pieces of partial shared information are generated from the new piece of shared information, and the generated partial shared information are received. The holding device performs a calculation onto the shared information stored in the storage unit by using the received partial shared information, and writes a result of the calculation into the storage unit as new shared information. This makes it possible to further update the shared information held by the holding device. This ensures that the private information can be restored by using the shared information held by all the holding devices, while increasing the randomness of the shared information held by the holding device.

The above-stated object is further fulfilled by a certificate authority device comprising: a receiving unit operable to receive n pieces of shared information having no redundancy from stored shared information which has been assigned redundantly to a first through an $n^{th}$ holding devices; a restoring unit operable to restore private information temporarily by using the received n pieces of shared information; a verifying unit operable to verify whether or not restored private information is authentic; and an identifying unit operable to, when the verifying unit judges that the restored private information is not authentic, identify a holding device holding shared information that has been tampered with in an unauthentic manner, by using remaining pieces of shared information held by each holding device and the n pieces of shared information used in the restoration.

With the above-described structure, it is possible to identify a holding device holding shared information that has been tampered with in an unauthentic manner, from among a plurality of holding devices.

In the above-stated certificate authority device, the first through the $n^{th}$ holding devices may have respectively been associated with n nodes that are arranged to form one or more closed paths, an $i^{th}$ holding device holds an $i^{th}$ piece of shared information having been assigned to the $i^{th}$ holding device and an $(i-1)^{th}$ and an $(i+1)^{th}$ pieces of shared information having been assigned to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device, "i" being an integer in a range from 1 to n, the receiving unit receives the n pieces of shared information having no redundancy by receiving a first through an $n^{th}$ pieces of shared information respectively assigned to the first through the $n^{th}$ holding devices, and the identifying unit includes: a first classifying unit operable to obtain remaining pieces of shared information held by each holding device, and classify all of the pieces of shared information received from each holding device into a first through an $n^{th}$ groups such that the $i^{th}$ piece of shared information having been assigned to the $i^{th}$ holding device and the $i^{th}$ piece of shared information assigned to the $i^{th}$ holding device and held by the $(i-1)^{th}$ and the $(i+1)^{th}$ holding devices belong to an $i^{th}$ group as a same piece of information; a second classifying unit operable to classify, for each of the first through the $n^{th}$ groups, a plurality of pieces of shared information included in each group into sub-groups so that each sub-group includes a same piece of shared information; a combination generating unit operable to select one sub-group from each of the first through the $n^{th}$ groups, select one piece of shared information from each of selected n sub-groups, and generate combinations of n pieces of shared information; a verifying unit operable to verify whether or not shared information is authentic by generating private information by using all pieces of shared information included in the generated combinations; and an excluding unit operable to, when the verifying unit verifies that shared information included in the sub-group is authentic, recognizes a holding device that holds shared information included in the sub-groups, as authentic, and excludes the authentic holding device, wherein the identifying unit identifies a holding device that holds shared information having been tampered with, from among remaining holding devices.

With the above-described structure, it is possible to exclude an authentic holding device, and identify a holding device holding shared information that has been tampered with in an unauthentic manner, from among the holding devices other than the excluded holding device.

In the above-stated certificate authority device, the restoring unit further restores the private information by using the n pieces of shared information having no redundancy among a plurality of pieces of shared information received from holding devices excluding the holding device identified by the identifying unit as holding shared information having been tampered with.

With the above-described structure, it is possible to restore the private information with reliability.

The above-stated object is still further fulfilled by a distribution device for assigning n pieces of shared information, which are obtained by segmentation of a piece of private information, to n holding devices respectively, the distribution device comprising: a selecting unit operable to select one or more related holding devices which are related to a particular holding device, from among a plurality of holding devices; and an assigning unit operable to assign a piece of shared information having been assigned to the particular holding device to all of the related holding devices.

With the above-described structure, the distribution device assigns the n pieces of shared information respectively to the n holding devices, and also assigns apiece of shared information having been assigned to a particular holding device, to the related holding devices which are related to the particular holding device and have been selected from among a plurality of holding devices. This makes it possible to cause a plurality of holding devices to hold a same piece of shared information in common. This increases the redundancy of a same piece of shared information held by a plurality of holding devices, increasing the possibility of dealing with a case where the shared information held by any holding device was tampered with, destroyed, or made unusable.

BRIEF DESCRIPTION OF THE DRAWING

FIG. 4 shows an example of the data structure of the distribution destination list T100.

FIG. 6 shows an example of the data structure of the device information list T200.

FIG. 22 is a flow diagram showing the operational flow of the shared information holding devices 125 and 126 in the first update process during withdrawal process.

FIG. 41 shows an example of the distribution of the shared information.

Figure 1:
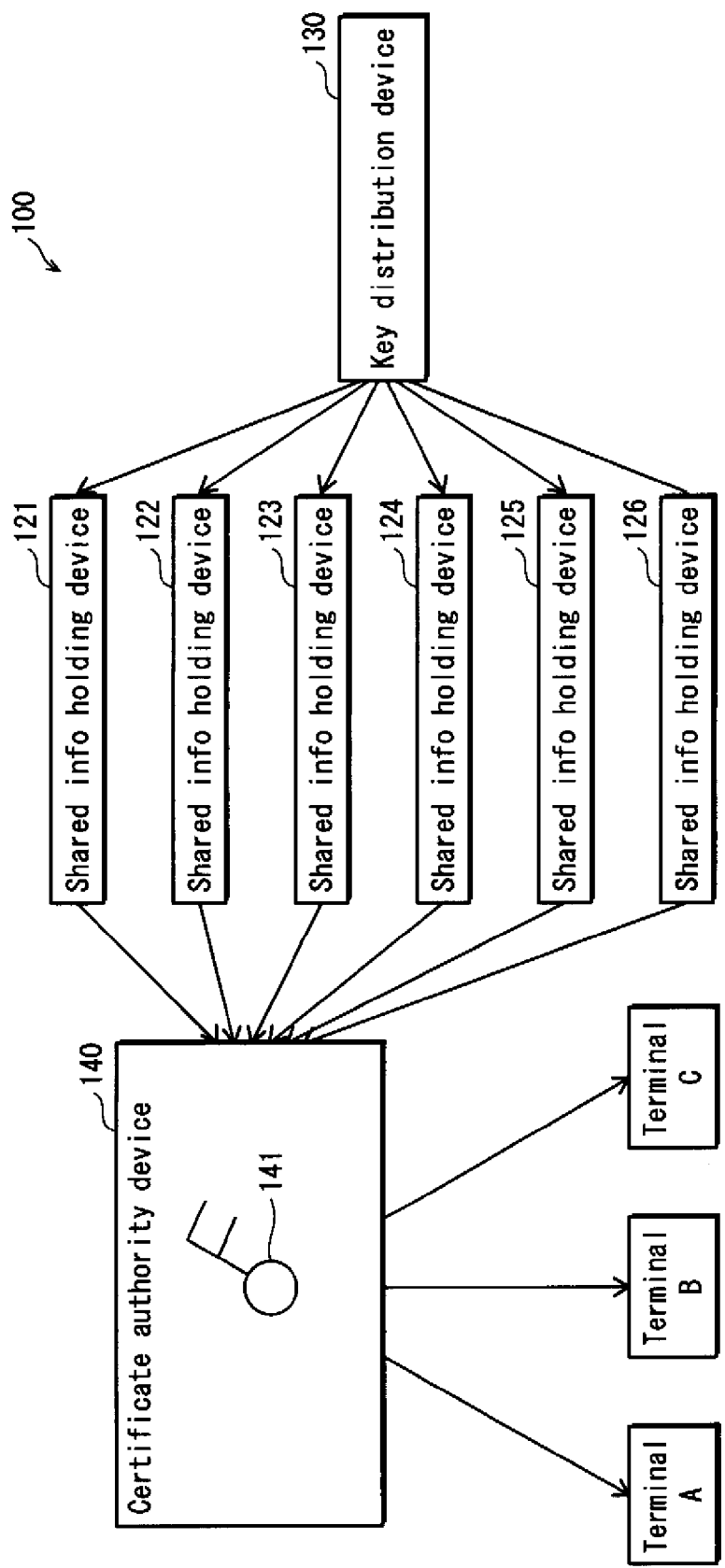
FIG. 1 is a block diagram showing the overall structure of the certificate authority system 100.

DESCRIPTION OF CHARACTERS 100 certificate authority system
121-127 shared information holding device
130 key distribution device
140 certificate authority device
250_j (j=1, 2, ..., 7) control unit
251_j (j=1, 2, ..., 7) shared information storage unit
252_j (j=1, 2, ..., 7) other device shared information storage unit
253_j (j=1, 2, ..., 7) authenticator storage unit
254_j (j=1, 2, ..., 7) list storage unit
255_j (j=1, 2, ..., 7) ID storage unit
256_j (j=1, 2, ..., 7) transmission unit
257_j (j=1, 2, ..., 7) reception unit
260_j (j=1, 2, ..., 7) shared information updating unit
261_j (j=1, 2, ..., 7) shared information dividing unit
262_j (j=1, 2, ..., 7) shared information verifying unit
263_j (j=1, 2, ..., 7) other device shared information verifying unit
264_j (j=1, 2, ..., 7) partial information verifying unit
265_j (j=1, 2, ..., 7) modification information generating unit
266_j (j=1, 2, ..., 7) list updating unit
267_j (j=1, 2, ..., 7) obtaining unit
301 key pair generating unit
302 certificate generating unit
303 certificate distributing unit
304 private key dividing unit
305 shared information distributing unit
306 key deleting unit
307 transmission unit
351 device information storage unit
352 shared information selecting unit
353 device selecting unit
354 output unit
355 repeat control unit
401 private key storage unit
402 list storage unit
403 control unit
404 1st transmission/reception unit
405 2nd transmission/reception unit
412 terminal certificate issuing unit
413 certificate authority certificate storage unit
414 private key generating unit
415 private key verifying unit
416 unauthentic device identifying unit
417 analyzing unit

BEST MODE FOR CARRYING OUT THE INVENTION

1. Embodiment 1

1.1 Cryptographies Used in Present Embodiment

In the present embodiment, the RSA encryption method and the RSA signature method are used as the public key encryption method. In the following, the RSA encryption and the signature method are explained, respectively. In the following description, "X^Y" represents X to the power of $Y^{th}$, and "X mod Y" represents a remainder of X divided Y.

1.1.1 RSA Encryption Method (1) Generating Keys

In the RSA encryption method, the public key and the private key are calculated as follows.

(Procedure 1-1) Select prime numbers p and q which are random in size, and obtain a product n by multiplying them, as represented by "n=p×q". The size of p and q may be 512 bits, for example, and the size of n may be 1024 bits, for example.

(Procedure 1-2) Calculate the lowest common multiple L of (p−1) and (q−1), as represented by "L=LCM(p−1,q−1)".

(Procedure 1-3) Select randomly a natural number e which is relatively prime with L (the greatest common divisor of e and L is 1), and smaller than L.

$$1 \leq e \leq L-1, \text{GCD}(e,L)=1$$

In the above equation, GCD(e,L) represents the greatest common divisor of e and L. Also, as the method of randomly selecting the natural number e, the random number generation method is used.

The random number generation method is explained in detail in Non-Patent Document 1 identified earlier, pages 45-49, and description thereof is omitted here.

(Procedure 1-4) Calculate d that satisfies the following equation.

$$e \times d = 1 \bmod L \qquad \text{(Equation)}$$

It is mathematically known that there certainly exists a number d that satisfies the above equation when GCD(e,L)=1 is satisfied. An integer e and an integer n obtained in this way constitute a public key. Also, an integer d constitutes a private key.

(2) Generating Encrypted Text

An encrypted text c is calculated by performing the following encryption calculation onto a plain text m, using the integer e and integer n constituting the public key. Here, the plain text m is smaller than the integer n.

$$c = m\char`\^ e \bmod n$$

(3) Generating Decrypted Text

A decrypted text m' is calculated by performing the following decryption calculation onto the encrypted text c, using the integer d constituting the private key.

$$m' = c\char`\^ d \bmod n$$

It should be noted here that the decrypted text m' matches the plain text m, as confirmed by the following in which "m<n" and "m mod n=m".

$$\begin{aligned}
m' &= c \char`\^ d \bmod n \\
&= (m \char`\^ e) \char`\^ d \bmod n \\
&= m \char`\^ (e \times d \bmod L) \bmod n \\
&= m \char`\^ 1 \bmod n \\
&= m \bmod n
\end{aligned}$$

The RSA encryption is explained in detail in Non-Patent Document 1 identified earlier, pages 110-113, and description thereof is omitted here.

1.1.2 RSA Signature Method (1) Generating Keys

In the RSA encryption method, the public key and the private key are calculated as follows.

(Procedure 2-1) Select prime numbers p and q which are random in size, and obtain a product n by multiplying them, as represented by "n=p×q". The size of p and q may be 512 bits, for example, and the size of n may be 1024 bits, for example.

(Procedure 2-2) Calculate the lowest common multiple L of (p−1) and (q−1), as represented by "L=LCM(p−1,q−1)".

(Procedure 2-3) Select randomly a natural number e which is relatively prime with L (the greatest common divisor of e and L is 1), and smaller than L.

$$1 \leq e \leq L-1, \text{GCD}(e,L)=1$$

In the above equation, GCD(e,L) represents the greatest common divisor of e and L.

(Procedure 2-4) Calculate d that satisfies the following equation.

$$e \times d = 1 \bmod L \qquad \text{(Equation)}$$

It is mathematically known that there certainly exists a number d that satisfies the above equation when GCD(e,L)=1 is satisfied. An integer e and an integer n obtained in this way constitute a public key. Also, an integer d constitutes a private key.

(2) Generating Signature

Signature data S is calculated for message data D, as follows.

First, a hash value h of the message data D (h=Hash(D)) is calculated by using a hash function Hash.

Next, the hash value h is raised to d by using the integer d which is the private key, and the signature data S is calculated.

$$S = h\char`\^ d \bmod n$$

That is to say, the signature data S is an encrypted value that is obtained by performing an encryption by the RSA encryption, with the hash value h representing the plain text.

(3) Verifying Signature

Whether or not the signature data S is an authentic signature to the message data D is verified in the following manner.

It is confirmed whether or not a value "Hash(D)" is equal to a value "S^e mod n" (which corresponds to a value obtained by decrypting the signature data S by the RSA encryption). When it is confirmed so, the signature data S is regarded as an authentic signature and is accepted; and when it is not confirmed so, the signature data S is not regarded as an authentic signature and is rejected.

The RSA signature is explained in detail in Non-Patent Document 1 identified earlier, pages 175-176, and description thereof is omitted here.

1.2 Outline of Certificate Authority System 100

FIG. 1 shows the overall structure of a certificate authority system 100 in Embodiment 1 of the present invention.

The certificate authority system 100 is composed of shared information holding devices 121-126, a key distribution device 130, a certificate authority device 140, and terminals A, B and C.

1.2.1 Outline of Devices

The certificate authority device 140 is an issuance device that issues a certificate by using a private key 141.

When the private key 141 is leaked, the certificate authority device 140 recovers the private key by regenerating a new private key "d", and verifies whether or not the new private key "d" is authentic.

The shared information holding devices 121-126 respectively have shared information which is used by the certificate authority device 140 to restore the new private key "d" in the recovery.

The key distribution device 130 generates a pair of a new private key "d" and a public key. The key distribution device 130, by using the generated new private key "d", generates a plurality of pieces of information (hereinafter referred to as shared information) that are necessary for regenerating the new private key "d" in the recovery, and generates a certificate of the public key corresponding to the private key "d".

More specifically, the key distribution device 130 divides the "new private key", as the private key d in the RSA encryption, into k pieces of shared information (d_1, d_2, . . . d_k) by the secret sharing method. Note that X_Y indicates that X is attached with subscript index Y.

The relationship established between the private key d and the k pieces of shared information (d_1, d_2, . . . d_k) is represented as follows.

$$d = d\_1 + d\_2 + \ldots + d\_k \bmod L$$

The key distribution device 130 also generates a self certificate by attaching a signature generated with use of "new private key" to the certificate of the public keys e and n in the RSA encryption. The generated self certificate is used as a certificate for verifying whether or not the "new private key" has been generated correctly as an authentic private key.

The key distribution device 130 distributes, to the shared information holding devices 121-126, a plurality of pieces of shared information and certificates that are to be held by the shared information holding devices 121-126, respectively.

The terminals A, B and C request and receive, from the certificate authority device 140, a certificate of a public key (public key certificate) corresponding to a private key, and use the public key certificate when they perform an encryption communication with another terminal.

The certificate is explained in detail in Non-Patent Document 2 identified earlier, and description thereof is omitted here.

There are six processes that are performed by the certificate authority system 100.

The first one is an initial design process in which the certificate authority system 100 performs what is called an initial design in which the "new private key" is generated and a plurality of pieces of shared information are generated from the "new private key" by the secret sharing method as a preparation for distributing the shared information holding devices with shared information which is necessary for regenerating the new key.

The second process is called a detection process in which each of the shared information holding devices detects whether or not the private key to be used by the certificate authority device 140 has been leaked.

The third process is called an analysis/recovery process in which, when any of the shared information holding devices detects that the private key has been leaked, the cause of the leak is analyzed and the recovery method is determined. Further, when it is determined that the private key should be updated, the shared information is collected from each of the shared information holding devices, and the "new private key" is generated. It is then detected whether or not the recovered private key is a correct value. In this way, the private key to be used by the certificate authority device 140 is recovered.

The fourth process is called a next-round preparation process in which shared information to be used in the next recovery is generated and distributed to each of the shared information holding devices.

The fifth process is called a shared information holding device withdrawal process in which, when any of the shared information holding devices withdraws, the shared information held by the other shared information holding devices is updated.

The sixth process is called a shared information holding device addition process in which, when a shared information holding device is newly added, the shared information is updated.

The above-mentioned processes will be described later.

1.2.2 Information Held by Each Shared Information Holding Device

Here, the shared information and certificate held by each of the shared information holding devices 121-126 will be described.

In the present embodiment, the plurality of shared information holding devices have in common the shared information such that the shared information has redundancy. With this structure, even if a shared information holding device that operates in an unauthentic manner is found, it is possible to restore the "new private key" by using the shared information that is held by the other shared information holding devices.

Figure 2:
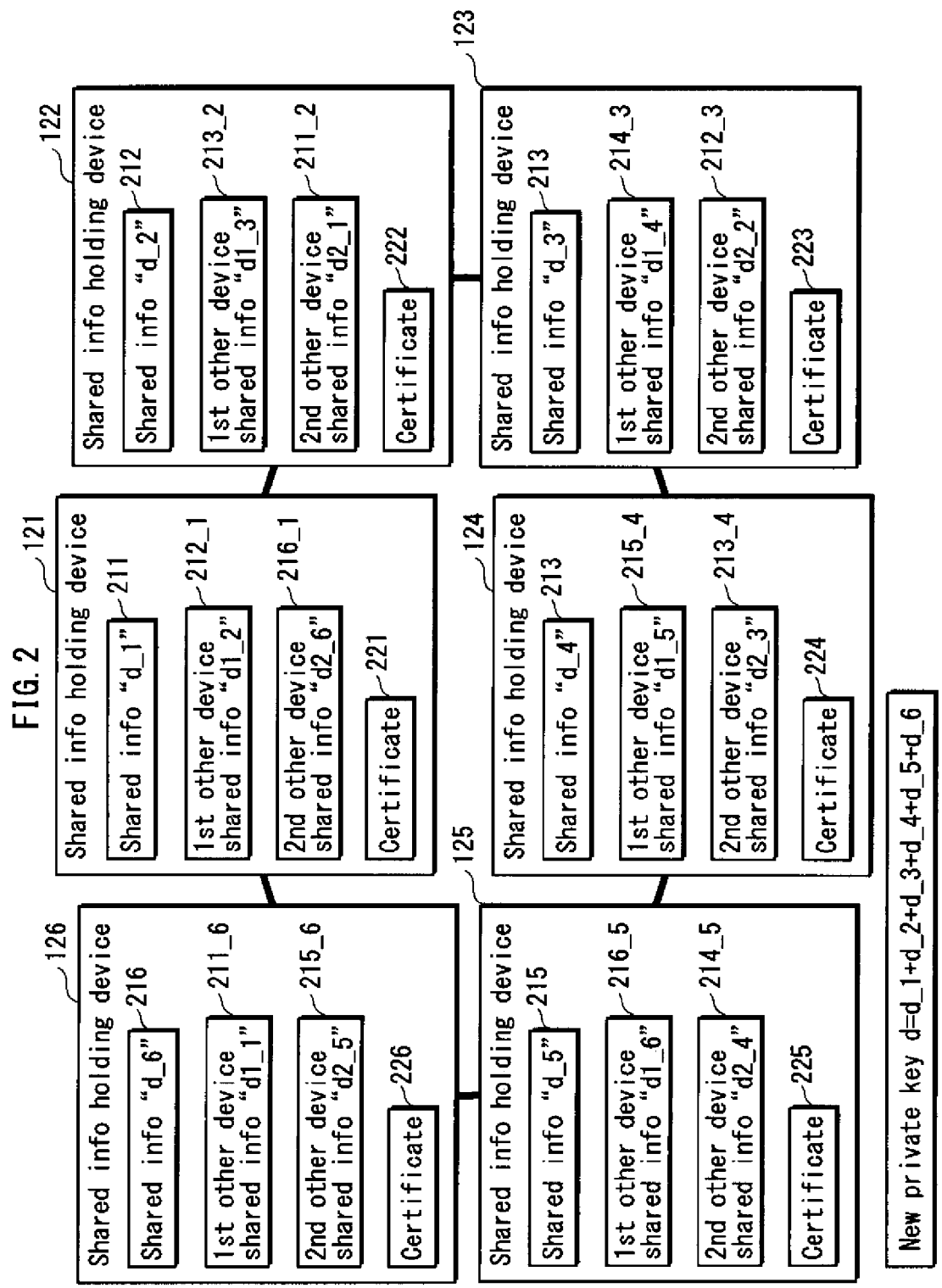
FIG. 2 shows the relationship among the shared information holding devices 121-126 and the information held by the shared information holding devices.

FIG. 2 shows the structure of the shared information holding devices 121-126 in the present embodiment structured such that the shared information has redundancy.

The shared information holding devices 121-126 are associated so that a closed path (ring-like) is formed. More specifically, k nodes (in the present example, six nodes) are virtually disposed on a graph in which a closed path has been formed. The shared information holding devices 121-126 are associated with the six nodes, respectively. That is to say, the shared information holding devices 121-126 are respectively associated with the k (=six) nodes that are virtually disposed to form a closed path. In other words, the shared information holding devices 121-126 are respectively associated with n nodes that have been connected to form a closed path. Note that the closed path is known in the field of graph theory, and description thereof if omitted here.

Here, the above-mentioned private key d is divided into six (k=6) pieces, as represented by the following.

$$d = d\_1 + d\_2 + d\_3 + d\_4 + d\_5 + d\_6 \bmod L$$

As shown in FIG. 2, each of the shared information holding devices 121-126 holds three pieces of shared information and one certificate. Of the three pieces of shared information, one is the shared information held by the shared information holding device itself, and the other two are "other device shared information" (the first and second other device shared information) that are held by other shared information holding devices.

As one example, the shared information holding devices 121-126 are assigned with shared information d_1 through d_6 on a one to one basis.

The shared information holding device 121 holds shared information "d_2" held by the shared information holding device 122 as the first other device shared information "d1_2" 212_1, and holds shared information "d_6" held by the shared information holding device 126 as the second other device shared information "d2_6" 216_1.

The shared information holding device 122 holds shared information "d_3" held by the shared information holding device 123 as the first other device shared information "d1_3" 213_2, and holds shared information "d_1" held by the shared information holding device 121 as the second other device shared information "d2_1" 211_2.

That is to say, in the present embodiment, each shared information holding device holds shared information "d_i", the first other device shared information "d1_(i+1) (=d_(i+1))", and the second other device shared information "d2_(i−1) (=d_(i−1))". Note that, in the case of i+1=7, the first other device shared information is d1_1(=d_1); and in the case of i−1=0, the second other device shared information is d2_6 (=d_6), Here, the other device shared information XXX_Y is shared information that is regarded as the same as the shared information XXX, and is held by the shared information holding device 12Y. In this way, in the present structure, the plurality of shared information holding devices have in common the shared information such that the shared information has redundancy. In the following description, the first and second other device shared information are merely referred to as other device shared information when there is no need to distinguish between them, and other device shared information and shared information are merely referred to as shared information when there is no need to distinguish between them.

The shared information holding devices 121-126 generate certificates 221-226 respectively by signing, with use of a 'new private key "d"', a public key corresponding to the 'new private key "d"' and hold the generated certificates 221-226 as authenticators.

With the above-described structure where the shared information held by the shared information holding devices has redundancy, when an unauthentic private key is generated in the recovery process of the certificate authority device 140, it is possible to detect a shared information holding device which has supplied a piece of shared information including an unauthentic value by using the shared information that the shared information holding devices have in common, and generate an authentic "new private key" using authentic shared information excluding the piece of shared information including the unauthentic value. Furthermore, when data such as the shared information is transferred between shared information holding devices, it is possible to detect a shared information holding device that operates in an unauthentic manner, by detecting whether or not data supplied from a shared information holding device which holds shared information identified as the same as the data is authentic.

In the present embodiment, each of the plurality of shared information holding devices disposed to form a circle as shown in FIG. 2 holds two pieces of other device shared information that are shared information held by the two adjacent shared information holding devices on both sides, respectively. However, not limited to this, any other structure is available as far as a plurality of shared information holding devices hold in common shared information. For example, each of the plurality of shared information holding devices may hold two pieces of other device shared information that are shared information held by the two adjacent shared information holding devices on the right-hand side (for the shared information holding device 121, the shared information holding devices 122 and 123), respectively.

1.2.3 Withdrawal and Addition of Shared Information Holding Device

Here, the withdrawal and addition of shared information holding device will be explained briefly.

When generating the shared information from the "new private key" by the secret sharing method, the key distribution device 130 generates six pieces of shared information such that the "new private key" can be restored when all the generated pieces of shared information are combined together.

Therefore, in the shared information holding device withdrawal/addition process, shared information is newly generated such that the total sum of the shared information is always constant (private key "d"). With this structure, without regeneration of "new private key" and shared information by the key distribution device 130, it is possible to decrease the number of pieces of shared information in the shared information holding device withdrawal process, and to increase the number of pieces of shared information in the shared information holding device addition process.

The shared information holding device withdrawal/addition process is performed as follows when the above-described generation method is used.

When the shared information holding device 121 is to withdraw, first, five pieces of partial information are generated from a piece of other device shared information that should be the same as shared information "d_1" 211 held by the shared information holding device 121 that is to withdraw. Here, the five pieces of partial information are generated such that the shared information "d_1" 211 is equal to the sum of the five pieces of partial information. The generated five pieces of partial information are sent to the shared information holding devices 122-126, respectively.

Each of the other shared information holding devices (122-126) adds, as integers, the received piece of partial information to the shared information held by the shared information holding device itself. This enables the total sum of the shared information held by the shared information holding devices to be always constant even after the shared information holding device 121 withdraws, and it becomes possible to allow a shared information holding device to withdraw, without regenerating "new private key" and shared information.

When a shared information holding device is to be newly added, it is necessary to generate shared information to be held by the new shared information holding device. For this purpose, for example, modification information a and b are obtained respectively from two shared information holding devices (in this example, the shared information holding devices 121 and 126), and shared information (a+b) for a shared information holding device 127 that is to be newly added is generated by adding, as integers, the modification information a and b. The shared information holding device 121 generates new shared information "d_1−a" by subtracting the value of the modification information of the device itself from the shared information held by the device itself. Similarly, the shared information holding device 126 generates new shared information "d_6−b". This enables the total sum of the shared information held by the shared information holding devices to be always constant even after the shared information holding device 127 is added, and it becomes possible to add a shared information holding device without regenerating "new private key" and shared information. A detailed operation of shared information holding device in the withdrawal/addition process will be described later.

In the above description, the private key d is divided into six pieces and distributed to the six shared information holding devices, respectively. However, not limited to this, any other structure is available as far as the private key d is divided into four or more pieces of shared information for the withdrawal process, and into three or more pieces of shared information for the addition process. Also, it has been described that a plurality of pieces of shared information are generated by the secret sharing method such that a "new private key" is restored from the total sum of the shared information. However, not limited this, the conventional secret sharing method recited in Non-Patent Document 1 in pages 209-219 may be used.

1.3 Structure of Each Device

Here, the structures of the shared information holding devices 121-126, the key distribution device 130 and the certificate authority device 140 will be described.

1.3.1 Structure of Key Distribution Device 130

Figure 3:
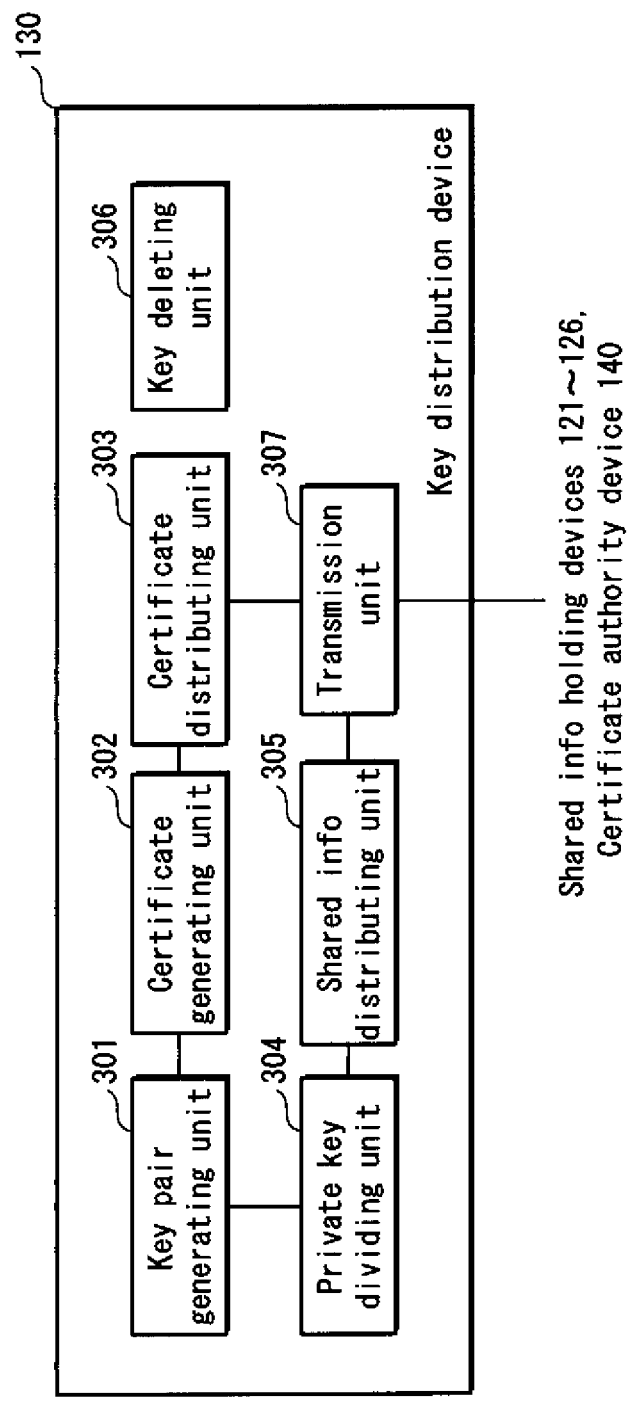
FIG. 3 is a block diagram showing the structure of the key distribution device 130.

As shown in FIG. 3, the key distribution device 130 includes a key pair generating unit 301, a certificate generating unit 302, a certificate distributing unit 303, a private key dividing unit 304, a shared information distributing unit 305, a key deleting unit 306, and a transmission unit 307.

The key distribution device 130 is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes the key distribution device 130 to achieve its functions.

(1) Key Pair Generating Unit 301

The key pair generating unit 301 generates, as a pair, a public key PK and a private key d for use in the RSA encryption method.

The key pair generating unit 301 outputs the generated public key PK to the certificate generating unit 302.

Also, the key pair generating unit 301 outputs the generated private key d to the certificate generating unit 302 and the private key dividing unit 304.

(2) Certificate Generating Unit 302

The certificate generating unit 302, upon receiving the public key PK and private key d from the key pair generating unit 301, generates a certificate of the received public key PK. The signature to be applied to the certificate is generated by using a private key corresponding to the public key.

The certificate generating unit 302 outputs the generated certificate to the certificate distributing unit 303.

Note that the generated certificate includes the public key PK and signature data S (=Sig(d, PK)) which is generated by signing the public key PK by using the private key d.

Note that the technology for generating the certificate of the public key is known, and description thereof is omitted here.

(3) Certificate Distributing Unit 303

The certificate distributing unit 303, upon receiving the certificate from the certificate generating unit 302, distributes the received certificate to the shared information holding devices 121-126 via the transmission unit 307.

(4) Private Key Dividing Unit 304

The private key dividing unit 304 has a storage area for storing the k pieces of shared information $d\_1, d\_2, d\_3, \ldots d\_k$.

The private key dividing unit 304, upon receiving the private key d from the key pair generating unit 301, generates the k pieces of shared information $d\_1, d\_2, d\_3, \ldots d\_k$ from the received private key d by the secret sharing method (in this example, k=6). In other words, the private key dividing unit 304 divides the private key d into the k pieces of shared information $d\_1, d\_2, d\_3, \ldots d\_k$ by the secret sharing method. It should be noted here that the private key dividing unit 304 divides the private key d such that the private key d is equal to the sum of the k pieces of shared information. Note that, in the following description, it is presumed that k is 6.

More specifically, the private key dividing unit 304 generates (k−1) (=5) pieces of random numbers by using a random number generator, thereby generating shared information $d\_1, d\_2, d\_3, d\_4$, and $d\_5$. Next, the private key dividing unit 304 calculates $d\_k$ (=$d\_6$) based on the following equation.

$$d\_k = d - (d\_1 + d\_2 + d\_3 + d\_4 + d\_5)$$

The private key dividing unit 304 temporarily stores the generated shared information $d\_1, d\_2, d\_3, d\_4, d\_5$, and $d\_6$ into the storage area.

(5) Shared Information Distributing Unit 305

The shared information distributing unit 305 distributes the shared information $d\_1, d\_2, d\_3, d\_4, d\_5$, and $d\_6$ generated by the private key dividing unit 304 to the shared information holding devices 121-126. Each distributed piece of shared information includes the shared information held by each shared information holding device, and shared information held by a different shared information holding device in common. The shared information distributing unit 305 also generates a distribution destination list T100 that indicates which shared information was distributed to which shared information holding device, and distributes the generated distribution destination list T100 to each shared information holding device and the certificate authority device 140.

The distribution destination list T100, as shown in FIG. 4, has an area for storing a plurality of sets of an own device ID, a first other device ID, and a second other device ID. The own device ID is a device ID for identifying a shared information holding device that holds the shared information. The first other device ID is a device ID for identifying a shared information holding device holding shared information that is the same as the first other device shared information held by the shared information holding device identified by the own device ID. The second other device ID is a device ID for identifying a shared information holding device holding shared information that is the same as the second other device shared information held by the shared information holding device identified by the own device ID.

Figure 5:
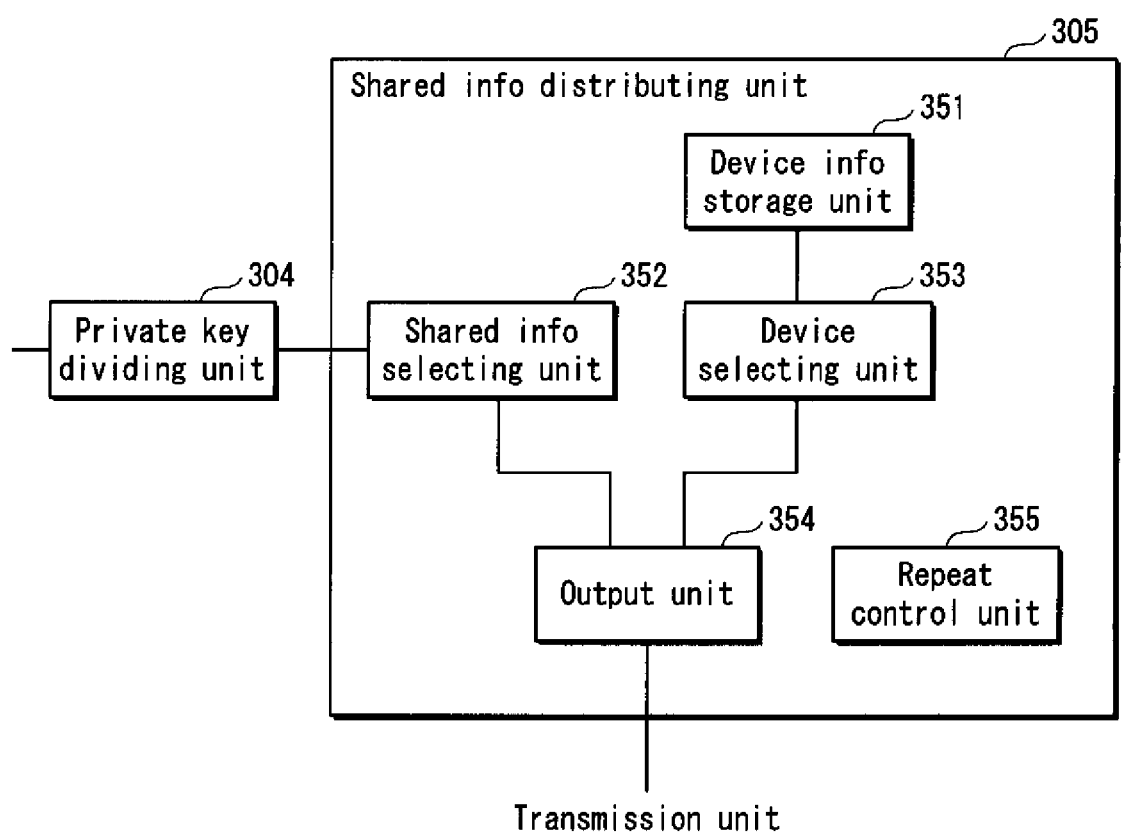
FIG. 5 is a block diagram showing the structure of the shared information distributing unit 305.

The shared information distributing unit 305, as shown in FIG. 5, includes a device information storage unit 351, a shared information selecting unit 352, a device selecting unit 353, an output unit 354, and a repeat control unit 355.

(Device Information Storage Unit 351)

The device information storage unit 351 includes a device information list T200 as shown in FIG. 6.

In the device information list T200, serial numbers are associated with IDs of shared information holding devices, on a one to one basis. For example, number "1" is associated with identifier "ID_1" which identifies the shared information holding device 121.

Note that in the following description, a shared information holding device with ID_i associated with number "i" in the device information list T200 may be called the $i^{th}$ shared information holding device. For example, the third shared information holding device is the shared information holding device 123.

In the following, the association with each node in the above-described closed path will be described.

The k (=6) nodes (the first node to the sixth node) are virtually disposed to be serially connected on a graph in which a closed path has been formed. The shared information holding devices 121-126 are associated with the first node to the sixth node in the order on a one to one basis. That is to say, the shared information holding device 12X is associated with the $X^{th}$ node.

With the above-described structure, the shared information holding devices 121-126 are associated so that a closed path is formed.

(Shared Information Selecting Unit 352)

The shared information selecting unit 352 selects shared information d_i from among shared information d__1, d__2, d__3, d__4, d__5, and d__6 which were generated by the private key dividing unit 304 and are temporarily stored.

(Device Selecting Unit 353)

The device selecting unit 353 selects three shared information holding devices to which the shared information d_i selected by the shared information selecting unit 352 should be distributed, and generates the distribution destination list T100. It is presumed here that the distribution destination list T100 has no registration at the initial stage.

The device selecting unit 353, when the shared information selecting unit 352 selects the shared information d_i, selects the $i^{th}$ shared information holding device based on the contents of the device information list T200. More specifically, the device selecting unit 353 selects a device ID associated with the $i^{th}$ shared information holding device from the device information list T200.

Also, the device selecting unit 353 selects the $(i-1)^{th}$ shared information holding device and the $(i+1)^{th}$ shared information holding device based on the contents of the device information list T200. More specifically, the device selecting unit 353 selects device IDs respectively associated with the $(i-1)^{th}$ and $(i+1)^{th}$ shared information holding devices from the device information list T200.

The device selecting unit 353 adds, into the distribution destination list T100, the device ID of the $i^{th}$ shared information holding device as the own device ID, the device ID of the $(i+1)^{th}$ shared information holding device as the first other device ID, and the device ID of the $(i-1)^{th}$ shared information holding device as the second other device ID.

Here, when i+1=7, the device selecting unit 353 selects the first shared information holding device. Also, when i−1=0, the device selecting unit 353 selects the sixth shared information holding device.

(Output Unit 354)

The output unit 354 distributes the shared information d_i selected by the shared information selecting unit 352 to each of the $i^{th}$, $(i-1)^{th}$, and $(i+1)^{th}$ shared information holding devices selected by the device selecting unit 353, via the transmission unit 307. Here, the output unit 354 distributes the shared information d_i as the shared information assigned to the own device, to the $i^{th}$ shared information holding device. Also, the output unit 354 distributes the shared information d_i (=d1_i) as the first other device shared information, to the $(i+1)^{th}$ shared information holding device; and distributes the shared information d_i (=d2_i) as the second other device shared information, to the $(i-1)^{th}$ shared information holding device.

After distributing all shared information, the output unit 354 distributes the distribution destination list T100 generated by the device selecting unit 353 to the shared information holding devices 121-126 and the certificate authority device 140 via the transmission unit 307.

(Repeat Control Unit 355)

The repeat control unit 355 controls the shared information selecting unit 352, the device selecting unit 353 and the output unit 354 so that the selection of shared information, the selection of three shared information holding devices as distribution destination of the selected shared information, the registration of device IDs of the selected three shared information holding devices into the distribution destination list T100, and the distribution of the selected shared information are repeatedly performed.

(Correspondence with Present Invention)

As described above, the shared information distributing unit 305 selects the $i^{th}$, the $(i-1)^{th}$ and the $(i+1)^{th}$ shared information holding devices, and distributes the shared information d_i to each of the selected $i^{th}$, $(i-1)^{th}$ and $(i+1)^{th}$ shared information holding devices.

In this operation, the shared information distributing unit 305 selects the $i^{th}$, the $(i-1)^{th}$ and the $(i+1)^{th}$ shared information holding devices one by one, and distributes the shared information d_i to each of the selected $i^{th}$, $(i-1)^{th}$ and $(i+1)^{th}$ shared information holding devices one by one.

Here, the operation in which the shared information distributing unit 305 selects the $i^{th}$ shared information holding device and distributes the shared information d_i to the selected $i^{th}$ shared information holding device corresponds to the first distribution unit of the present invention. Also, the operation in which the shared information distributing unit 305 selects the $(i-1)^{th}$ and $(i+1)^{th}$ shared information holding device and distributes the shared information d_i to the selected $(i\_1)^{th}$ and $(i+1)^{th}$ shared information holding devices corresponds to the second distribution unit of the present invention.

(6) Key Deleting Unit 306

The key deleting unit 306 deletes data related to the distribution of keys, such as the keys (private key, public key), certificate, shared information, shared information distribution destination list and the like, that are generated in the design processing stage.

(7) Transmission Unit 307

The transmission unit 307 transmits the certificate output from the certificate distributing unit 303, to the shared information holding devices 121-126.

The transmission unit 307 transmits the shared information output from the shared information distributing unit 305, to the three shared information holding devices as the distribution destinations.

The transmission unit 307 transmits the distribution destination list T100 output from the shared information distributing unit 305, to the shared information holding devices 121-126 and the certificate authority device 140.

1.3.2 Structure of Shared Information Holding Devices 121-126

Figure 7:
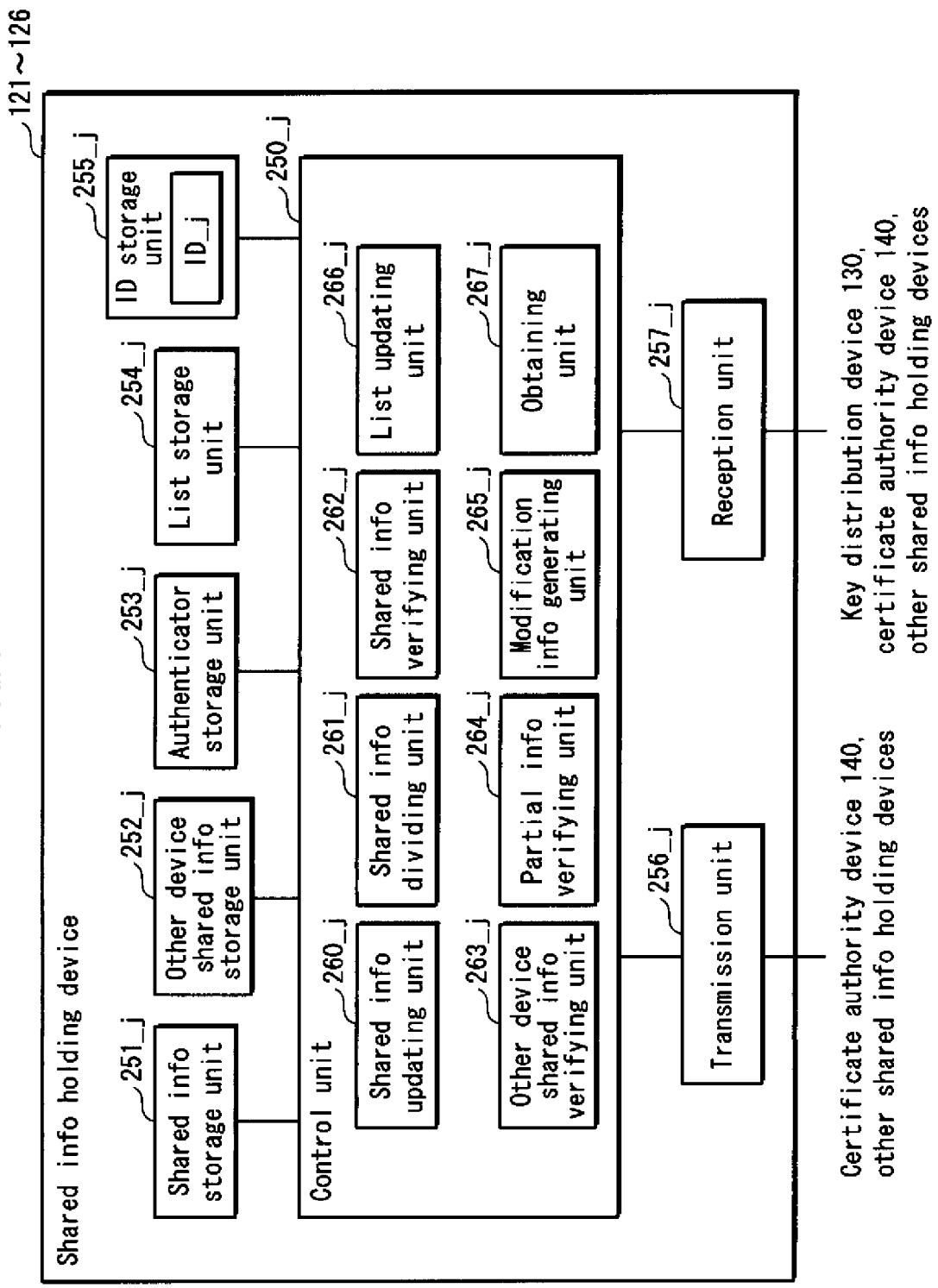
FIG. 7 shows the structure of the shared information holding devices 121-126.

The shared information holding devices 121-126, as shown in FIG. 7, include a control unit 250__j, a shared information storage unit 251__j, an other device shared information storage unit 252__j, an authenticator storage unit 253__j, a list storage unit 254__j, an ID storage unit 255__j, a transmission unit 256__j, and a reception unit 257__j.

Each of the shared information holding devices 121-126 is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each of the shared information holding devices 121-126 to achieve their functions.

Note that the subscript "j" attached to the sign $25x$ (x=0, 1, 2, ..., 7) is a numeral in a range from 1 to 6 and corresponds to the $j^{th}$ shared information holding device.

That is to say, the structural element $25x\_1$ is provided in the shared information holding device 121, and the structural element $25x\_2$ is provided in the shared information holding device 122. Also, the structural element $25x\_3$ is provided in the shared information holding device 123, and the structural element $25x\_4$ is provided in the shared information holding device 124. Further, the structural element $25x\_5$ is provided in the shared information holding device 125, and the structural element 25x_6 is provided in the shared information holding device 126.

(1) Shared Information Storage Unit 251_j

The shared information storage unit 251_j stores shared information d_j held by the $j^{th}$ shared information holding device.

(2) Other Device Shared Information Storage Unit 252_j

The other device shared information storage unit 252_j stores the first other device shared information d_(j+1) and the second other device shared information d_(j−1).

Note that, in the case of j+1=7, the first other device shared information to be stored is d__1; and in the case of j−1=0, the second other device shared information to be stored is d__6.

(3) Authenticator Storage Unit 253_j

The authenticator storage unit 253_j stores a certificate of the public key PK corresponding to the private key d.

(4) List Storage Unit 254_j

The list storage unit 254_j stores the distribution destination list T100 distributed from the key distribution device 130.

(5) ID Storage Unit 255_j

The ID storage unit 255_j stores a device ID "ID_j" for identifying the own device.

(6) Control Unit 250_j

The control unit 250_j controls the operation of the own device.

The control unit 250_j, as shown in FIG. 7, includes a shared information updating unit 260_j, a shared information dividing unit 261_j, a shared information verifying unit 262_j, an other device shared information verifying unit 263_j, a partial information verifying unit 264_j, a modification information generating unit 265_j, a list updating unit 266_j, and an obtaining unit 267_j.

(Shared Information Updating Unit 260_j)

The shared information updating unit 260_j, upon receiving the shared information d_j, as the shared information assigned to the own device, from the key distribution device 130 via the transmission unit 256_j, stores the received shared information into the shared information storage unit 251_j. In doing this, when the shared information storage unit 251_j has already stored information, the shared information updating unit 260_j deletes the existing information, and stores the received shared information d_j.

The shared information updating unit 260_j, upon receiving the shared information d1_(j+1) or d2_(j−1), as the first or second other device shared information, from the key distribution device 130 via the transmission unit 256_j, stores the received shared information into the other device shared information storage unit 252_j. In doing this, when the other device shared information storage unit 252_j has already stored another first or second other device shared information, the shared information updating unit 260_j deletes the existing information, and stores the received first other device shared information d1_(j+1) or second other device shared information d2_(j−1).

Also, the shared information updating unit 260_j updates the shared information, and the first and second other device shared information during the withdrawal/addition process performed in the certificate authority system 100, stores the updated shared information into the shared information storage unit 251_j, and stores the updated first and second other device shared information into the other device shared information storage unit 252_j. In doing this, the shared information updating unit 260_j deletes the existing shared information and first and second other device shared information before update.

(Operation During Withdrawal Process)

First, the operation of the shared information updating unit 260_j during the withdrawal process will be described.

The shared information updating unit 260_j receives two pieces of partial information from the shared information dividing unit 261_j of the own device, or two or three pieces of partial information from another shared information holding device, via the reception unit 257_j.

The shared information updating unit 260_j temporarily stores the received two or three pieces of partial information.

The shared information updating unit 260_j receives a verification result of shared information that was used for generating partial information, from another shared information holding device via the reception unit 257_j, or from the partial information verifying unit 264_j of the own device.

The shared information updating unit 260_j updates a corresponding piece of shared information by using two or three pieces of temporarily stored partial information when it is judged that the shared information used for generating partial information is authentic.

Note that the updating of the shared information in the withdrawal process will be described in detail later by using an example in the description of the operation during the withdrawal process.

(Operation During Addition Process)

The addition process is performed differently depending on the case which is one of: Case 1 where it is an existing device and stores addition-target shared information; Case 2 where it is an existing device and stores shared information of the device that generated modification information; Case 3 where the own device is an addition-target device; and Case 4 where it is a device other than those of the Cases 1 to 3.

The following describes the operation for each case.

<Case 1>

The shared information updating unit 260_j, upon receiving modification information "n1" generated by another shared information holding device, temporarily stores the received modification information "n1".

The shared information updating unit 260_j generates, by using shared information "d_j" and modification information (for example, "n2") generated by the modification information generating unit 265_j, new shared information "d_j' (=d_j−n2)", and updates the information stored in the shared information storage unit 251_j with the generated new shared information. It should be noted here that the modification information generated by the modification information generating unit of the own device or another device is an integer. Also, when modification information is subtracted from shared information, it is subtracted as an integer. Further, a negative value may be obtained as a result of such a subtraction. However, the obtained negative value is held as shared information as it is.

The shared information updating unit 260_j generates other device shared information "n1+n2" that is the same as the shared information that is to be held by the addition-target device, by using modification information "n1" and modification information "n2" generated by the modification information generating unit 265_j. The shared information updating unit 260_j replaces the other device shared information, which becomes unnecessary due to the addition of the device, with the generated other device shared information "n1+n2".

The shared information updating unit 260_j receives two or three pieces of partial information generated by the shared information dividing unit 261_j of the own device or another device, and temporarily stores the received two or three pieces of partial information.

The shared information updating unit 260_j updates a corresponding piece of shared information by using two or three pieces of temporarily stored partial information.

Note that the updating of the shared information in the addition process will be described in detail later by using an example in the description of the operation during the addition process.

<Case 2>

The shared information updating unit 260_j, upon receiving modification information "n1" generated by another shared information holding device, generates new other device shared information by subtracting the received modification information "n1" from the other device shared information that should be the same value as the shared information held by said another shared information holding device. The shared information updating unit 260_j updates the existing other device shared information with new other device shared information. Note that, although a negative value may be obtained as a result of such a subtraction, the obtained negative value is held as shared information as it is.

The shared information updating unit 260_j receives two or three pieces of partial information generated by another device, and temporarily stores the received two or three pieces of partial information.

The shared information updating unit 260_j updates a corresponding piece of shared information by using the two or three pieces of temporarily stored partial information.

Note that the updating of the shared information in the addition process will be described in detail later by using an example in the description of the operation during the addition process.

<Case 3>

The shared information updating unit 260_j, upon receiving two pieces of modification information "n1" and "n2" generated by two other shared information holding devices, temporarily stores the received modification information "n1" and "n2". The shared information updating unit 260_j generates shared information "n1+n2" assigned to the own device, and stores the generated shared information "n1+n2" into the shared information storage unit 251_j.

The shared information updating unit 260_j receives shared information from the $(j+1)^{th}$ shared information holding device, and receives second other device shared information from the $(j+2)^{th}$ shared information holding device. When the received shared information matches the received second other device shared information, the shared information updating unit 260_j stores the received shared information into the other device shared information storage unit 252_j as the first other device shared information.

The shared information updating unit 260_j receives shared information from the $(j-1)^{th}$ shared information holding device, and receives first other device shared information from the $(j-2)^{th}$ shared information holding device. When the received shared information matches the received first other device shared information, the shared information updating unit 260_j stores the received shared information into the other device shared information storage unit 252_j as the second other device shared information.

The shared information updating unit 260_j receives two or three pieces of partial information generated by another device, and temporarily stores the received two or three pieces of partial information.

The shared information updating unit 260_j updates a corresponding piece of shared information by using the two or three pieces of temporarily stored partial information.

Note that the updating of the shared information in the addition process will be described in detail later by using an example in the description of the operation during the addition process.

<Case 4>

The shared information updating unit 260_j receives three pieces of partial information generated by another device, and temporarily stores the received three pieces of partial information.

The shared information updating unit 260_j updates a corresponding piece of shared information by using the three pieces of temporarily stored partial information.

Note that the updating of the shared information in the addition process will be described in detail later by using an example in the description of the operation during the addition process.

(Shared Information Dividing Unit 261_j)

The shared information dividing unit 261_j, in the withdrawal and addition processes, generates a plurality of pieces of partial information from the shared information stored in the shared information storage unit 251_j, or from the first or second other device shared information stored in the other device shared information storage unit 252_j. In other words, the shared information dividing unit 261_j divides the shared information stored in the shared information storage unit 251_j or the first or second other device shared information stored in the other device shared information storage unit 252_j, into a plurality of pieces of partial information.

First, the operation during the withdrawal process will be described.

The shared information dividing unit 261_j receives, from a monitoring device (not illustrated) that monitors the shared information holding devices, an instruction for generating partial information for withdrawal, the instruction instructing that the partial information should be generated from other device shared information that is the same as shared information held by the withdrawal-target shared information holding device. It should be noted here that the monitoring device monitors the operation of the shared information holding devices, and when it detects that a shared information holding device stops operating due to some failure, or operates in an unauthentic manner, the monitoring device sends the above-mentioned partial information generating instruction to the shared information dividing unit 261_j to cause the shared information holding device in question to withdraw. In the present example, the shared information dividing unit 261_j receives the partial information generating instruction for withdrawal from an external device. However, not limited to this, the shared information dividing unit 261_j may receive the partial information generating instruction for withdrawal from the key distribution device 130, or from the certificate authority device 140. Alternatively, the withdrawal-target shared information holding device may send the partial information generating instruction to another shared information holding device that holds other device shared information that is the same value as the shared information held by the withdrawal-target shared information holding device itself so that the operation can be started.

The shared information dividing unit 261_j determines, by using the distribution destination list T100, which of the first and second other device shared information is the other device shared information that should be the same as shared information held by the withdrawal-target shared information holding device. The shared information dividing unit 261_j then obtains the determined other device shared information from the other device shared information storage unit 252_j.

It is presumed here that the obtained other device shared information is represented as "s".

The shared information dividing unit 261_j generates k−1 pieces of partial information from the obtained other device shared information "s". Here, the shared information dividing unit 261_j generates k−1 pieces of partial information such that the obtained other device shared information "s" is equal to the sum of the k−1 pieces of partial information.

More specifically, the shared information dividing unit 261_j generates (k−2) (=4) pieces of random numbers by using a random number generator, thereby generating partial information (which are represented for the sake of convenience as s_1, s_2, s_3, and s_4). Next, the shared information dividing unit 261_j calculates s_(k−1) (=6) based on the following equation.

$$s\_(k-1) = s - (s\_1 + s\_2 + s\_3 + s\_4)$$

The shared information dividing unit 261_j assigns partial information to the shared information other than (i) the shared information "d_i" held by the withdrawal-target shared information holding device (for example, the $i^{th}$ shared information holding device) and (ii) the shared information "d1_i" and "d2_i" that should be the same as the shared information "d_i", such that different pieces of partial information are respectively assigned to a plurality of sets each of which is composed of a piece of shared information and two pieces of other device shared information that should be the same as each other.

The shared information dividing unit 261_j distributes two or three pieces of partial information to each distribution-destination shared information holding device, based on the contents of the distribution destination list T100. Note that the shared information dividing unit 261_j distributes two pieces of partial information to the own device by outputting the two pieces of partial information to the shared information updating unit 260_j.

The shared information dividing unit 261_j, after the distribution of the partial information, refers to the distribution destination list T100 to identify a shared information holding device that holds the first or second other device shared information that is the same value as the obtained other device shared information "s". The shared information dividing unit 261_j transmits a partial information verifying instruction for verifying the partial information, to the identified shared information holding device, via the transmission unit 256_j.

Note that the two or three pieces of partial information to be distributed to each shared information holding device will be described in detail later by using an example in the description of the operation during the withdrawal process.

Next, the operation during the addition process will be described.

The shared information dividing unit 261_j receives, from a shared information holding device 127 (not illustrated in FIG. 1), a partial information generating instruction for generating partial information for addition.

The shared information dividing unit 261_j obtains shared information from the shared information dividing unit 261_j. Here, for the convenience's sake, the obtained shared information is represented as "s". The shared information dividing unit 261_j generates (k+1) (in this example, seven) pieces of partial information from the obtained shared information "s". Here, the shared information dividing unit 261_j generates the (k+1) pieces of partial information such that the obtained shared information "s" is equal to the sum of the (k+1) pieces of partial information.

More specifically, the shared information dividing unit 261_j generates k (=6) pieces of random numbers by using a random number generator, thereby generating partial information (which are represented for the sake of convenience as s_1, s_2, ..., s_6). Next, the shared information dividing unit 261_j calculates s_(k+1) (=s_7) based on the following equation.

$$s\_(k+1) = s - (s\_1 + s\_2 + s\_3 + \ldots + s\_6)$$

Note that, although a negative value may be obtained as a result of such a subtraction, the obtained negative value is used as partial information as it is.

The shared information dividing unit 261_j assigns different pieces of partial information to a plurality of shared information holding devices, respectively.

The shared information dividing unit 261_j distributes three or six pieces of partial information to each distribution-destination shared information holding device. Note that the 261_j distributes three pieces of partial information to the own device by outputting the three pieces of partial information to the shared information updating unit 260_j.

Note that the three or six pieces of partial information to be distributed to each shared information holding device will be described in detail later by using an example in the description of the operation during the addition process.

(Shared Information Verifying Unit 262_j)

The shared information verifying unit 262_j verifies whether or not the shared information stored in the shared information storage unit 251_j is the same value as the information held by other shared information holding devices as the first or second other device shared information.

More specifically, the shared information verifying unit 262_j refers to the distribution destination list T100 stored in the list storage unit 254_j to identify shared information holding devices that respectively hold first and second other device shared information that are each the same value as the shared information stored in the shared information storage unit 251_j, and receives the first and second other device shared information from the identified shared information holding devices, via the reception unit 257_j. The shared information verifying unit 262_j verifies whether or not the shared information stored in the shared information storage unit 251_j matches each of the received first and second other device shared information.

(Other Device Shared Information Verifying Unit 263_j)

The other device shared information verifying unit 263_j verifies whether or not the first or second other device shared information stored in the other device shared information storage unit 252_j is the same value as the information held by other shared information holding devices as the shared information, or the first or second other device shared information.

More specifically, the other device shared information verifying unit 263_j refers to the distribution destination list T100 stored in the list storage unit 254_j to identify shared information holding devices that respectively hold the shared information and the second other device shared information that are each the same value as the first other device shared information stored in the other device shared information storage unit 252_j, and receives the shared information and the second other device shared information from the identified shared information holding devises, via the reception unit 257_j. The other device shared information verifying unit 263_j verifies whether or not the first other device shared information stored in the other device shared information storage unit 252_j matches each of the received shared information and second other device shared information.

Also, the other device shared information verifying unit 263_j refers to the distribution destination list T100 stored in the list storage unit 254_*j* to identify shared information holding devices that respectively hold the shared information and the first other device shared information that are each the same value as the second other device shared information stored in the other device shared information storage unit 252_*j*, and receives the shared information and the first other device shared information from the identified shared information holding devises, via the reception unit 257_*j*. The other device shared information verifying unit 263_*j* verifies whether or not the second other device shared information stored in the other device shared information storage unit 252_*j* matches each of the received shared information and first other device shared information.

(Partial Information Verifying Unit 264_*j*)

The partial information verifying unit 264_*j* verifies whether or not the sum of a plurality of pieces of partial information generated by other shared information holding devices, namely, the other device shared information used for generating the partial information is authentic.

The following describes the operation of the verification.

The partial information verifying unit 264_*j* receives a partial information verifying instruction from another shared information holding device, via the reception unit 257_*j*.

The partial information verifying unit 264_*j* obtains the partial information having been assigned to each shared information holding device, from all the shared information holding devices except for the withdrawal-target shared information holding device.

The partial information verifying unit 264_*j* obtains a value s' by adding up the all the obtained pieces of partial information. The partial information verifying unit 264_*j* verifies whether or not the obtained value s' is authentic, by using the obtained value s' and the first or second other device shared information stored in the other device shared information storage unit 252_*j*.

More specifically, in the case where the sum of the pieces of partial information generated by the other shared information holding devices should be the same as the first other device shared information stored in the other device shared information storage unit 252_*j*, the partial information verifying unit 264_*j* verifies whether or not the obtained value s' matches the first other device shared information stored in the other device shared information storage unit 252_*j*. Also, in the case where the sum of the pieces of partial information generated by the other shared information holding devices should be the same as the second other device shared information stored in the other device shared information storage unit 252_*j*, the partial information verifying unit 264_*j* verifies whether or not the obtained value s' matches the second other device shared information stored in the other device shared information storage unit 252_*j*.

When the partial information verifying unit 264_*j*, as a result of the verification, judges that the value s' matches the first or second other device shared information stored in the other device shared information storage unit 252_*j*, the partial information verifying unit 264_*j* transmits a positive verification result indicating that the value s' matches the first or second other device shared information, to each shared information holding device via the transmission unit 256_*j*.

When the partial information verifying unit 264_*j*, as a result of the verification, judges that the value s' does not match the first or second other device shared information stored in the other device shared information storage unit 252_*j*, the partial information verifying unit 264_*j* transmits a negative verification result indicating that the value s' does not match the first or second other device shared information, to each shared information holding device via the transmission unit 256_*j*.

Note that the partial information verifying unit 264_*j* sends the verification result to the own device, by outputting it to the shared information updating unit 260_*j*.

(Modification Information Generating Unit 265_*j*)

The modification information generating unit 265_*j* receives, from an external device (not illustrated), a shared information generating instruction for addition that instructs to generate shared information for the addition-target shared information holding device. Here, in the present embodiment, the modification information generating unit 265_*j* receives the shared information generating instruction for addition from an external device. However, not limited to this, the modification information generating unit 265_*j* may receive the shared information generating instruction for addition from the key distribution device 130 or the certificate authority device 140.

The modification information generating unit 265_*j* generates modification information. More specifically, the modification information generating unit 265_*j* generates one random number as the modification information.

The modification information generating unit 265_*j* transmits the generated modification information to the addition-target shared information holding device, via the reception unit 257_*j*.

The modification information generating unit 265_*j* refers to the distribution destination list T100 to identify two shared information holding devices that are to have other device shared information that is the same as the shared information stored in the shared information storage unit 251_*j*. The modification information generating unit 265_*j* transmits the generated modification information also to the identified two shared information holding devices, via the reception unit 257_*j*.

The modification information generating unit 265_*j* outputs the generated modification information to the shared information updating unit 260_*j*.

Note that the method for generating the modification information is not limited to the above-described one. For example, a hash value of shared information may be used as the modification information. Other than these, a fixed value or a half value of the shared information may be used. However, use of the latter ones might be avoided since they would make malicious third parties easy to estimate the shared information from the modification information.

(List Updating Unit 266_*j*)

The list updating unit 266_*j*, when a relationship between shared information holding devices changes in the shared information holding device withdrawal/addition process in the certificate authority system 100, updates the distribution destination list to reflect the new relationship, and replaces the distribution destination list stored in the list storage unit 254_*j* with the updated one. The list updating unit 266_*j* transmits the updated distribution destination list to the other shared information holding devices and the certificate authority device 140, via the transmission unit.

The list updating unit 266_*j*, upon receiving an updated distribution destination list from another shared information holding device via the reception unit 257_*j*, replaces the distribution destination list stored in the list storage unit 254_*j* with the received updated one.

(Obtaining Unit 267_*j*)

The obtaining unit 267_*j*, upon receiving, from the certificate authority device 140, a first request which requests for shared information, obtains the shared information stored in the shared information storage unit 251_*j*. The obtaining unit 267_*j* transmits the obtained shared information to the certificate authority device 140 via the transmission unit 256_*j*.

The obtaining unit 267_*j*, upon receiving, from the certificate authority device 140, a second request which requests for a certificate, obtains the certificate stored in the authenticator storage unit 253_*j*. The obtaining unit 267_*j* transmits the obtained certificate to the certificate authority device 140 via the transmission unit 256_*j*.

The obtaining unit 267_*j*, upon receiving, from the certificate authority device 140, a third request which requests for shared information and first and second other device shared information, obtains the shared information from the shared information storage unit 251_*j*, obtains the first and second other device shared information from the other device shared information storage unit 252_*j*, and obtains the device ID "ID_j" from the ID storage unit 255_*j*. The obtaining unit 267_*j* transmits the obtained shared information and first and second other device shared information to the certificate authority device 140 via the transmission unit 256_*j*. Hereinafter, the set of the shared information and the first and second other device shared information is referred to as a shared information group.

The obtaining unit 267_*j*, upon receiving, from another shared information holding device via the reception unit 257_*j*, a shared information request instruction which requests for shared information, obtains the shared information stored in the shared information storage unit 251_*j*. The obtaining unit 267_*j* outputs the obtained shared information to the shared information holding device being the requester, via the transmission unit 256_*j*.

The obtaining unit 267_*j*, upon receiving, from another shared information holding device via the reception unit 257_*j*, a first other device shared information request instruction which requests for first other device shared information, obtains the first other device shared information stored in the other device shared information storage unit 252_*j*. The obtaining unit 267_*j* outputs the obtained first other device shared information to the shared information holding device being the requester, via the transmission unit 256_*j*.

The obtaining unit 267_*j*, upon receiving, from another shared information holding device via the reception unit 257_*j*, a second other device shared information request instruction which requests for second other device shared information, obtains the second other device shared information stored in the other device shared information storage unit 252_*j*. The obtaining unit 267_*j* outputs the obtained second other device shared information to the shared information holding device being the requester, via the transmission unit 256_*j*.

(7) Transmission Unit 256_*j*

The transmission unit 256_*j* transmits the information received from the control unit 250_*j* to the certificate authority device 140 or other shared information holding devices.

(8) Reception Unit 257_*j*

The reception unit 257_*j* outputs the information received from the key distribution device 130, the certificate authority device 140 or other shared information holding devices to the control unit 250_*j*.

1.3.3 Certificate Authority Device 140

Figure 8:
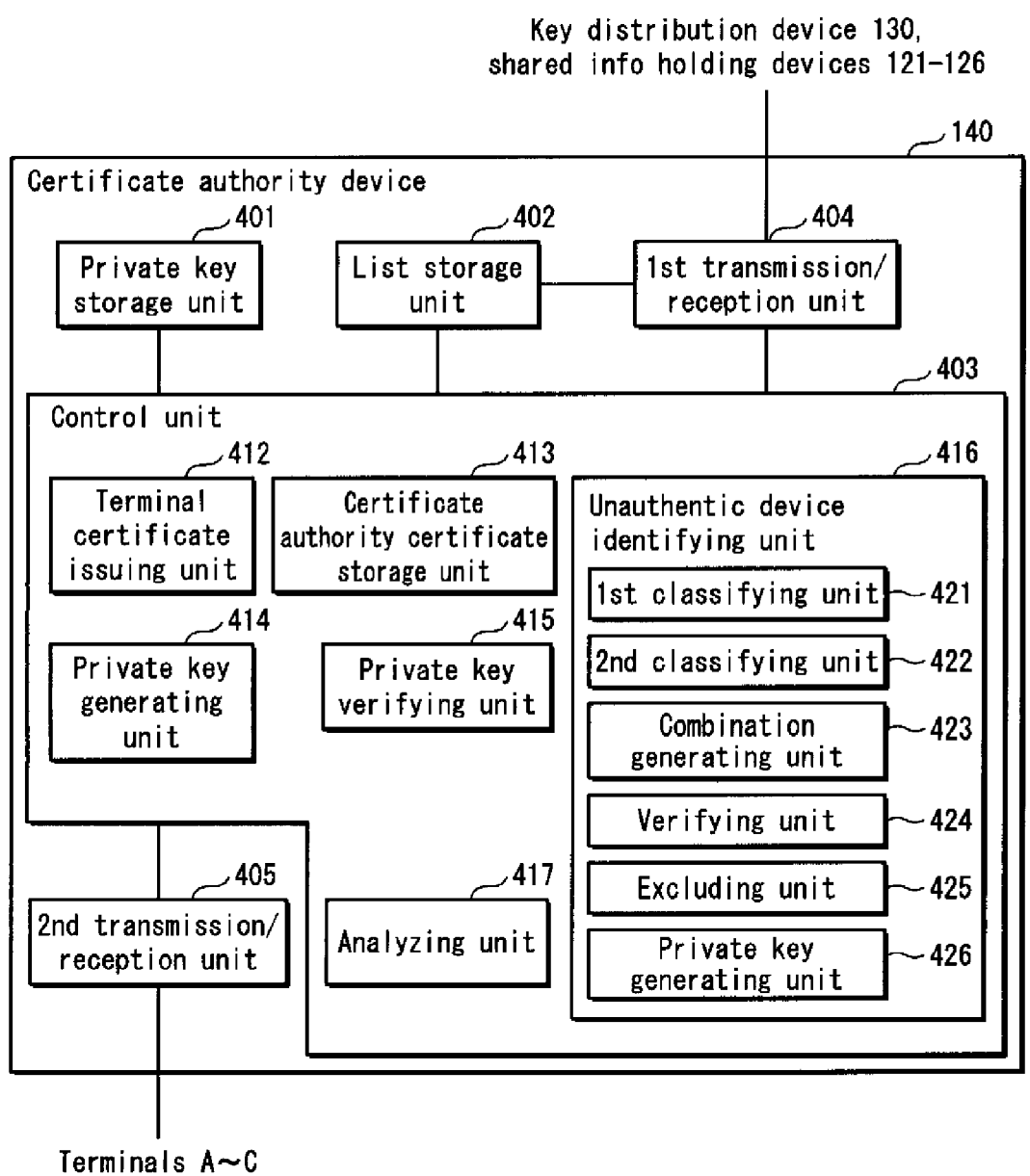
FIG. 8 is a block diagram showing the structure of the certificate authority device 140.

The certificate authority device 140, as shown in FIG. 8, includes a private key storage unit 401, a list storage unit 402, a control unit 403, a first transmission/reception unit 404, and a second transmission/reception unit 405.

The certificate authority device 140 is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes the certificate authority device 140 to achieve its functions.

(1) Private Key Storage Unit 401

The private key storage unit 401 stores a private key of the certificate authority device 140. For example, the private key storage unit 401 stores a private key 141 shown in FIG. 1.

(2) List Storage Unit 402

The list storage unit 402 stores the distribution destination list T100.

(3) Control Unit 403

The control unit 403 controls the operation of the device.

As shown in FIG. 8, the control unit 403 includes a terminal certificate issuing unit 412, a certificate authority certificate storage unit 413, a private key generating unit 414, a private key verifying unit 415, an unauthentic device identifying unit 416, and an analyzing unit 417.

(Terminal Certificate Issuing Unit 412)

The terminal certificate issuing unit 412, upon being requested from any of the terminals A, B and C to issue a certificate, generates a certificate by applying a digital signature to the public key of the terminal by using the private key stored in the private key storage unit 401, and transmits the generated certificate to the terminal being the requester, via the second transmission/reception unit 405.

A conventional technology can be used as it is in the process of issuing the certificate to the terminal, and description thereof is omitted (see, for example, Patent Document 1).

(Certificate Authority Certificate Storage Unit 413)

The certificate authority certificate storage unit 413 stores a certificate of a public key corresponding to the private key stored in the private key storage unit 401. The certificate stored in the certificate authority certificate storage unit 413 is used by other terminals when they verify a certificate.

(Analyzing Unit 417)

The analyzing unit 417, upon receiving a private key leakage notification from an external device (not illustrated), stops issuing the certificate, analyzes the cause of the leakage by checking the log of the own device, and determines a method for recovery. When it determines that the private key needs to be updated, as a result of the analysis, the analyzing unit 417 outputs an instruction for recovering the key, to the private key generating unit 414.

Here, before the process of recovering the key is performed, the operation of the own device and/or the security level may be reviewed, and if some problem is found, the problem may be solved, and the security level may be raised if necessary.

(Private Key Generating Unit 414)

The private key generating unit 414, upon receiving the instruction for recovering the key from the analyzing unit 417, transmits the first request to the shared information holding devices 121-126 via the first transmission/reception unit 404.

The private key generating unit 414 receives the shared information d_1 through d_6 from the shared information holding devices 121-126 via the first transmission/reception unit 404.

The private key generating unit 414 calculates value d' (=d_1+d_2+d_3+d_4+d_5+d_6) from the received shared information (d_1 through d_6). Hereinafter, the value calculated from each piece of shared information may also be referred to as a key candidate value.

(Private Key Verifying Unit 415)

The private key verifying unit 415 transmits the second request to the shared information holding devices 121-126 via the first transmission/reception unit 404. The private key verifying unit 415 receives the certificates from the shared information holding devices 121-126 via the first transmission/reception unit 404.

The private key verifying unit 415 confirms that all of the received certificates are the same, and then verifies whether or not the value d' calculated by the private key generating unit 414 matches the private key d by using the calculated value d' and the certificate. That is to say, the private key verifying unit 415 verifies whether or not the value d' calculated by the private key generating unit 414 is an authentic "new private key".

When all of the received certificates do not have the same value, the private key verifying unit 415 verifies the value d' by using the largest number of certificates having a same value in common among the received certificates, as the authenticate certificates.

When, as a result of the verification, the private key verifying unit 415 confirms that the value d' is an authentic "new private key", the private key verifying unit 415 overwrites the private key stored in the private key storage unit 401 with the new private key, namely, with the value d'. Further, the private key verifying unit 415 overwrites the certificate stored in the certificate authority certificate storage unit 413 with the certificate that was used in the verification.

The private key verifying unit 415 also verifies, by using the received certificate, the key candidate value generated by the unauthentic device identifying unit 416.

The following is a brief description of the verification method.

The private key verifying unit 415, for example, calculates a signature S' (=Sig(d',PK)) corresponding to the public key PK included in the certificate, by using the calculated value d', and judges by comparison whether the signature S' matches the signature S included in the certificate. When they match, the private key verifying unit 415 judges that the value d' calculated by the private key generating unit 414 is an authentic "new private key"; and when they do not match, the private key verifying unit 415 judges that the value d' calculated by the private key generating unit 414 is not an authentic "new private key".

Note that the verification method is not limited to the above-described one. For example, a signature of some data may be created by using a generated private key, and the signature may be verified as an authenticator with use of a public key included in a certificate received from the shared information holding device. Also, in the case of the RSA encryption, an integer "a" may be generated, a private key d may be generated for the integer "a", and it may be checked whether "a^(e×d)=1 mod n" is satisfied by using the private key "d" and a public key (e,n) included in the certificate received from the shared information holding device, as an authenticator.

Also, in the above-description, the certificate is used as an authenticator in the verification. However, not limited to this, for example, a hash value of a private key may be used as the authenticator. In this case, it is possible to verify whether or not an authentic private key was generated by calculating a hash value of the generated private key, and comparing the calculated hash value with the hash value that has been received as the authenticator. Also, a hash value may be calculated for a combination of a plurality of pieces of shared information that were used for generating a private key, and the calculated hash value may be used as the authenticator. In this case, it is possible to verify whether or not the private key was generated from authenticate shared information by comparing the calculated hash value, used as the authenticator, with the received hash value. Note that when any of the above-described authenticators is used, the key distribution device 130 should generate the authenticator and distribute the generated authenticator preliminarily to the shared information holding devices.

(Unauthentic Device Identifying Unit 416)

The unauthentic device identifying unit 416, when the private key verifying unit 415 confirms as a result of verification that the private key is not an authentic "new private key", identifies a shared information holding device from which unauthentic shared information was received.

Now, the operation of this will be described.

As shown in FIG. 8, the unauthentic device identifying unit 416 includes a first classifying unit 421, a second classifying unit 422, a combination generating unit 423, a verifying unit 424, an excluding unit 425, and a private key generating unit 426.

The first classifying unit 421 transmits the third request to the shared information holding devices 121-126 via the first transmission/reception unit 404. The first classifying unit 421 receives, from each of the shared information holding devices 121-126, a shared information group composed of the shared information and the first and second other device shared information held by each shared information holding device. The first classifying unit 421 temporarily stores, in association with each other, (i) each of the shared information and the first and second other device shared information included in the received shared information group, and (ii) transmitter identification information (for example, the device ID) that identifies the shared information holding device that transmitted the shared information group. The first classifying unit 421 generates, based on the contents of the distribution destination list T100 stored in the list storage unit 402, a plurality of groups each of which is composed of the shared information and the first and second other device shared information all of which should be the same value.

The second classifying unit 422 divides each of the groups generated by the first classifying unit 421 into sub-groups for each information having same value.

The combination generating unit 423 generates all combinations for selecting one sub-group from each group.

The verifying unit 424 calculates a key candidate value for each of the generated combinations, and verifies whether or not the calculated key candidate values are each an authentic private key. Note that the verification method used here is the same as the verification method used by the private key verifying unit 415.

The excluding unit 425, when the private key verifying unit 415 verifies that a key candidate value is an authentic private key, associates verification passed identification information with a sub-group that is being selected by the combination at the time, where the verification passed identification information indicates that the verification was passed. That is to say, the verification passed identification information is not attached to unauthentic shared information.

After the generation and verification of the private key are performed for all of the combinations, the excluding unit 425 identifies a shared information holding device which has transmitted the shared information to which the verification passed identification information has not been attached, by using the transmitter identification information corresponding to the shared information holding device.

The private key generating unit 426 obtains six pieces of shared information (d_1 to d_6) from the remaining shared information holding devices after excluding the shared information holding device that was identified as unauthentic by the excluding unit 425, generates an authentic private key by using the obtained six pieces of shared information, and overwrites the private key stored in the private key storage unit 401 with the generated authentic private key. Further, the private key generating unit 426 overwrites the certificate stored in the certificate authority certificate storage unit 413 with the certificate that was used by the verifying unit 424 in the verification.

(Specific Example of Key Generation)

Here, a specific example of a key generation process is described.

The private key generating unit 426 obtains shared information (d_1, d_3, d_4, d_5, d_6) from the shared information holding devices 121, 123-126 that remain after the unauthentic shared information holding device 122 is excluded. To compliment the missing shared information d_2, the private key generating unit 426 obtains the first other device shared information d1_2 held by the shared information holding device 121 or the second other device shared information d2_2 held by the shared information holding device 123.

In this way, the private key generating unit 426 obtains six pieces of shared information (d_1, d_2, d_3, d_4, d_5, d_6).

Note that the method of obtaining the shared information is not limited to the one described above, but may be any method as far as it is possible, with the method, to obtain each piece of shared information that is required to restore a private key, from the shared information holding devices that remain after an unauthentic shared information holding device has been excluded.

(4) First Transmission/Reception Unit 404

The first transmission/reception unit 404 stores the distribution destination list T100 received from the key distribution device 130, into the list storage unit 402.

Upon receiving a distribution destination list after an update from a shared information holding device, the first transmission/reception unit 404 overwrites the distribution destination list stored in the list storage unit 402 with the received distribution destination list after the update.

The first transmission/reception unit 404 outputs information received from each shared information holding device to the control unit 403.

The first transmission/reception unit 404 outputs information received from the control unit 403 to each shared information holding device.

(5) Second Transmission/Reception Unit 405

The second transmission/reception unit 405, upon receiving a request from any of the terminals A, B and C, outputs the received request to the control unit 403, and transmits a certificate generated based on the received request, to the terminal from which the request was received.

1.4 Operation of Certificate Authority System 100

Now, a description is given of the operation of the certificate authority system 100. As described in "1.2.1 Outline of devices" above, the certificate authority system 100 performs the initial design process, the detection process, the analysis/recovery process, the next-round preparation process, the shared information holding device withdrawal process, the shared information holding device addition process.

The certificate authority system 100, during the process of building the system, performs the initial design process in which it distributes the shared information to each shared information holding device. After this, as the certificate authority device 140 performs normal processes such as issuing certificates, the shared information holding devices perform the detection process, monitoring for detection of private key leaks. When a leak of a private key is detected during the detection process, the analysis/recovery process is performed. This is followed by the next-round preparation process, and the control returns to the detection process. When a withdrawal or addition of a shared information holding device is found necessary during the detection process, the shared information holding device withdrawal process or the shared information holding device addition process is performed. After this process is completed, the control returns to the detection process.

Note that all of the above-described processes are not necessarily required, but at least one of the detection process, the analysis/recovery process, the withdrawal process, and the addition process may be included. Furthermore, both the detection process and the analysis/recovery process are not necessarily required, but a process may be provided so that, when a trigger is given from outside, the recovery and recovery verification are performed.

Here, the six processes will be described.

1.4.1 Initial Design Process

Figure 9:
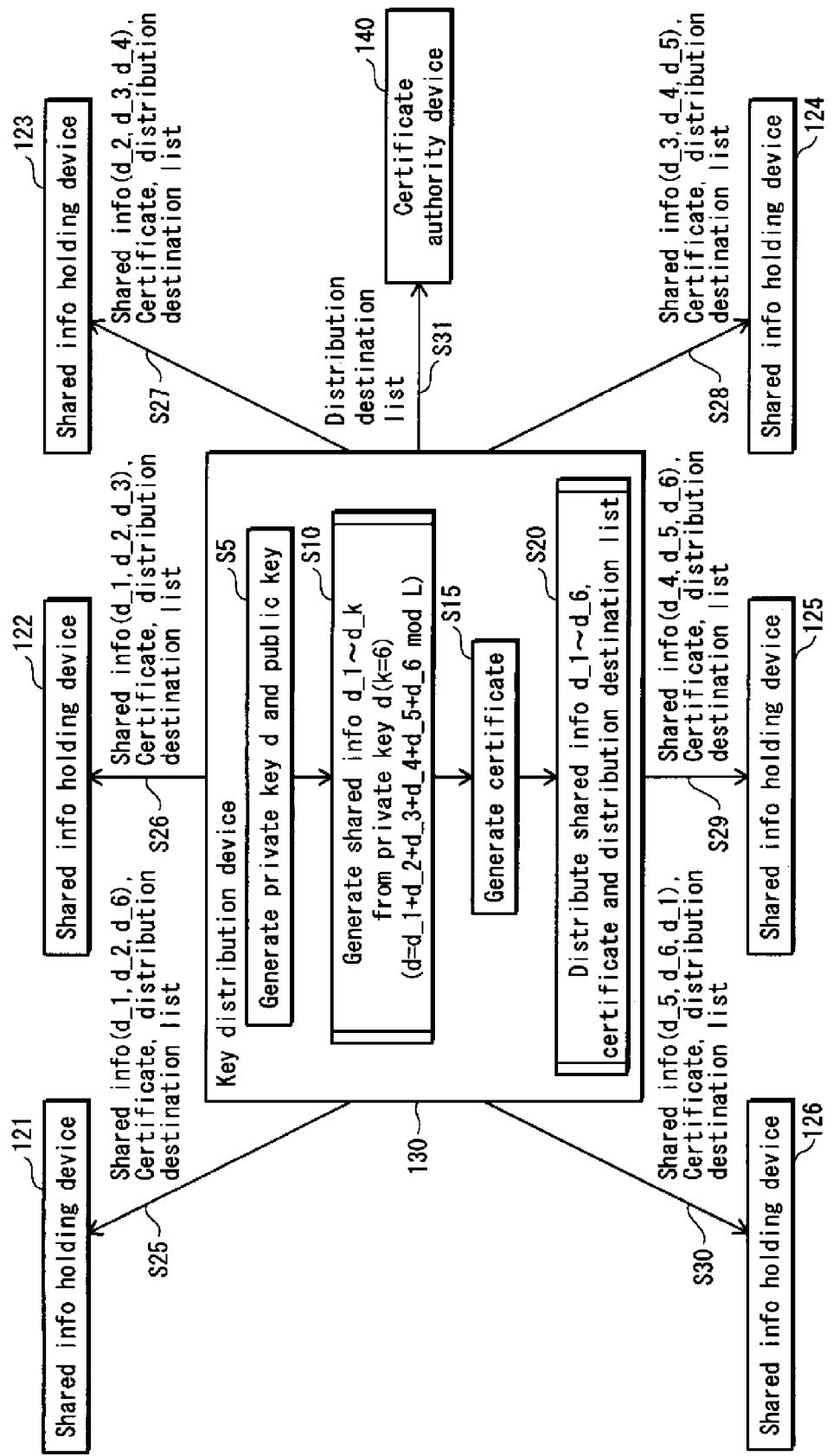
FIG. 9 is a flow diagram showing the operational flow of the initial design process.

The initial design process performed in the certificate authority system 100 will be described with reference to the flow diagram shown in FIG. 9.

The initial design process is performed before the security of the certificate authority system 100 is disrupted.

The key pair generating unit 301 of the key distribution device 130 generates a key pair (public key PK, private key d) in conformance with the public key encryption (step S5).

The private key dividing unit 304 generates shared information (d_1, d_2, d_3, d_4, d_5, d_6) from the private key d generated by the key pair generating unit 301, by the secret sharing method (step S10). In other words, the private key dividing unit 304 divides the private key d into shared information (d_1, d_2, d_3, d_4, d_5, d_6).

The certificate generating unit 302 generates, as an authenticator to be used for verifying whether or not a private key was generated authentically, a certificate for the public key PK generated by the key pair generating unit 301, by using the private key d (step S15).

The key distribution device 130 uses the certificate distributing unit 303 and the shared information distributing unit 305 to distribute information to the shared information holding devices 121-126 and the certificate authority device 140, the information including any of the certificate, six pieces of shared information, and the distribution destination list T100 that should be held by each of the devices (step S20).

More specifically, the key distribution device 130 distributes shared information (d_i, d_(i+1), d_(i−1)), the certificate, and the distribution destination list T100 to the i (i=1 to 6)$^{th}$ shared information holding device (steps S25 through S30). Also, the key distribution device 130 distributes only the distribution destination list T100 to the certificate authority device 140 (step S31). Note that, in the case of i+1=7, i=1; and in the case of i−1=0, i=6.

Lastly, the key deleting unit 306 deletes the keys generated by the key pair generating unit 301, and the shared information generated from the private key.

1.4.2 Shared Information Generation Process

Figure 10:
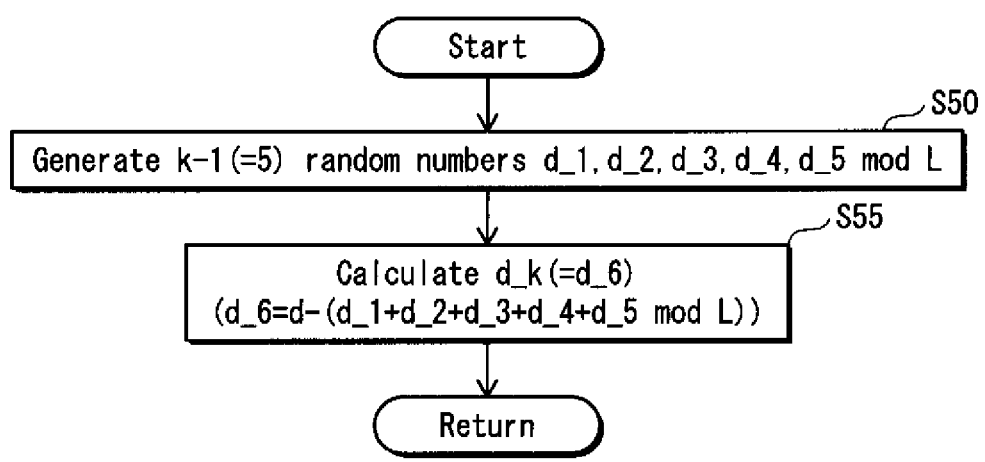
FIG. 10 is a flow diagram showing the operational flow of the process of generating a plurality of pieces of shared information from a private key.

Here, the process of generating shared information performed in step S10 of FIG. 9 will be described with reference to the flowchart shown in FIG. 10.

The private key dividing unit 304 generates shared information d_1, d_2, d_3, d_4, d_5 by generating (k−1) (=5) pieces of random numbers, using a random number generator (step S50).

The private key dividing unit 304 calculates d_k (=d__6) based on the following equation (step S55).

$$d\_k = d - (d\_1 + d\_2 + d\_3 + d\_4 + d\_5)$$

Here, a negative value may be obtained as a result of a subtraction. However, the obtained negative value is treated as shared information as it is.

1.4.3 Distribution Process

Here, the process of distributing the shared information, the certificate, and the distribution destination list T100 performed in step S20 of FIG. 9 will be described with reference to the flowchart shown in FIG. 11.

The shared information distributing unit 305 repeats the steps S100 through S130 while i takes value 1 to 6 under the control of the repeat control unit 355.

The shared information selecting unit 352 selects shared information d_i, the $i^{th}$ shared information, among shared information (d__1, d__2, d__3, d__4, d__5, d__6) which were generated by the private key dividing unit 304 (step S105).

The device selecting unit 353 selects the $i^{th}$ shared information holding device based on the contents of the device information list T200 (step S110). More specifically, the device selecting unit 353 selects a device ID associated with the $i^{th}$ shared information holding device from the device information list T200.

Also, the device selecting unit 353 selects the $(i-1)^{th}$ shared information holding device and the $(i+1)^{th}$ shared information holding device based on the contents of the device information list T200 (step S115). More specifically, the device selecting unit 353 selects device IDs (ID_(i-1), ID_(i+1)) respectively associated with the $(i-1)^{th}$ and $(i+1)^{th}$ shared information holding devices from the device information list T200. Here, when i+1=7, the device selecting unit 353 selects the first shared information holding device. Also, when i-1=0, the device selecting unit 353 selects the sixth shared information holding device.

The device selecting unit 353 adds, into the distribution destination list T100, the device ID of the $i^{th}$ shared information holding device as the own device ID, the device ID of the $(i+1)^{th}$ shared information holding device as the first other device ID, and the device ID of the $(i-1)^{th}$ shared information holding device as the second other device ID (step S120).

The output unit 354 distributes the shared information d_i selected by the shared information selecting unit 352 to each of the $i^{th}$, $(i-1)^{th}$, and $(i+1)^{th}$ shared information holding devices selected by the device selecting unit 353 (step S125). Here, the output unit 354 distributes the shared information d_i as the shared information assigned to the own device, to the $i^{th}$ shared information holding device. Also, the output unit 354 distributes the shared information d_i (=d1_i) as the first other device shared information, to the $(i+1)^{th}$ shared information holding device; and distributes the shared information d_i (=d2_i) as the second other device shared information, to the $(i-1)^{th}$ shared information holding device.

After distributing all shared information, the output unit 354 distributes the distribution destination list T100 generated by the device selecting unit 353 to the shared information holding devices 121-126 and the certificate authority device 140 via the transmission unit 307 (step S135).

The certificate distributing unit 303 outputs the certificate generated by the certificate generating unit 302 to the shared information holding devices 121-126 (step S140).

1.4.4 Detection Process

Upon receiving a request for issuing a certificate from a terminal, the certificate authority device 140 issues a certificate to the terminal. More specifically, the certificate authority device 140 uses the terminal certificate issuing unit 412 to generate a certificate by applying a signature with use of a private key stored in the private key storage unit 401, and sends the generated certificate to the terminal. Also, the certificate authority device 140 holds, in the certificate authority certificate storage unit 413, a certificate of a public key for the private key it holds, and transmits the certificate when the certificate authority device 140 receives a request for the certificate from the terminal.

The analyzing unit 417 of the certificate authority device 140 performs a communication with an external device (not illustrated) to check, on a regular basis while the certificate authority system 100 is operated as described above, whether or not the private key 141 has been leaked.

1.4.5 Analysis/Recovery Process

The analyzing unit 417, upon receiving a private key leakage notification from an external device (not illustrated), stops issuing the certificate, analyzes the cause of the leakage by checking the log of the own device, and determines whether to perform a key recovery process.

When it determines, as a result of the analysis, that the private key needs to be updated, the analyzing unit 417 outputs an instruction for recovering the key, to the private key generating unit 414.

The private key generating unit 414, upon receiving the instruction for recovering the key from the analyzing unit 417, starts the key recovery process.

Figure 12:
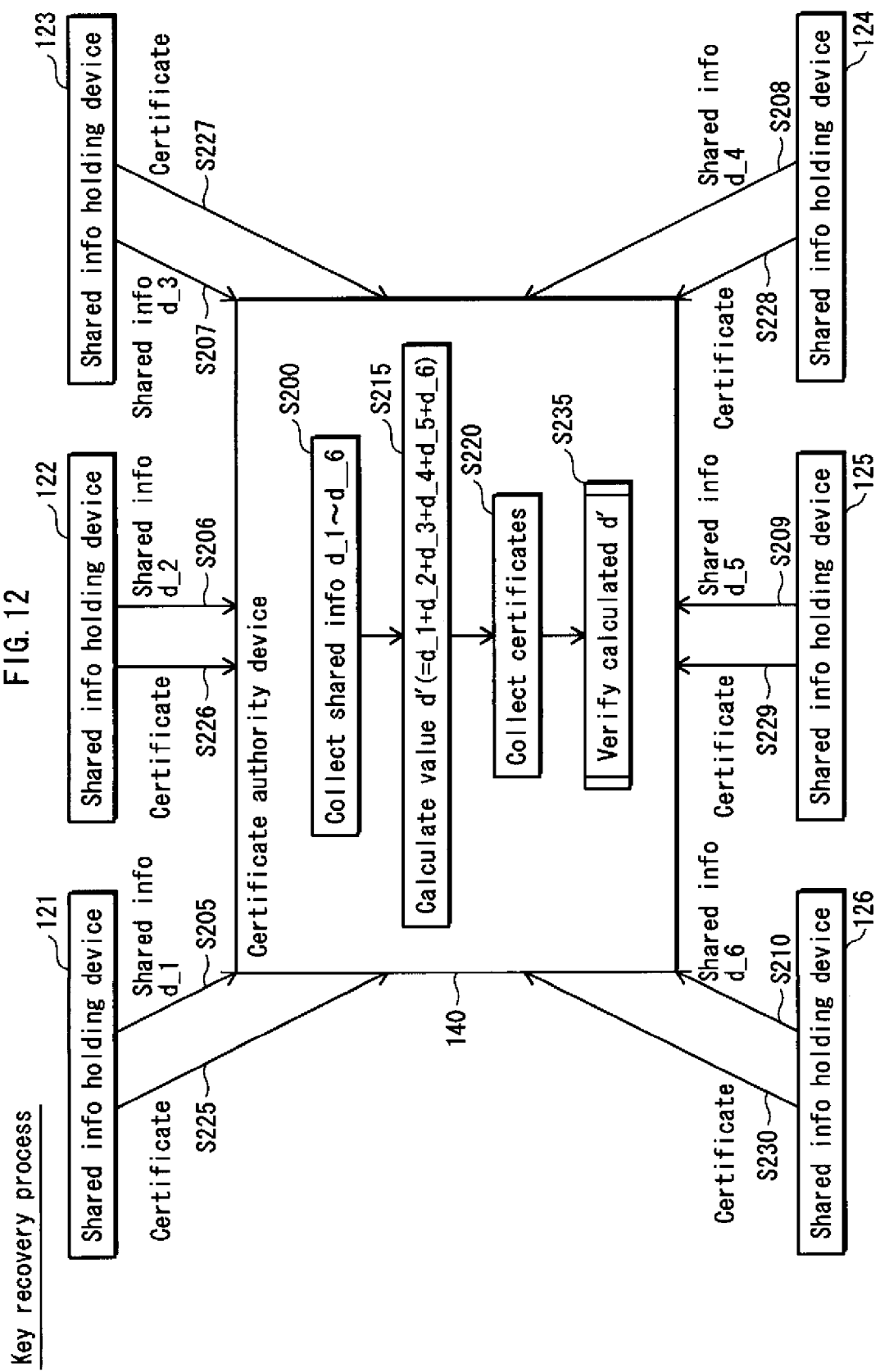
FIG. 12 is a flow diagram showing the operational flow of the key recovery process.

The key recovery process will be described with reference to the flow diagram shown in FIG. 12.

Upon receiving the instruction for recovering the key from the analyzing unit 417, the private key generating unit 414 outputs the first request to the shared information holding devices 121-126 to collect the shared information (d__1 through d__6) from the shared information holding devices 121-126 (step S200).

The shared information holding devices 121-126 output the shared information they hold, to the certificate authority device 140 (steps S205 through S210). More specifically, the $i^{th}$ shared information holding device outputs shared information d_i to the certificate authority device 140.

The private key generating unit 414 calculates value d' (=d__1+d__2+d__3+d__4+d__5+d__6) from the collected shared information (d__1 through d__6) (step S215).

The private key verifying unit 415 outputs the second request to the shared information holding devices 121-126, and collects the certificates respectively from the shared information holding devices 121-126 (step S220).

The shared information holding devices 121-126 output the certificates they hold, to the certificate authority device 140 (steps S225 through S230).

The private key verifying unit 415 confirms that all of the received certificates are the same, and then verifies whether or not the value d' calculated by the private key generating unit 414 matches the private key d by using the calculated value d' and the certificate. That is to say, the private key verifying unit 415 verifies whether or not the value d' calculated by the private key generating unit 414 is an authentic "new private key" (step S235). When all of the received certificates do not have the same value, the private key verifying unit 415 verifies the value d' by using the largest number of certificates having a same value in common among the received certificates, as the authenticate certificates.

Here, the process of verifying the calculated value (the key verification process) in step S235 of FIG. 12 will be described.

(Key Verification Process)

Figure 13:
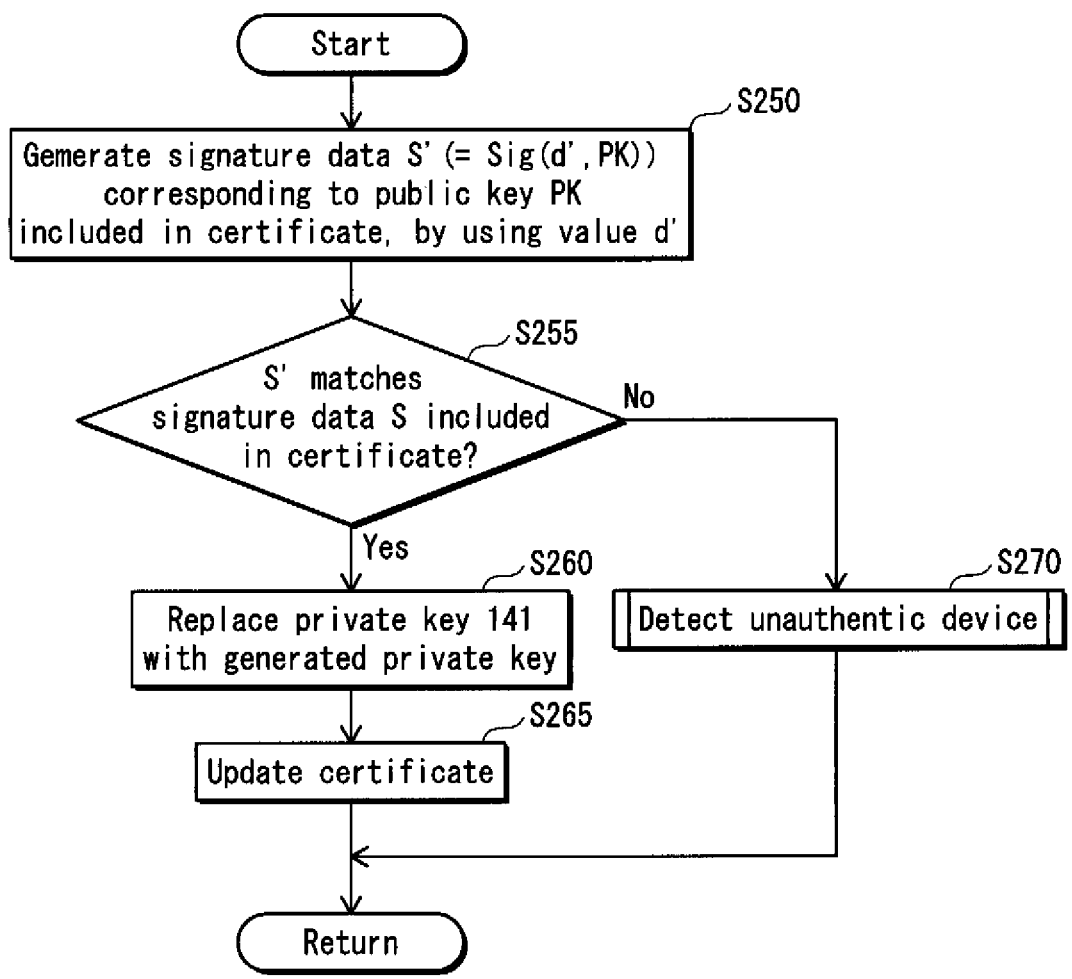
FIG. 13 is a flow diagram showing the operational flow of verifying the calculated value.

The Key verification process will be described with reference to the flowchart shown in FIG. 13.

The private key verifying unit 415 generates a signature S' (=Sig(d',PK)) corresponding to the public key PK included in the certificate, by using the calculated value d' (step S250).

The private key verifying unit 415 judges by comparison whether the signature S' matches the signature S included in the certificate (step S255).

When it judges that the signature S' matches the signature S (YES in step S255), the private key verifying unit 415 judges that the value d' calculated by the private key generating unit 414 is an authentic "new private key", and replaces the private key stored in the private key storage unit 401 with the new private key, namely, with the value d' (step S260). The private key verifying unit 415 replaces the certificate stored in the certificate authority certificate storage unit 413 with the certificate that was used in the verification (step S265).

When it judges that the signature S' does not match the signature S (NO in step S255), the unauthentic device identifying unit 416 performs the unauthentic device detection process (step S270).

(Unauthentic Device Detection Process)

Figure 14:
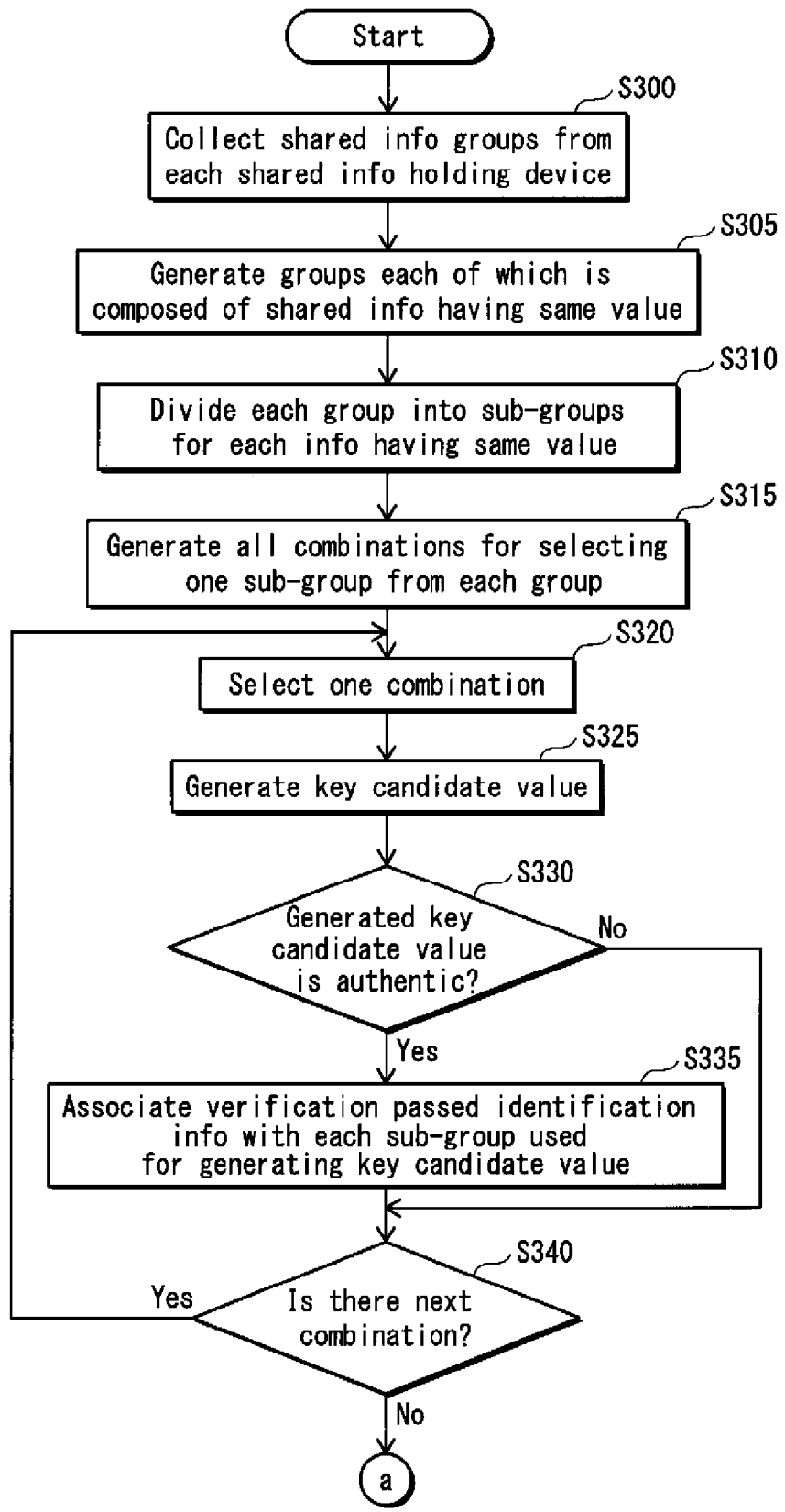
FIG. 14 is a flow diagram showing the operational flow of the unauthentic device detection process, continued to FIG. 15.
Figure 15:
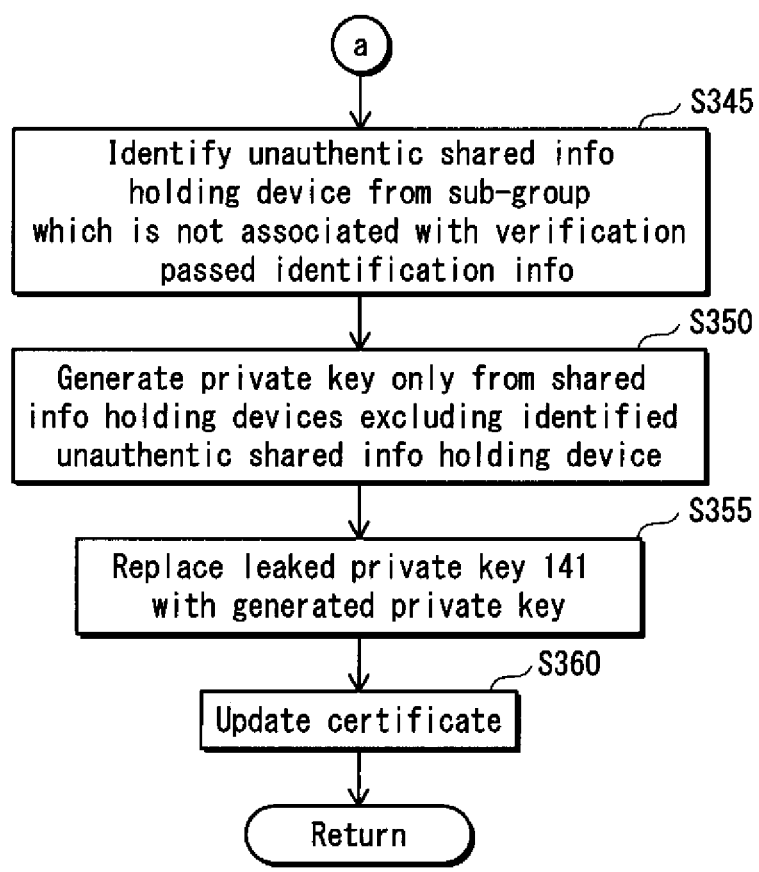
FIG. 15 is a flow diagram showing the operational flow of the unauthentic device detection process, continued from FIG. 14.

Here, the unauthentic device detection process performed in step S270 of FIG. 13 will be described with reference to the flowcharts shown in FIGS. 14 and 15.

The first classifying unit 421 of the unauthentic device identifying unit 416 outputs the third request to the shared information holding devices 121-126 to collect the shared information groups from the shared information holding devices 121-126 (step S300). Here, upon receiving the shared information groups from the shared information holding devices 121-126, the unauthentic device identifying unit 416 associates the transmitter identification information with each information included in the received shared information groups.

The first classifying unit 421 generates, based on the contents of the distribution destination list T100 stored in the list storage unit 402, a plurality of groups each of which is composed of the shared information and the first and second other device shared information all of which should be the same value (step S305).

The second classifying unit 422 divides each of the groups generated by the first classifying unit 421 into sub-groups for each information having same value (step S310).

The combination generating unit 423 generates all combinations for selecting one sub-group from each group (step S315).

The verifying unit 424 selects one combination (step S320).

The verifying unit 424 generates a key candidate value for the selected combination (step S325), and verifies whether or not the calculated key candidate value is authentic (step S330). Note that the verification method used in step S330 is the same as the verification method used in steps S250 and S255 shown in FIG. 13.

When the verifying unit 424 verifies that the key candidate value is authentic, namely, an authentic private key (YES in step S330), the excluding unit 425 associates verification passed identification information with a sub-group that is being selected by the combination at the time, where the verification passed identification information indicates that the verification was passed (step S335).

The verifying unit 424 judges whether or not there is a next combination (step S340).

When the verifying unit 424 judges that there is a next combination (YES in step S340), the control returns to step S320.

When the verifying unit 424 judges that there is no next combination (NO in step S340), the excluding unit 425 identifies an unauthentic shared information holding device from a sub-group which is not associated with the verification passed identification information (step S345).

The private key generating unit 426 generates an authentic private key by using the shared information obtained from the shared information holding devices excluding the unauthentic shared information holding device identified by the excluding unit 425 (step S350).

The private key generating unit 426 overwrites the private key stored in the private key storage unit 401 with the generated private key (step S355). The private key generating unit 426 overwrites the certificate stored in the certificate authority certificate storage unit 413 with the certificate that was used in the verification (step S360).

When the verifying unit 424 judges that the key candidate value is not authentic (NO in step S330), the control moves to step S340.

Specific Example

To identify an unauthentic shared information holding device, the unauthentic device identifying unit 416 uses both (i) the shared information held by each shared information holding device and (ii) the shared information that the plurality of shared information holding devices have in common. Here, a specific example of the method for identifying an unauthentic shared information holding device will be described with reference to FIGS. 16 and 17.

It is presumed here that the shared information and the first and second other device shared information held by the shared information holding device 122 have been tampered with and changed to unauthentic values (f__2, f1__3, f2__1).

The unauthentic device identifying unit 416 collects shared information groups 501-506 from the shared information holding devices 121-126, respectively, and associates the device IDs with each information included in the collected shared information groups 501-506.

Figure 16:
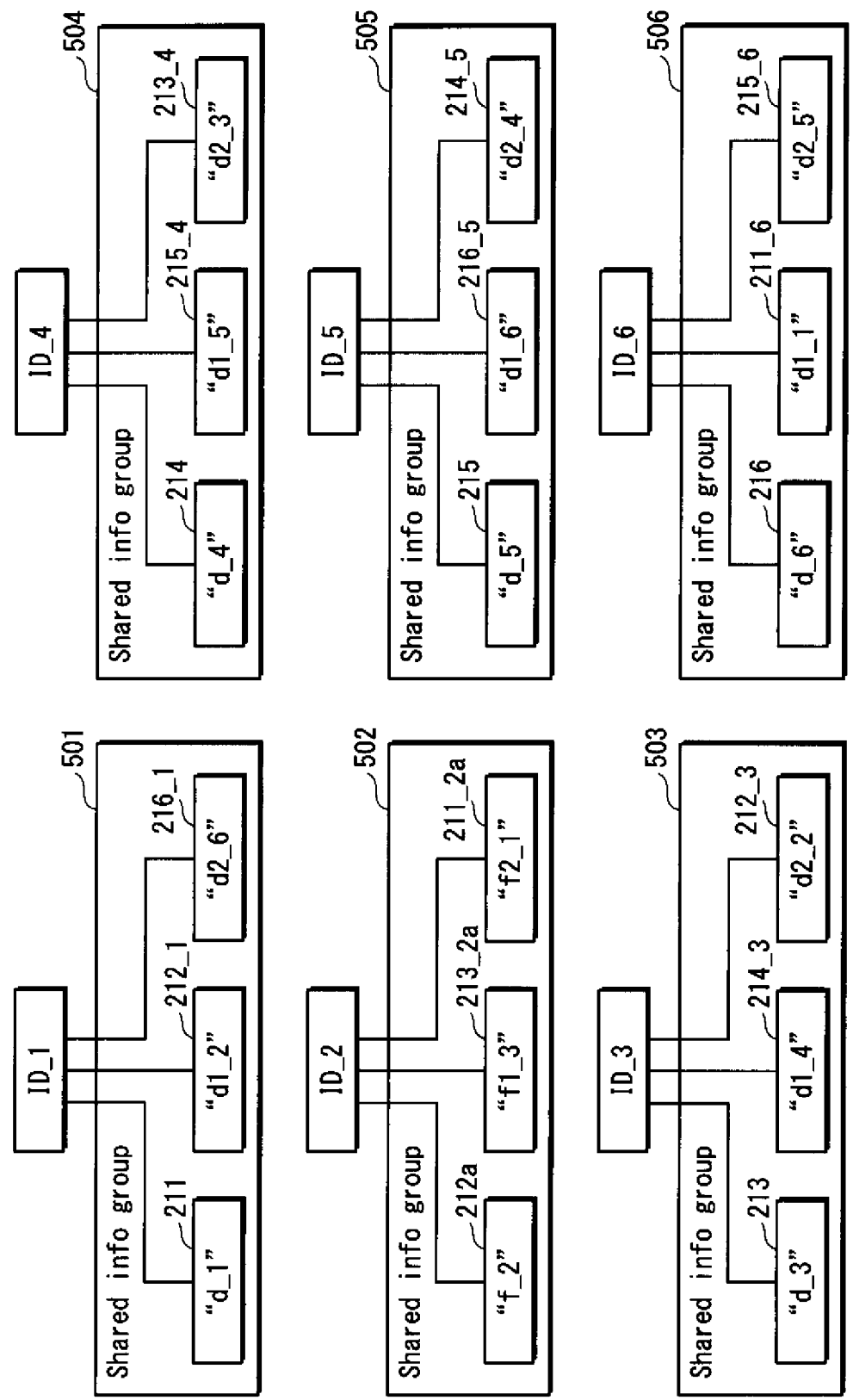
FIG. 16 shows the shared information groups collected by the unauthentic device identifying unit 416 from the shared information holding devices.

FIG. 16 shows the results thereof. The results indicate, for example, that the unauthentic device identifying unit 416 received the shared information group 501 from the shared information holding device 121, and therefore device ID "ID__1", as the transmitter identification information for identifying the transmitter thereof, is associated with shared information 211, 212_1, and 216_1. Similarly, each device ID is associated with the other shared information groups.

The unauthentic device identifying unit 416 refers to the distribution destination list T100 to generate six groups each of which is composed of three pieces of information that should be the same value. For example, shared information "d__1" 211 should be the same as the second other device shared information "f2__1" 211_2a and the first other device shared information "d1__1" 211_6. The unauthentic device identifying unit 416 therefore generates a group 511 that is composed of the shared information "d__1" 211, the second other device shared information "f2__1" 211_2a and the first other device shared information "d1__1" 211_6. Similarly, groups 512-516 are generated with respect to the shared information "d__2" 212 through "d__6" 216.

The unauthentic device identifying unit 416 generates sub-groups composed of the same value from each of the groups 511-516. For example, the unauthentic device identifying unit 416 generates sub-groups 511_1 and 511_2 from the group 511, where the sub-group 511_1 is composed of only the second other device shared information "f2__1" 211_2a, and the sub-group 511_2 is composed of the shared information "d__1" 211 and the first other device shared information "d1__1" 211_6.

Figure 17:
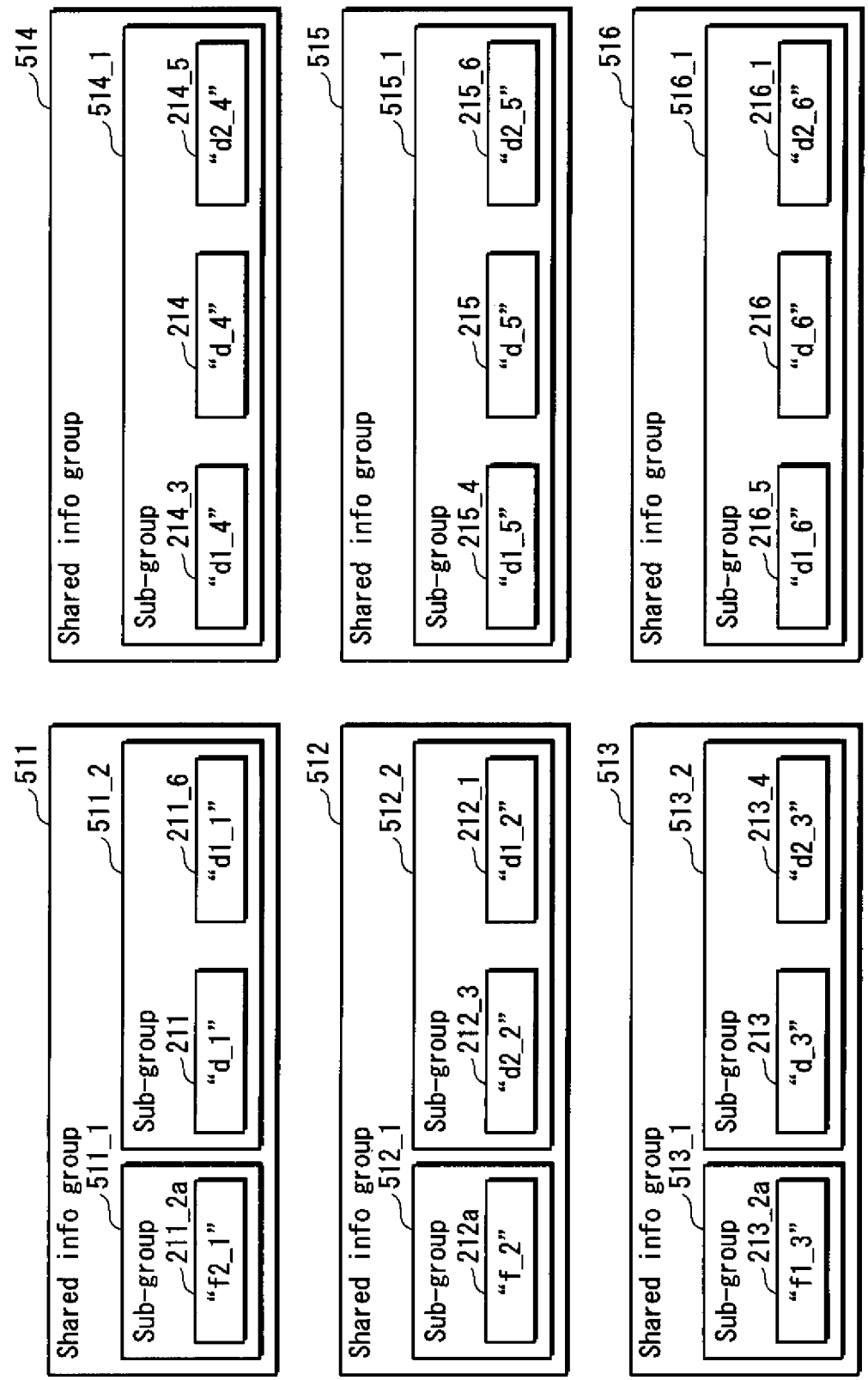
FIG. 17 shows groups generated from the collected shared information groups, and sub-groups generated from the groups.

FIG. 17 shows the groups 511-516 generated in this way and the sub-groups generated from the groups 511-516.

In this example, the shared information holding device 122 transmits unauthentic values. Therefore, the shared information 212a and the other device shared information 211_2a and 213_2a received from the shared information holding device 122 are different from the value which they should be. Therefore, each of the groups 511-513 is divided into two sub-groups. On the other hand, only one sub-group is generated from each of the groups 514-516 since each of the groups 514-516 includes three pieces of shared information that are the same value.

Note that FIG. 17 shows merely one example of division of groups into sub-groups, and in the actuality, the division of groups into sub-groups would vary depending on which and how shared information holding device operates in an unauthentic manner.

After the division of groups into sub-groups, the unauthentic device identifying unit 416 generates all combinations for selecting one sub-group from each of the groups 1-6. The unauthentic device identifying unit 416 then uses the private key generating unit 414 to generate a private key for each of the generated combinations, and uses the private key verifying unit 415 to verify whether an authentic private key has been generated.

After the verification is performed for all of the combinations, the unauthentic device identifying unit 416 excludes the shared information that are included in the sub-groups to which the verification passed identification information has been attached. The shared information that remain without being excluded are unauthentic values. The shared information holding device that transmitted the unauthentic shared information is then identified from the transmitter identification information that is associated with the unauthentic shared information. The shared information holding device identified in this way is the unauthentic device that transmitted the unauthentic shared information.

In the example shown in FIG. 17, authentic private keys are generated from sub-groups 511_2, 512_2, 513_2, 514_1, 515_1, and 516_1. It can be determined from this that the shared information pieces included in sub-groups 511_1, 512_1, and 513_1, which remain after these sub-groups are excluded, are unauthentic shared information. These unauthentic shared information have all been transmitted from the shared information holding device 122, and thus it can be determined that the shared information holding device 122 is the unauthentic shared information holding device.

With the above-described process, the certificate authority device 140 can identify an unauthentic shared information holding device, restore a "new private key" by using only the shared information pieces that were received from shared information holding devices excluding the unauthentic shared information holding device, and recover the function of the certificate authority device 140.

Suppose here that the shared information 212a transmitted from the shared information holding device 122 is the only unauthentic value, and the first and second other device shared information "d1__3" 213_2 and "d2__1" 211_2 transmitted therefrom are authentic. In this case, two sub-groups are generated from only the group 512. Namely, sub-groups 512_1 and 512_2 are generated from the group 512, where the sub-group 512_1 is composed of only the shared information 212a, and the sub-group 512_2 is composed of the shared information 212_1 and 212_3. And, only one sub-group is generated from each of the remaining groups. Therefore, after the shared information pieces included in the sub-groups, from which an authentic "new private key" is generated, are excluded, only the shared information 212a remains. Thus, the shared information holding device 122 that transmitted the shared information 212a is identified as the unauthentic shared information holding device. In the above-described structure where three shared information holding devices have in common the same piece of shared information, when all of the three shared information holding devices operate in an unauthentic manner, it is impossible to restore an authentic "new private key".

Also, in the above-described structure, each group composed of a plurality of pieces of shared information having the same value is further divided into sub-groups having the same value, and then combinations are generated. In this case, when compared with a case where division of groups into sub-groups is not performed, the number of combination to be generated is reduced. It is therefore possible to reduce the number of times the private key is generated and the verification is performed by using the generated combinations.

Note that the method of identification performed by the unauthentic device identifying unit 416 is not limited to the above-described one. For example, a "new private key" may be generated from a plurality of pieces of shared information excluding shared information held by one shared information holding device. With this structure, it is possible to identify the excluded shared information holding device as unauthentic if the "new private key" is restored correctly. Similarly, a "new private key" may be generated from a plurality of pieces of shared information excluding shared information held by two shared information holding devices. With this structure, it is possible to identify at least one of the two excluded shared information holding devices as unauthentic if the "new private key" is restored correctly.

1.4.6 Next-Round Preparation Process

The private key may be leaked even after the function is recovered in the analysis/recovery process performed by the certificate authority device 140. In preparation for such a case, the next-round preparation process is performed to embed the shared information into the shared information holding devices 121-126 for the next private key recovery.

The next-round preparation process is performed in the same manner as the initial design process. Namely, the key distribution device 130 performs the processes of generating a key pair, generating the shared information from the private key, generating a certificate of the public key, and distributing generated shared information and certificate to the shared information holding devices.

Here, the shared information holding device that was identified as unauthentic in the analysis/recovery process may be excluded from the system by not distributing the shared information to the unauthentic device.

In the present embodiment, the key distribution device 130 that was used in the initial design process performs the next-round preparation process. However, not limited to this, the next-round preparation process may be performed by a key distribution device that is different from the one that was used in the initial design process. Alternatively, the shared information may be generated from a plurality of "new private keys" and the generated shared information may be stored in the shared information holding devices in the initial design process. This eliminates the necessity for distributing the shared information in the next-round preparation process. In this case, the order in which a plurality of pieces of shared information are used may be specified in the initial design process, or round identifiers may be attached in the initial design process and in the next-round preparation process, a piece of shared information attached with the round identifier for the next round may be specified as the shared information to be used in the next round.

1.4.7 Withdrawal Process

Here, the withdrawal process will be described with reference to the flowchart shown in FIG. 18.

In the withdrawal process, in view of the possibility that a shared information holding device may operate in an unauthentic manner, it is always verified whether or not the data transferred between the shared information holding devices is authentic so that a shared information holding device operating in an unauthentic manner can be detected. Furthermore, in the withdrawal process, when a value of the shared information needs to be updated, the value of the shared information before update is saved, and the withdrawal process is stopped when a shared information holding device operating in an unauthentic manner is detected during the withdrawal process, and the value of the shared information is returned to the value before the update, preventing the shared information from becoming an unauthentic value.

Also, in the withdrawal process, it is presumed that a shared information holding device having the same shared information as the withdrawal target shared information holding device generates and distributes the shared information. With such a structure, the shared information can be updated even if the withdrawal target shared information holding device does not perform the withdrawal process, and this can be applied to, for example, a process for invalidating the shared information holding device operating in an unauthentic manner.

In is presumed in the following process that the withdrawal target shared information holding device is the shared information holding device 121, and that the partial information is generated by the shared information holding device 126.

The shared information holding device 126 of the certificate authority system 100 receives, from an external device (not illustrated), an instruction for generating partial information for withdrawal, the instruction instructing that the partial information should be generated from other device shared information that is the same as the shared information "d__1" held by the withdrawal-target shared information holding device 121.

The shared information holding device 126 generates five pieces of partial information from the first other device shared information "d1__1", and distributes the generated partial information (step S400). In other words, the shared information holding device 126 divides the first other device shared information "d1__1" into five pieces of partial information.

The shared information holding device 122, which should have the same information as the first other device shared information "d1__1" held by the shared information holding device 126, verifies the first other device shared information "d1__1" used for the partial information (step S405).

The shared information holding devices 121-126 perform the first and second update processes during the withdrawal process to update the shared information and the first and second other device shared information that the shared information holding devices 121-126 hold, respectively (steps S410, S415).

The shared information holding devices 121-126 judge whether or not the update has been performed normally (step S420). The shared information holding devices 121-125 then send judgment result to the shared information holding device 126 which transmitted the partial information. More specifically, shared information holding devices that have a same piece of shared information in common use the shared information verifying unit 262__j and the other device shared information verifying unit 263__j to send the shared information of their own to each other over a secured transmission path, and verify whether or not the received shared information is the same as the shared information held by the own device, thereby confirming whether or not the shared information held by the two devices have been updated to the same value. The shared information holding devices 121-126 notify the verification results to the shared information holding device 126, which temporarily holds the received verification results.

When it is judged that the update has been performed normally in all devices (YES in step S420), the shared information holding device 126 updates the distribution destination list T100. The shared information holding device 126 stores the distribution destination list after update into the list storage unit 254_6, and transmits it to the shared information holding devices 122-125 and the certificate authority device 140. The shared information holding devices 122-125 and the certificate authority device 140 replace the currently stored distribution destination list with the after-update distribution destination list (step S425).

When it is judged that the update has not been performed normally in all devices (NO in step S420), the shared information holding device 126 notifies the shared information holding devices 122-125 of it. The shared information holding device 126 and the shared information holding devices 122-125 having received the notification stop the withdrawal process, return the values of the shared information of the own devices to the values before the withdrawal process, and end the process.

It has been described above that the devices send the shared information to each other over a secured transmission path, and verify whether or not the received shared information is the same as the shared information held by the own device. However, not limited to this structure, the verification may be performed with use of an encryption protocol such as the zero-knowledge proof. The zero-knowledge proof and the encryption protocol are explained in detail in Non-Patent Document 1, pages 132-150 and pages 224-225, respectively.

The following describes each process performed in steps S400 through S415.

(Partial Information Generation Process)

Here, the partial information generation process performed in step S400 of FIG. 18 will be described with reference to the flow diagram shown in FIG. 19.

The shared information dividing unit 261_6 of the shared information holding device 126 generates five pieces of partial information (d__1__1 through d__1__5) from the first other device shared information "d1__1" 211_6 (step S450). During this process, each piece of partial information should satisfy the following equation.

$$d1\_1 = d\_1\_1 + d\_1\_2 + d\_1\_3 + d\_1\_4 + d\_1\_5 \mod L \quad \text{(Equation)}$$

More specifically, the shared information dividing unit 261_6 generates (k−2) (=4) pieces of random numbers by using a random number generator, thereby generating partial information (d__1__1 through d__1__4). Next, the shared information dividing unit 261_6 generates d__1__5 based on the following equation.

$$d\_1\_5 = d1\_1 - (d\_1\_1 + d\_1\_2 + d\_1\_3 + d\_1\_4)$$

Note that, although a negative value may be obtained as a result of such a subtraction, the obtained negative value is treated as partial information as it is.

The shared information dividing unit 261_6 assigns a different piece of partial information to each group of pieces of shared information of a same value, except for the shared information "d_1" held by the withdrawal target device (in this example, the shared information holding device 121) and the information "d1_1" and "d2_1" that should be the same value as the shared information "d_1". More specifically, the shared information dividing unit 261_6 assigns partial information d_1_i to shared information d_(i+1).

The shared information dividing unit 261_6 distributes two or three pieces of partial information to each distribution-destination shared information holding device, based on the contents of the distribution destination list T100 (step S455). Note that the 261_j distributes two pieces of partial information to the own device by outputting the two pieces of partial information to the shared information updating unit 260_j.

More specifically, the shared information dividing unit 261_6 distributes each piece of partial information as follows.

The shared information dividing unit 261_6 transmits partial information d_1_1 and d_1_2 to the shared information holding device 122 (step S460). The shared information dividing unit 261_6 transmits partial information d_1_1, d_1_2, and d_1_3 to the shared information holding device 123 (step S461). The shared information dividing unit 261_6 transmits partial information d_1_2, d_1_3, and d_1_4 to the shared information holding device 124 (step S462). The shared information dividing unit 261_6 transmits partial information d_1_3, d_1_4, and d_1_5 to the shared information holding device 125 (step S463). The shared information dividing unit 261_6 transmits partial information d_1_4 and d_1_5 to the shared information updating unit 260_6 so that it is temporarily stored. The $i^{th}$ shared information holding device temporarily stores the received partial information into the shared information updating unit 260_j.

(Shared Information Verification Process)

Here, the shared information verification process performed in step S405 of FIG. 18 will be described with reference to the flow diagram shown in FIG. 20.

To verify whether or not shared information 211_6 is an authentic value, the second other device shared information 211_2 held by the shared information holding device 122 is used.

Upon receiving the partial information verifying instruction from the shared information holding device 126 via the reception unit 257_j, the partial information verifying unit 264_2 collects partial information d_1_2, d_1_3, d_1_4, and d_1_5 from the devices 123, 124, and 125 excluding the shared information holding device 121 (step S470).

More specifically, the $i^{th}$ shared information holding device outputs partial information d_1_(i−1) to the shared information holding device 122 (steps S471 through S474).

The partial information verifying unit 264_2 obtains a value s' by adding d_1_1 stored in the shared information updating unit 260_j and the received partial information d_1_2, d_1_3, d_1_4, and d_1_5, and verifies whether or not the obtained value s' is authentic (step S480). More specifically, the partial information verifying unit 264_2 verifies whether or not the obtained value s' matches the second other device shared information "d2_1" stored in the other device shared information storage unit 252_j.

The partial information verifying unit 264_2 notifies the shared information holding devices 123-126 of the verification result (step S485). More specifically, when it judges that the obtained value s' matches the second other device shared information "d2_1", the partial information verifying unit 264_2 notifies the shared information holding devices 123-126 that the obtained value s' matches the second other device shared information "d2_1"; and when it judges that the obtained value s' does not match the second other device shared information "d2_1", the partial information verifying unit 264_2 notifies the shared information holding devices 123-126 that the obtained value s' does not match the second other device shared information "d2_1" (steps S486 through S489). Note that the partial information verifying unit 264_2 outputs the verification result to the shared information updating unit 260_j to notify the own device of the result.

(First Update Process During Withdrawal Process)

Figure 21:
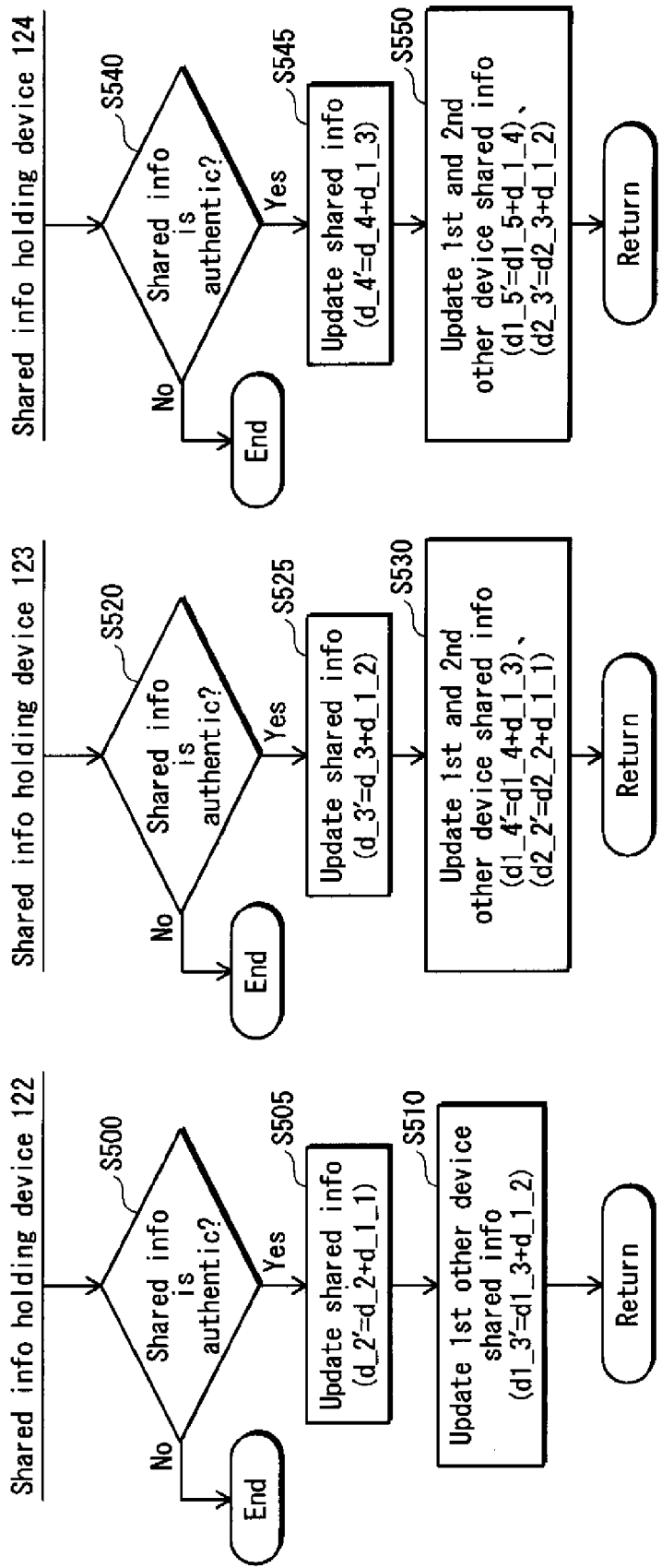
FIG. 21 is a flow diagram showing the operational flow of the shared information holding devices 121, 123 and 124 in the first update process during withdrawal process.

Here, the first update process during withdrawal process performed in step S410 of FIG. 18 will be described with reference to the flowcharts shown in FIGS. 21 and 22.

The shared information updating unit 260_2 of the shared information holding device 122 judges whether or not the first other device shared information "d1_1" of the shared information holding device 126 is authentic based on the result of verification performed by the partial information verifying unit 264_2 (step S500). When it judges that the shared information is authentic (YES in step S500), the shared information updating unit 260_2 updates the shared information "d_2" by using the temporarily stored partial information "d_1_1" (step S505). More specifically, the shared information updating unit 260_2 obtains new shared information "d_2'" (=d_2+d_1_1) by adding the shared information "d_2" and the partial information "d_1_1". Next, the shared information updating unit 260_2 updates the first other device shared information "d1_3" by using the temporarily stored partial information "d_1_2" (step S510). More specifically, the shared information updating unit 260_2 obtains new shared information "d1_3'" (=d1_3+d_1_2) by adding the first other device shared information "d1_3" and the partial information "d_1_2".

The shared information updating unit 260_3 of the shared information holding device 123 judges whether or not the first other device shared information "d1_1" of the shared information holding device 126 is authentic based on the verification result received from the shared information holding device 122 (step S520). When it judges that the shared information is authentic (YES in step S520), the shared information updating unit 260_3 updates the shared information "d_3" by using the temporarily stored partial information "d_1_2" (step S525). More specifically, the shared information updating unit 260_3 obtains new shared information "d_3'" (=d_3+d_1_2) by adding the shared information "d_3" and the partial information "d_1_2". Next, the shared information updating unit 260_3 updates the first and second other device shared information "d1_4" and "d2_2" by using the temporarily stored partial information "d_1_3" and "d_1_1" (step S530). More specifically, the shared information updating unit 260_3 obtains new shared information "d1_4'" (=d1_4+d_1_3) by adding the first other device shared information "d1_4" and the partial information "d_1_3", and obtains new shared information "d2_2'" (=d2_2+d_1_1) by adding the second other device shared information "d2_2" and the partial information "d_1_1".

The shared information updating unit 260_4 of the shared information holding device 124 judges whether or not the first other device shared information "d1_1" of the shared information holding device 126 is authentic based on the verification result received from the shared information holding device 122 (step S540). When it judges that the shared information is authentic (YES in step S540), the shared information updating unit 260_4 updates the shared information "d_4" by using the temporarily stored partial information "d_1_3" (step S545). More specifically, the shared information updating unit 260_4 obtains new shared information "d_4'" (=d_4+d_1_3) by adding the shared information "d_4" and the partial information "d_1_3". Next, the shared information updating unit 260_4 updates the first and second other device shared information "d1__5" and "d2__3" by using the temporarily stored partial information "d__1__4" and "d__1__2" (step S550). More specifically, the shared information updating unit 260_4 obtains new shared information "d1__5'" (=d1__5+d__1__4) by adding the first other device shared information "d1__5" and the partial information "d__1__4", and obtains new shared information "d2__3'" (=d2__3+d__1__2) by adding the second other device shared information "d2__3" and the partial information "d__1__2".

The shared information updating unit 260_5 of the shared information holding device 125 judges whether or not the first other device shared information "d1__1" of the shared information holding device 126 is authentic based on the verification result received from the shared information holding device 122 (step S560). When it judges that the shared information is authentic (YES in step S560), the shared information updating unit 260_5 updates the shared information "d__5" by using the temporarily stored partial information "d__1__4" (step S565). More specifically, the shared information updating unit 260_5 obtains new shared information "d__5'" (=d__5+d__1__4) by adding the shared information "d__5" and the partial information "d__1__4". Next, the shared information updating unit 260_5 updates the first and second other device shared information "d1__6" and "d2__4" by using the temporarily stored partial information "d__1__5" and "d__1__3" (step S570). More specifically, the shared information updating unit 260_5 obtains new shared information "d1__6'" (=d1__6+d__1__5) by adding the first other device shared information "d1__6" and the partial information "d__1__5", and obtains new shared information "d2__4'" (=d2__4+d__1__3) by adding the second other device shared information "d2__4" and the partial information "d__1__3".

The shared information updating unit 260_6 of the shared information holding device 126 judges whether or not the first other device shared information "d1__1" of the device is authentic based on the verification result received from the shared information holding device 122 (step S580). When it judges that the shared information is authentic (YES in step S580), the shared information updating unit 260_6 updates the shared information "d__6" by using the temporarily stored partial information "d__1__5" (step S585). More specifically, the shared information updating unit 260_6 obtains new shared information "d__6'" (=d__6+d__1__5) by adding the shared information "d__6" and the partial information "d__1__5". Next, the shared information updating unit 260_6 updates the second other device shared information "d2__5" by using the temporarily stored partial information "d__1__4" (step S590). More specifically, the shared information updating unit 260_6 obtains new shared information "d2__5'" (=d2__5+d__1__4) by adding the second other device shared information "d2__5" and the partial information "d__1__4".

When any of the shared information holding devices 122-126 judges that the first other device shared information "d1__1" is not authentic (NO in step S500, S520, S540, S560, S580), namely, when a notification of a verification failure is received, it indicates that the shared information holding device 122 or the shared information holding device 126 operates in an unauthentic manner, and each shared information holding device ends the withdrawal process.

(Second Update Process During Withdrawal Process)

Figure 23:
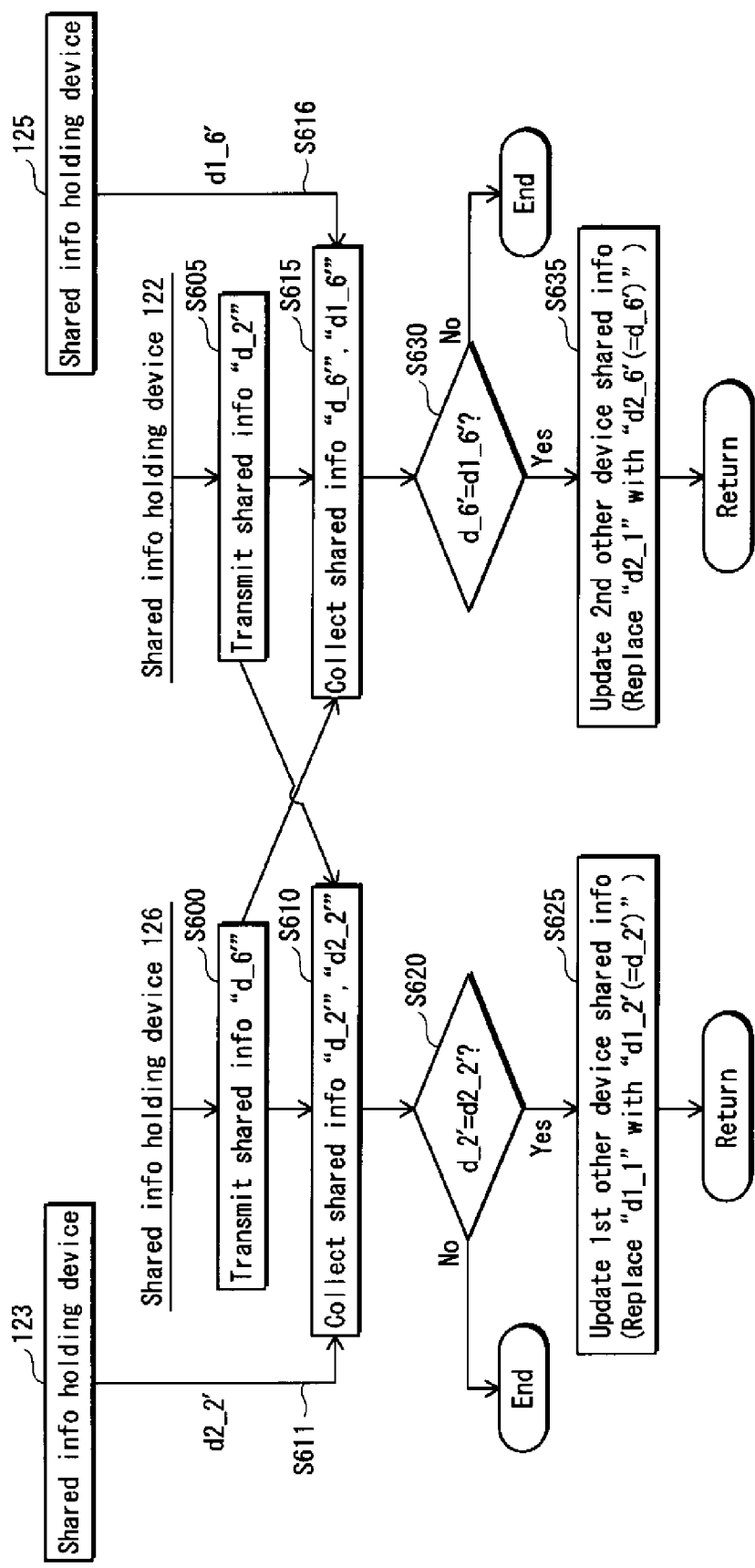
FIG. 23 is a flow diagram showing the operational flow of the shared information holding devices 122 and 126 in the second update process during withdrawal process.

Here, the second update process during withdrawal process performed in step S415 of FIG. 18 will be described with reference to the flowchart shown in FIG. 23.

The shared information updating unit 260_6 of the shared information holding device 126 outputs the shared information "d__6'" to the shared information holding device 122 (step S600).

The shared information updating unit 260_2 of the shared information holding device 122 outputs the shared information "d__2'" to the shared information holding device 126 (step S605).

The shared information updating unit 260_6 collects the shared information "d__2'" and "d2__2'" (step S610). Here, the shared information updating unit 260_3 of the shared information holding device 123 transmits the shared information "d2__2'" (step S611).

The shared information updating unit 260_2 collects the shared information "d__6'" and "d1__6'" (step S615). Here, the shared information updating unit 260_5 of the shared information holding device 125 transmits the shared information "d1__6'" (step S616).

The shared information updating unit 260_6 judges whether or not the collected shared information "d__2'" and "d2__2'" match each other (step S620). When it judges that they match each other (YES in step S620), the shared information updating unit 260_6 updates the first other device shared information to "d__2'" (step S625).

The shared information updating unit 260_2 judges whether or not the collected shared information "d__6'" and "d1__6'" match each other (step S630). When it judges that they match each other (YES in step S630), the shared information updating unit 260_2 updates the second other device shared information to "d__6'" (step S635).

When the shared information updating unit 260_6 judges that the collected shared information "d__2'" and "d2__2'" do not match each other (NO in step S620), the shared information holding device 126 notifies the judgment result to the shared information holding devices 122-125. The shared information holding device 126 and the shared information holding devices 122-125 having received the notification stop the withdrawal process, return the values of the shared information of the own devices to the values before the withdrawal process, and end the process.

When the shared information updating unit 260_2 judges that the collected shared information "d__6'" and "d1__6'" do not match each other (NO in step S630), the shared information holding device 122 notifies the judgment result to the shared information holding devices 123-126. The shared information holding device 122 and the shared information holding devices 123-126 having received the notification stop the withdrawal process, return the values of the shared information of the own devices to the values before the withdrawal process, and end the process.

Specific Example

Figure 24:
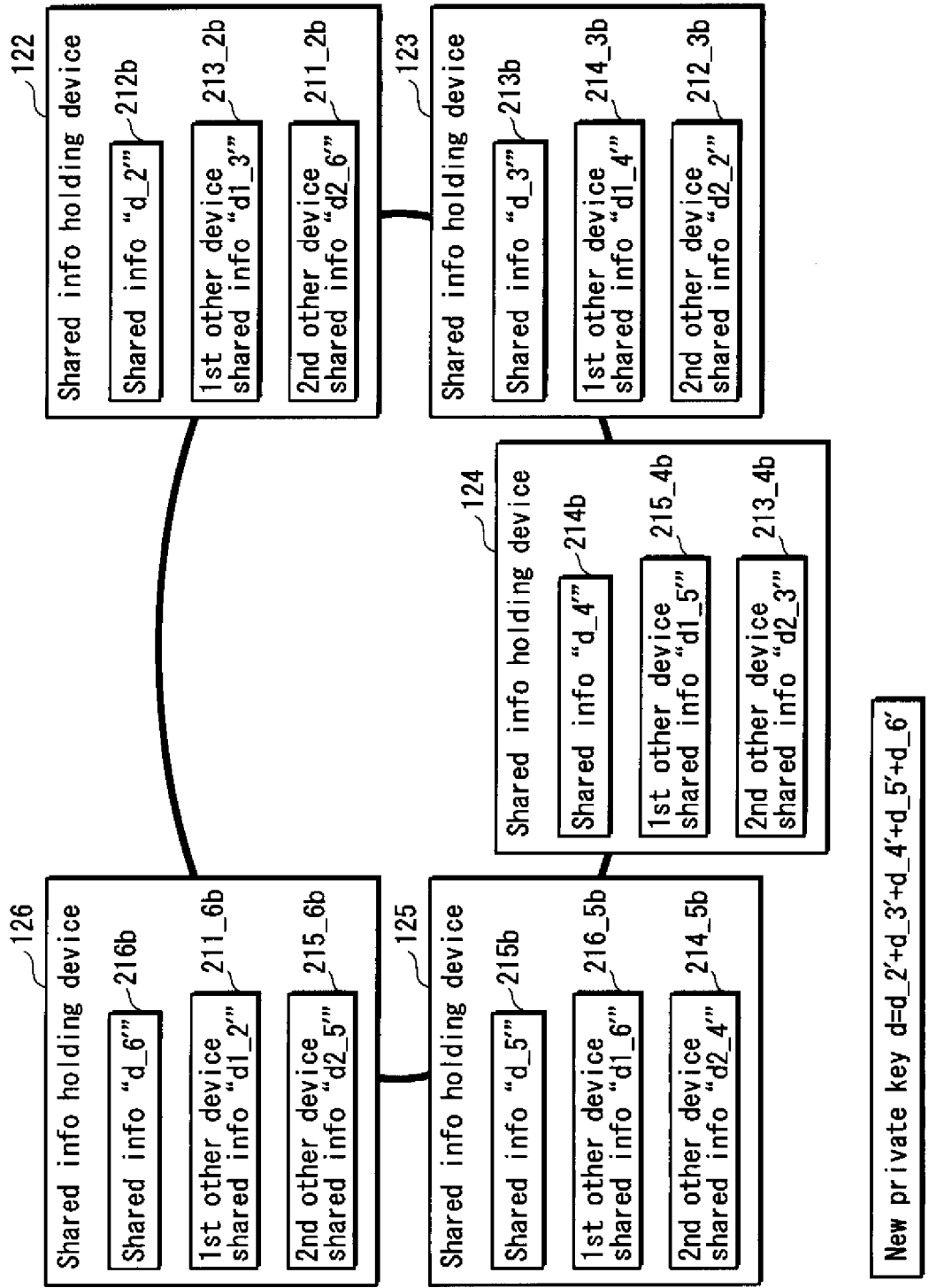
FIG. 24 shows three pieces of shared information held by each of the shared information holding devices 122-126 after the withdrawal process.

FIG. 24 shows the shared information, and the first and second other device shared information held by each of the shared information holding devices 122-126 after the withdrawal process.

For example, the shared information holding device 122 holds the shared information "d__2'" 212*b*, the first other device shared information "d1__3'" 213__2*b*, and the second other device shared information "d2__6'" 211__2*b*, all having been updated in the withdrawal process.

The following indicates that the private key "d" can be restored by using the shared information "d__2" through "d__6'" after the update.

$$d\_2' + d\_3' + d\_4' + d\_5' + d\_6' =$$
$$(d\_2 + d\_1\_1) + (d\_3 + d\_1\_2) + (d\_4 + d\_1\_3) + (d\_5 + d\_1\_4) +$$
$$(d\_6 + d\_1\_5) = (d\_1\_1 + d\_1\_2 + d\_1\_3 + d\_1\_4 + d\_1\_5) +$$
$$(d\_2 + d\_3 + d\_4 + d\_5 + d\_6) =$$
$$d\_1 + d\_2 + d\_3 + d\_4 + d\_5 + d\_6 = d$$

As described above, it is possible to always make the total sum of the shared information held by the shared information holding devices constant even after the shared information holding device 121 withdraws, and the certificate authority system 100 can cause a shared information holding device to withdraw, without regenerating a "new private key" and shared information.

1.4.8 Addition Process.

The addition process will be described with reference to the flowchart shown in FIG. 25.

In the addition process, in view of the possibility that a shared information holding device may operate in an unauthentic manner, it is always verified whether or not the data transferred between the shared information holding devices is authentic so that a shared information holding device operating in an unauthentic manner can be detected. Furthermore, in the addition process, when a value of the shared information needs to be updated, the value of the shared information before update is saved, and the addition process is stopped when a shared information holding device operating in an unauthentic manner is detected during the addition process, and the value of the shared information is returned to the value before the update, preventing the shared information from becoming an unauthentic value.

In the addition process, modification information is transmitted from a plurality of shared information holding devices to the addition target shared information holding device such that the shared information of the addition target shared information holding device is generated. This process is structured to prevent such an action where a shared information holding device operates in an unauthentic manner and transmits unauthentic modification information to the addition target shared information holding device to interfere the generation of an authenticate "new private key". Also, this process is structured to prevent an action of interfering a correct update of the shared information. Furthermore, in this process, shared information holding devices that have a same piece of shared information in common confirm each other whether or not the other device has updated the shared information correctly. This prevents an unauthentic shared information holding device from updating the shared information in an unauthentic manner.

In the case of a structure where a shared information holding device that transmits modification information to the addition target shared information holding device also has the shared information in common with the addition target shared information holding device, the shared information holding device can calculate a piece of shared information that the device does not hold originally, from (i) the shared information that the device holds originally, (ii) the shared information of the addition target shared information holding device, and (iii) the modification information transmitted to the addition target shared information holding device. In view of this, at the last stage of the shared information holding device addition process, a piece of modification information, which is a value different from the value of the transmitted modification information, is extracted from shared information of the shared information holding device having transmitted the modification information, the extracted modification information is divided into pieces, the divided pieces are respectively transmitted to the shared information holding devices, and the value of the shared information is updated. The process will be described later in detail.

In is presumed in the following process that the addition target shared information holding device is the shared information holding device 127, and that the modification information is generated by the shared information holding device 121 and the shared information holding device 126.

A distribution process is performed in which the shared information holding device 121 and the shared information holding device 126 generate modification information (step S700).

A shared information generation process is performed in which the addition target shared information holding device 127 and shared information holding devices 121 and 126, generate shared information that is to be held by these three devices in common (step S705).

An other device shared information storage process is performed in which the shared information holding device 127 stores the first and second other device shared information (step S710).

The shared information holding devices 121, 122, 125-127 judge whether or not the update has been performed normally (step S715). The shared information holding devices 121, 122, 125, and 126 notify the verification result to the shared information holding device 127, and the shared information holding device 127 temporarily holds the verification result.

When all update target devices judge that the update has been performed normally (YES in step S715), the shared information updating unit 260_7 of the shared information holding device 127 collects certificates from the shared information holding devices 121 and 126 (step S720).

The shared information updating unit 260_7 judges whether or not the certificates collected from the shared information holding devices 121 and 126 are authentic (step S725). More specifically, the shared information updating unit 260_7 judges whether or not the collected two certificates are the same.

When it judges that the certificates are the same (YES in step S725), the shared information updating unit 260_7 stores the certificates into the authenticator storage unit 253_7 (step S730). After the storage of the certificates, the shared information updating unit 260_7 outputs an instruction for starting the first division process during addition process to the shared information holding device 121.

Next, the first division process during addition process is performed in which the shared information holding device 121 generates seven pieces of partial information from the shared information of the own device, and distributes the generated pieces of partial information to each shared information holding device (step S735).

The shared information holding devices 121-127 perform the first update process during addition process to update the shared information by using the distributed partial information (step S740).

The shared information holding devices 121-127 judge whether or not the update has been performed normally (step S745). The shared information holding devices 121-127 notify the judgment result to the shared information holding device 121 that transmitted the partial information. More specifically, shared information holding devices that have a same piece of shared information in common use the shared information verifying unit 262_*j* and the other device shared information verifying unit 263_*j* to send the shared information of their own to each other over a secured transmission path, and verify whether or not the received shared information is the same as the shared information held by the own device, thereby confirming whether or not the shared information held by the two devices have been updated to the same value. The shared information holding devices 121-127 notify the verification results to the shared information holding device 121, which temporarily holds the received verification results.

When it is judged that the update has been performed normally in all devices (YES in step S745), the shared information holding device 121 transmits an instruction for performing the second division process during addition process to the shared information holding device 126. Upon receiving the instruction, the shared information holding device 126 performs the second division process during addition process in which it generates seven pieces of partial information from the shared information it holds, and distributes the generated pieces of partial information to each shared information holding device (step S750).

The shared information holding devices 121-127 perform the second update process during addition process to update the shared information by using the distributed partial information (step S755).

The shared information holding devices 121-127 judge whether or not the update has been performed normally (step S760). The shared information holding devices 121-127 notify the judgment result to the shared information holding device 126, which temporarily holds the received verification results.

When it is judged that the update has been performed normally in all devices (YES in step S760), the shared information holding device 126 updates the distribution destination list T100. The shared information holding device 126 stores the distribution destination list after update into the list storage unit 254_6, and transmits it to the shared information holding devices 121-125, 127 and the certificate authority device 140. The shared information holding devices 122-125, 127 and the certificate authority device 140 replace the currently stored distribution destination list with the after-update distribution destination list (step S765).

When it is judged that the update has not been performed normally in the update target device (NO in step S715) or that the certificates are not authentic (NO in step S725), the shared information holding device 127 notifies the judgment result to the shared information holding devices 121, 122, 125 and 126 that are the update target. Each of the update target shared information holding devices stops the addition process, returns the values of the shared information of the own device to the values before the addition process, and ends the process.

When it is judged that the update has not been performed normally in all devices (NO in step S745), the shared information holding device 121 notifies the judgment result to the shared information holding devices 122-127. The shared information holding devices 121-127 stop the addition process, return the values of the shared information of the own devices to the values before the addition process, and end the process.

Similarly, when it is judged that the update has not been performed normally (NO in step S760), the shared information holding devices 121-127 stop the addition process, return the values of the shared information of the own devices to the values before the addition process, and end the process.

It has been described above that the devices send the shared information to each other over a secured transmission path, and verify whether or not the received shared information is the same as the shared information held by the own device. However, not limited to this structure, the verification may be performed with use of an encryption protocol such as the zero-knowledge proof. The zero-knowledge proof and the encryption protocol are explained in detail in Non-Patent Document 1, pages 132-150 and pages 224-225, respectively.

Now, the addition process will be described in detail.
(Distribution Process)
Here, the distribution process performed in step S700 of FIG. 25 will be described with reference to the flowchart shown in FIG. 26.

The modification information generating unit 265_6 of the shared information holding device 126, upon receiving an instruction for generating modification information for addition process from an external device, generates modification information n (step S800).

The modification information generating unit 265_1 of the shared information holding device 121, upon receiving an instruction for generating modification information for addition process from an external device, generates modification information m (step S805).

The modification information generating unit 265_6 outputs the generated modification information n to the shared information holding devices 121, 125 and 127 (step S810).

The modification information generating unit 265_1 outputs the generated modification information m to the shared information holding devices 122, 126 and 127 (step S815).

Upon receiving the modification information m, the modification information generating unit 265_6 temporarily stores the received modification information m (step S820).

Upon receiving the modification information n, the modification information generating unit 265_1 temporarily stores the received modification information n (step S825).

The modification information generating unit 265_6 generates new shared information "d_6'(=d_6−n)" by using the generated modification information n, and updates the shared information "d_6" stored in the shared information storage unit 251_6 with "d_6'" (step S830).

The modification information generating unit 265_1 generates new shared information "d_1'(=d_1−m)" by using the generated modification information m, and updates the shared information "d_1" stored in the shared information storage unit 251_1 with "d_1'" (step S835).

The shared information updating unit 260_5 of the shared information holding device 125, upon receiving the modification information n, generates new first other device shared information "d1_6'(=d1_6−n)" by using the received modification information n, and updates the first other device shared information "d1_6" stored in the other device shared information storage unit 252_5 with "d1_6'" (step S840).

Upon receiving the modification information n and m, the shared information updating unit 260_7 of the shared information holding device 127 temporarily stores the received modification information n and m (step S845).

The shared information updating unit 260_2 of the shared information holding device 122, upon receiving the modification information m, generates new second other device shared information "d2_1'(=d2_1−m)" by using the received modification information m, and updates the second other device shared information "d2_1" stored in the other device shared information storage unit 252_2 with "d2_1'" (step S850).

Figure 27:
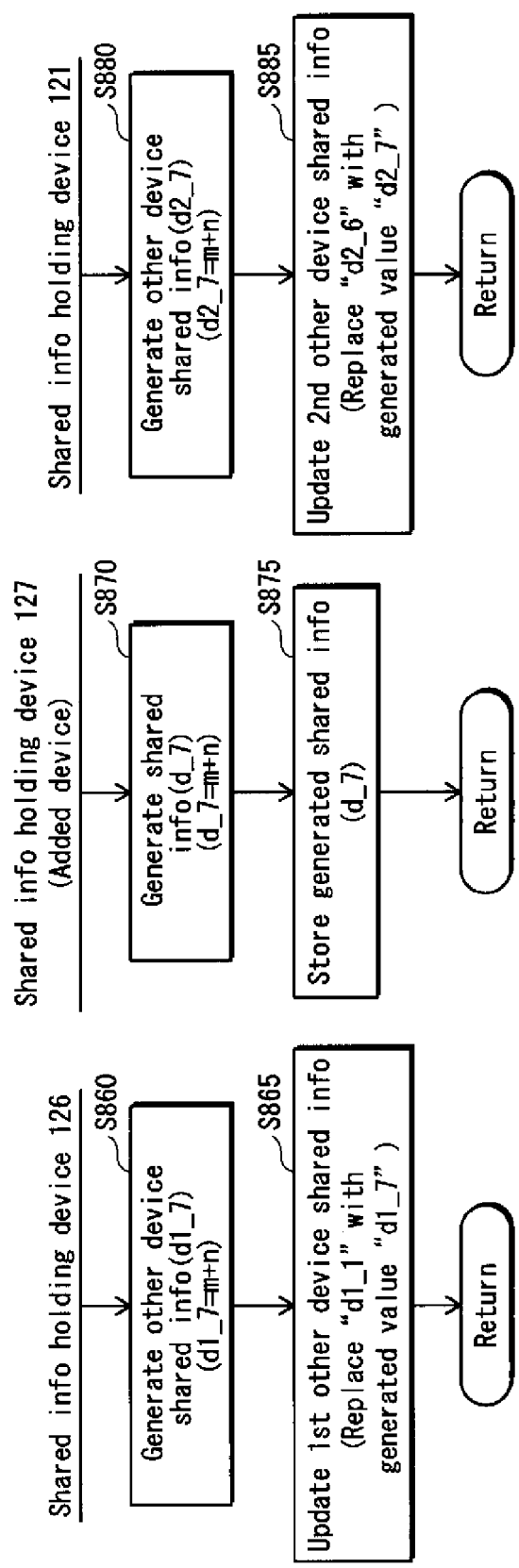
FIG. 27 is a flow diagram showing the operational flow of the shared information generation process.

(Shared Information Generation Process)
Here, the shared information generation process performed in step S705 of FIG. 25 will be described with reference to the flowchart shown in FIG. 27.

The shared information updating unit 260_6 generates other device shared information "d1_7=(m+n)" by using the modification information n and m (step S860). The shared information updating unit 260_6 updates (replaces) the first other device shared information "d1_1" stored in the other device shared information storage unit 252_6 with "d1_7" (step S865).

The shared information updating unit 260_7 generates shared information "d_7=(m+n)" by using the modification information n and m (step S870). The shared information updating unit 260_7 stores the generated shared information "d_7" into the shared information storage unit 251_7 (step S875).

The shared information updating unit 260_1 generates other device shared information "d2_7=(m+n)" by using the modification information n and m (step S880). The shared information updating unit 260_1 updates (replaces) the second other device shared information "d2_1" stored in the other device shared information storage unit 252_1 with "d2_7" (step S885).

(Other Device Shared Information Storage Process)

Figure 28:
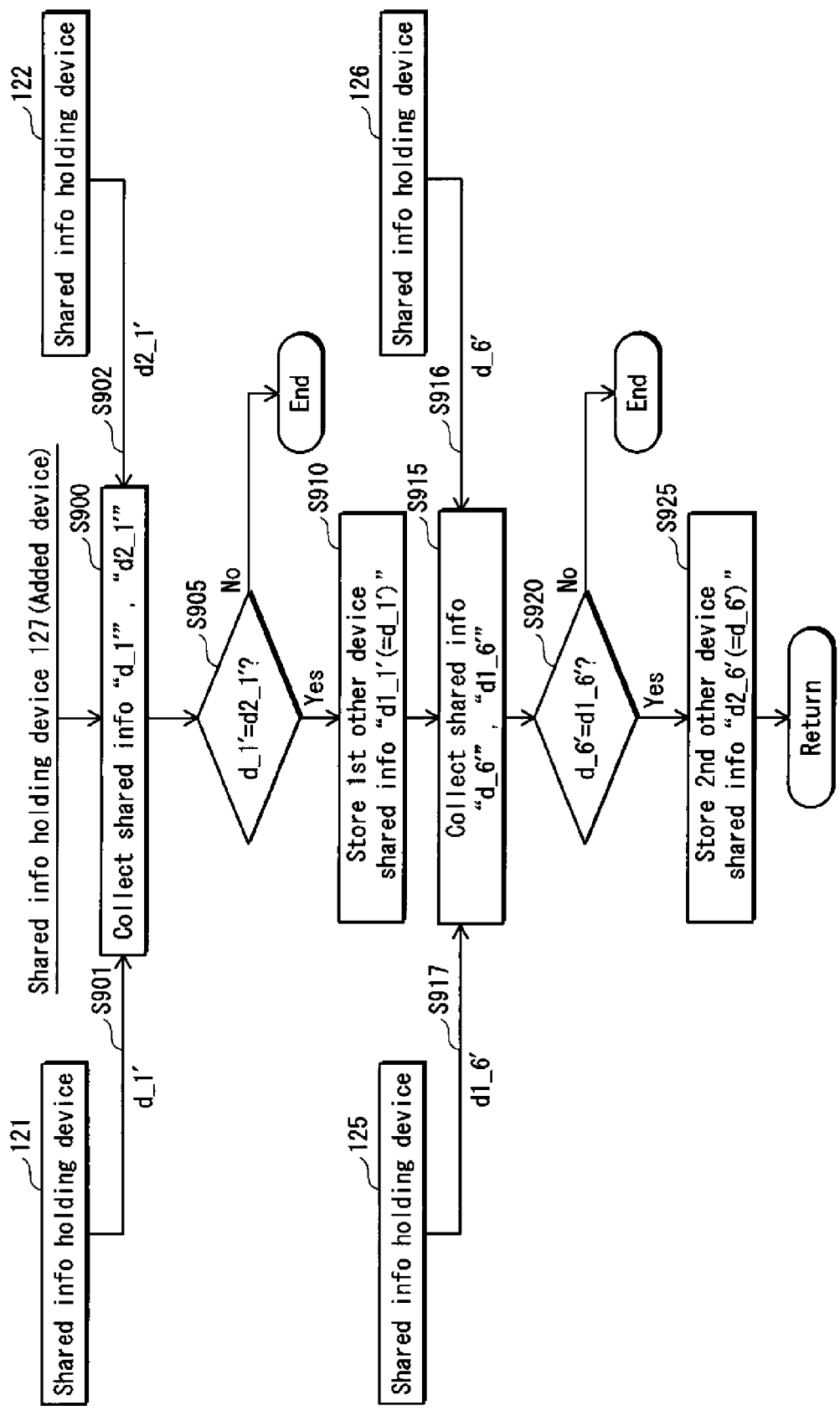
FIG. 28 is a flow diagram showing the operational flow of the other device shared information storage process.

Here, the other device shared information storage process performed in step S710 of FIG. 25 will be described with reference to the flowchart shown in FIG. 28.

The shared information updating unit 260_7 of the shared information holding device 127 outputs the shared information request instruction and the second other device shared information request instruction respectively to the shared information holding device 121 and the shared information holding device 122, and collects the shared information "d_1'" and "d2_1'" (step S900). Here, upon receiving the shared information request instruction, the obtaining unit 267_1 of the shared information holding device 121 obtains the shared information "d_1'" and outputs it to the shared information holding device 127 (step S901). Also, upon receiving the second other device shared information request instruction, the obtaining unit 267_2 of the shared information holding device 122 obtains the shared information "d2_1'" and outputs it to the shared information holding device 127 (step S902).

The shared information updating unit 260_7 judges whether or not the collected shared information "d_1'" and "d2_1'" are the same value (step S905).

When it judges that the collected shared information "d_1'" and "d2_1'" are the same value (YES in step S905), the shared information updating unit 260_7 stores the collected shared information "d_1'" into the other device shared information storage unit 252_7 as the first other device shared information (step S910).

The shared information updating unit 260_7 outputs the shared information request instruction and the first other device shared information request instruction respectively to the shared information holding device 126 and the shared information holding device 125, and collects the shared information "d_6'" and "d1_6'" (step S915). Here, upon receiving the shared information request instruction, the obtaining unit 267_6 of the shared information holding device 126 obtains the shared information "d_6'" and outputs it to the shared information holding device 127 (step S916). Also, upon receiving the first other device shared information request instruction, the obtaining unit 267_5 of the shared information holding device 125 obtains the shared information "d1_6'" and outputs it to the shared information holding device 127 (step S917).

The shared information updating unit 260_7 judges whether or not the collected shared information "d_6'" and "d1_6'" are the same value (step S920).

When it judges that the collected shared information "d_6'" and "d1_6'" are the same value (YES in step S920), the shared information updating unit 260_7 stores the collected shared information "d_6'" into the other device shared information storage unit 252_7 as the second other device shared information (step S925).

When it judges that the collected shared information are not the same value (NO in step S905 or S920), the shared information updating unit 260_7 notifies the fact to the shared information holding devices 121-126. The shared information holding devices 121-127 stop the addition process, return the values of the shared information of the own devices to the values before the addition process, and end the process.

(First Division Process During Addition Process)

Figure 29:
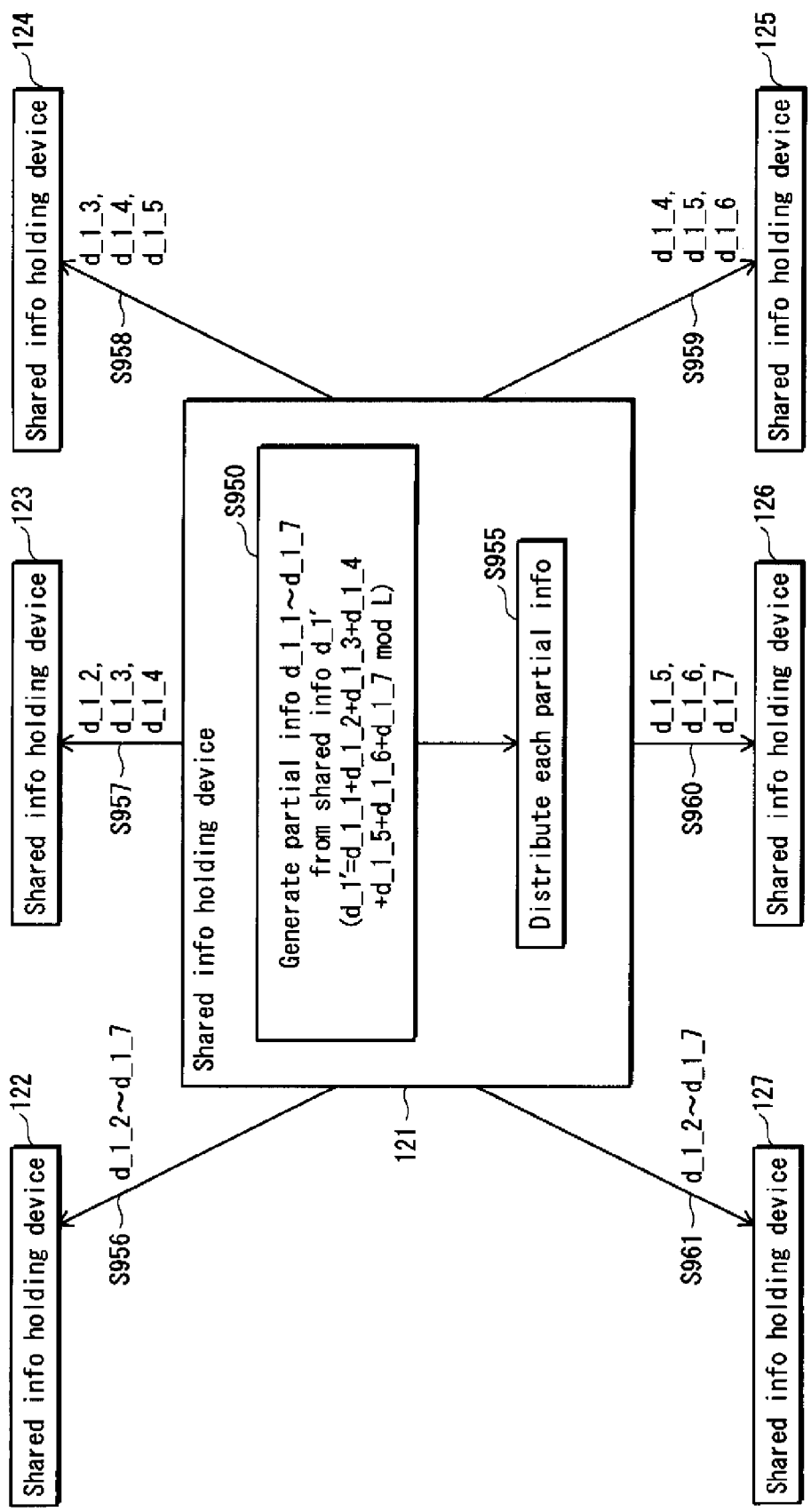
FIG. 29 is a flow diagram showing the operational flow of the first division process during the addition process.

Here, the first division process during the addition process performed in step S735 of FIG. 25 will be described with reference to the flowchart shown in FIG. 29.

The shared information dividing unit 261_1 of the shared information holding device 121 generates seven pieces of partial information (d_1_1 through d_1_7) from the shared information "d_1'" (step S950). In other words, the shared information dividing unit 261_1 divides the shared information "d_1'" into seven pieces of partial information (d_1_1 through d_1_7). Here, each piece of partial information should satisfy the following equation.

$$d\_1'=d\_1\_1+d\_1\_2+d\_1\_3+d\_1\_4+d\_1\_5+d\_1\_6+d\_1\_7 \bmod L \quad \text{(Equation)}$$

More specifically, the shared information dividing unit 261_1 generates six pieces of random numbers by using a random number generator, thereby generating partial information (d_1_1 through d_1_6). Next, the shared information dividing unit 261_1 calculates d_1_7 based on the following equation.

$$d\_1\_7=d\_1'-(d\_1\_1+d\_1\_2+\ldots+d\_1\_6)$$

Note that, although a negative value may be obtained as a result of such a subtraction, the obtained negative value is used as partial information as it is.

The shared information dividing unit 261_1 distributes three or six pieces of the generated partial information to the shared information holding devices 122-127 (step S955).

More specifically, the shared information dividing unit 261_1 distributes the generated partial information d_1_2 through d_1_7 to the shared information holding devices 122 and 127 (steps S956 and S961). Also, the shared information dividing unit 261_1 distributes the generated partial information d_1_(i−1), d_1_i, and d_1_(i+1) to the $i^{th}$ device in the shared information holding devices 123 through 126 (steps S957, S958, S959, and S960).

The shared information holding devices 122-127 temporarily store the received partial information into the shared information updating unit 260_j.

(First Update Process During Addition Process)

Figure 30:
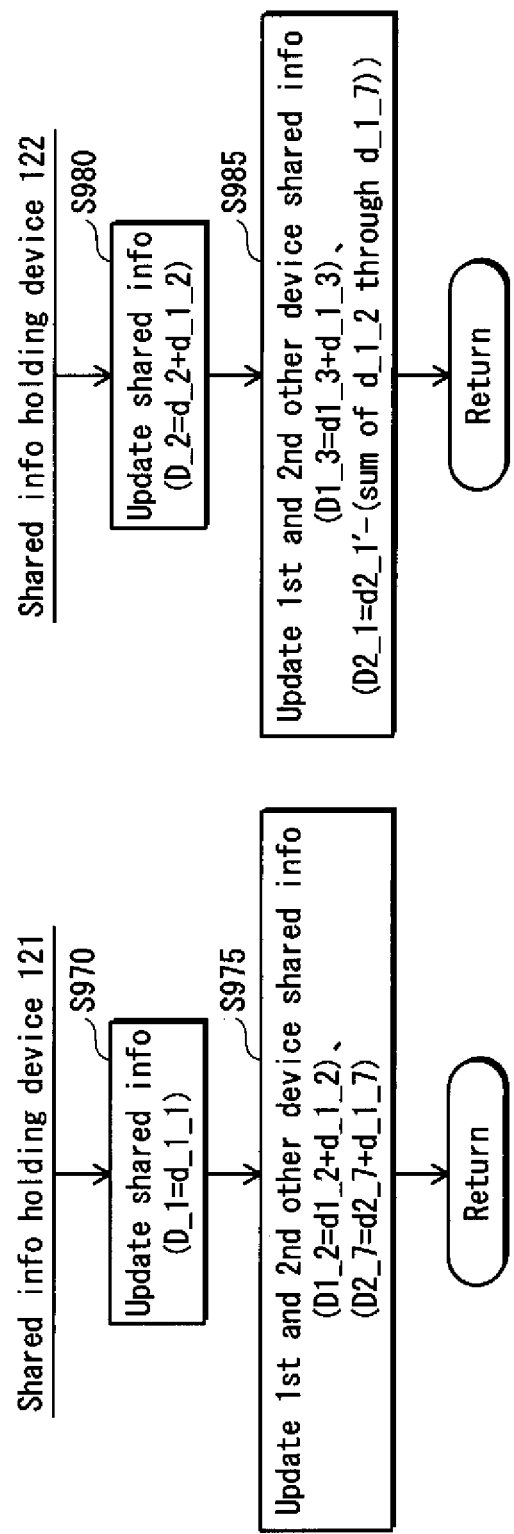
FIG. 30 is a flow diagram showing the operational flow of the shared information holding devices 121 and 122 in the first update process during the addition process.
Figure 31:
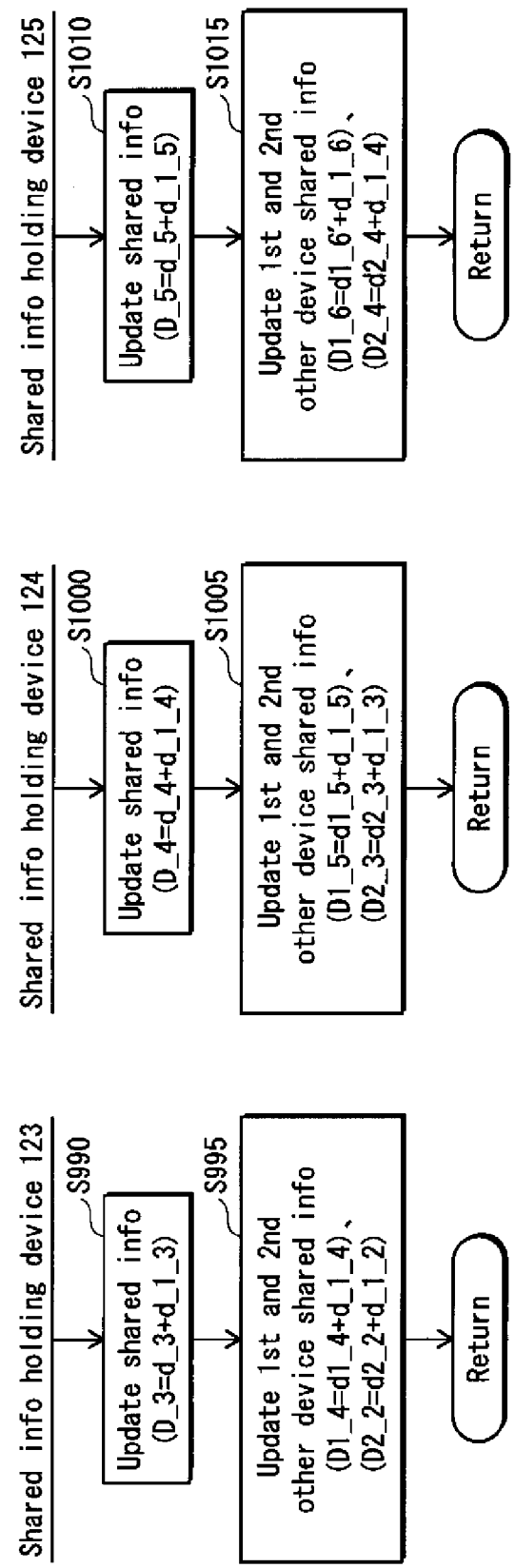
FIG. 31 is a flow diagram showing the operational flow of the shared information holding devices 123, 124 and 125 in the first update process during the addition process.
Figure 32:
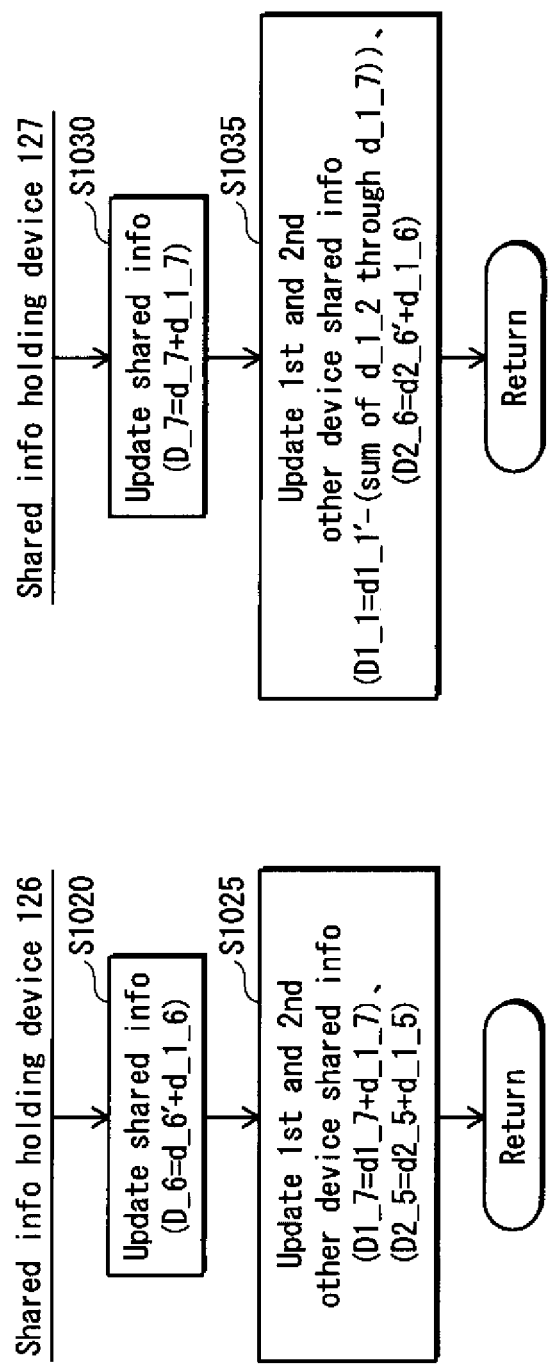
FIG. 32 is a flow diagram showing the operational flow of the shared information holding devices 126 and 127 in the first update process during the addition process.

Here, the first update process during the addition process performed in step S740 of FIG. 25 will be described with reference to the flowcharts shown in FIGS. 30 through 32.

The shared information updating unit 260_1 of the shared information holding device 121 uses the generated partial information "d_1_1" as new shared information "D_1(=d_1_1)", and updates the shared information "d_1" stored in the shared information storage unit 251_1 with the new shared information "D_1" (step S970). The shared information updating unit 260_1 generates new first and second other device shared information "D1_2(=d1_2+d_1_2)" and "D2_7(=d2_7+d_1_7)" by using the generated partial information "d_1_2" and "d_1_7", and updates the first and second other device shared information "d1_2" and "d2_7" stored in the shared information storage unit 251_1 with the new first and second other device shared information "D1_2" and "D2_7", respectively (step S975).

The shared information updating unit 260_2 of the shared information holding device 122 generates new shared information "D_2(=d_2+d_1_2)" by using the partial information "d_1_2" received from the shared information holding device 121, and updates the shared information "d_2" stored in the shared information storage unit 251_2 with the new shared information "D_2" (step S980). The shared information updating unit 260_2 generates new first and second other device shared information "D1_3(=d1_3+d_1_3)" and "D2_1(=d2_1'−(d_1_2+d_1_3+...+d_1_7)" by using the partial information "d_1_2" through "d_1_7" received from the shared information holding device 121, and updates the first and second other device shared information "d1_3" and "d2_1" stored in the shared information storage unit 251_2 with the new first and second other device shared information "D1_3" and "D2_1", respectively (step S985). Note that, although a negative value may be obtained as a result of such a subtraction, the obtained negative value is used as new shared information as it is.

The shared information updating unit 260_3 of the shared information holding device 123 generates new shared information "D_3(=d_3+d_1_3)" by using the partial information "d_1_3" received from the shared information holding device 121, and updates the shared information "d_3" stored in the shared information storage unit 251_3 with the new shared information "D_3" (step S990). The shared information updating unit 260_3 generates new first and second other device shared information "D1_4(=d1_4+d_1_4)" and "D2_2(=d2_2+d_1_2)" by using the partial information "d_1_4" and "d_1_2" received from the shared information holding device 121, and updates the first and second other device shared information "d1_4" and "d2_2" stored in the shared information storage unit 251_3 with the new first and second other device shared information "D1_4" and "D2_2", respectively (step S995).

The shared information updating unit 260_4 of the shared information holding device 124 generates new shared information "D_4(=d_4+d_1_4)" by using the partial information "d_1_4" received from the shared information holding device 121, and updates the shared information "d_4" stored in the shared information storage unit 251_4 with the new shared information "D_4" (step S1000). The shared information updating unit 260_4 generates new first and second other device shared information "D1_5(=d1_5+d_1_5)" and "D2_3(=d2_3+d_1_3)" by using the partial information "d_1_5" and "d_1_3" received from the shared information holding device 121, and updates the first and second other device shared information "d1_5" and "d2_3" stored in the shared information storage unit 251_4 with the new first and second other device shared information "D1_5" and "D2_3", respectively (step S1005).

The shared information updating unit 260_5 of the shared information holding device 125 generates new shared information "D_5(=d_5+d_1_5)" by using the partial information "d_1_5" received from the shared information holding device 121, and updates the shared information "d_5" stored in the shared information storage unit 251_5 with the new shared information "D_5" (step S1010). The shared information updating unit 260_5 generates new first and second other device shared information "D1_6(=d1_6+d_1_6)" and "D2_4(=d2_4+d_1_4)" by using the partial information "d_1_6" and "d_1_4" received from the shared information holding device 121, and updates the first and second other device shared information "d1_6" and "d2_4" stored in the shared information storage unit 251_5 with the new first and second other device shared information "D1_6" and "D2_4", respectively (step S1015).

The shared information updating unit 260_6 of the shared information holding device 126 generates new shared information "D_6(=d_6'+d_1_6)" by using the partial information "d_1_6" received from the shared information holding device 121, and updates the shared information "d_6" stored in the shared information storage unit 251_6 with the new shared information "D_6" (step S1020). The shared information updating unit 260_6 generates new first and second other device shared information "D1_7(=d1_7+d_1_7)" and "D2_5(=d2_5+d_1_5)" by using the partial information "d_1_7" and "d_1_5" received from the shared information holding device 121, and updates the first and second other device shared information "d1_7" and "d2_5" stored in the shared information storage unit 251_6 with the new first and second other device shared information "D1_7" and "D2_5", respectively (step S1025).

The shared information updating unit 260_7 of the shared information holding device 127 generates new shared information "D_7(=d_7+d_1_7)" by using the partial information "d_1_7" received from the shared information holding device 121, and updates the shared information "d_7" stored in the shared information storage unit 251_7 with the new shared information "D_7" (step S1030). The shared information updating unit 260_7 generates new first and second other device shared information "D1_1(=d1_1'−(d_1_2+d_1_3+...+d_1_7) and "D2_6(=d2_6'+d_1_6)" by using the partial information "d_1_2" through "d_1_7" received from the shared information holding device 121, and updates the first and second other device shared information "d1_1" and "d2_6" stored in the shared information storage unit 251_7 with the new first and second other device shared information "D1_1" and "D2_6", respectively (step S1035). Note that, although a negative value may be obtained as a result of such a subtraction, the obtained negative value is used as new shared information as it is.

(Second Division Process During Addition Process)

Figure 33:
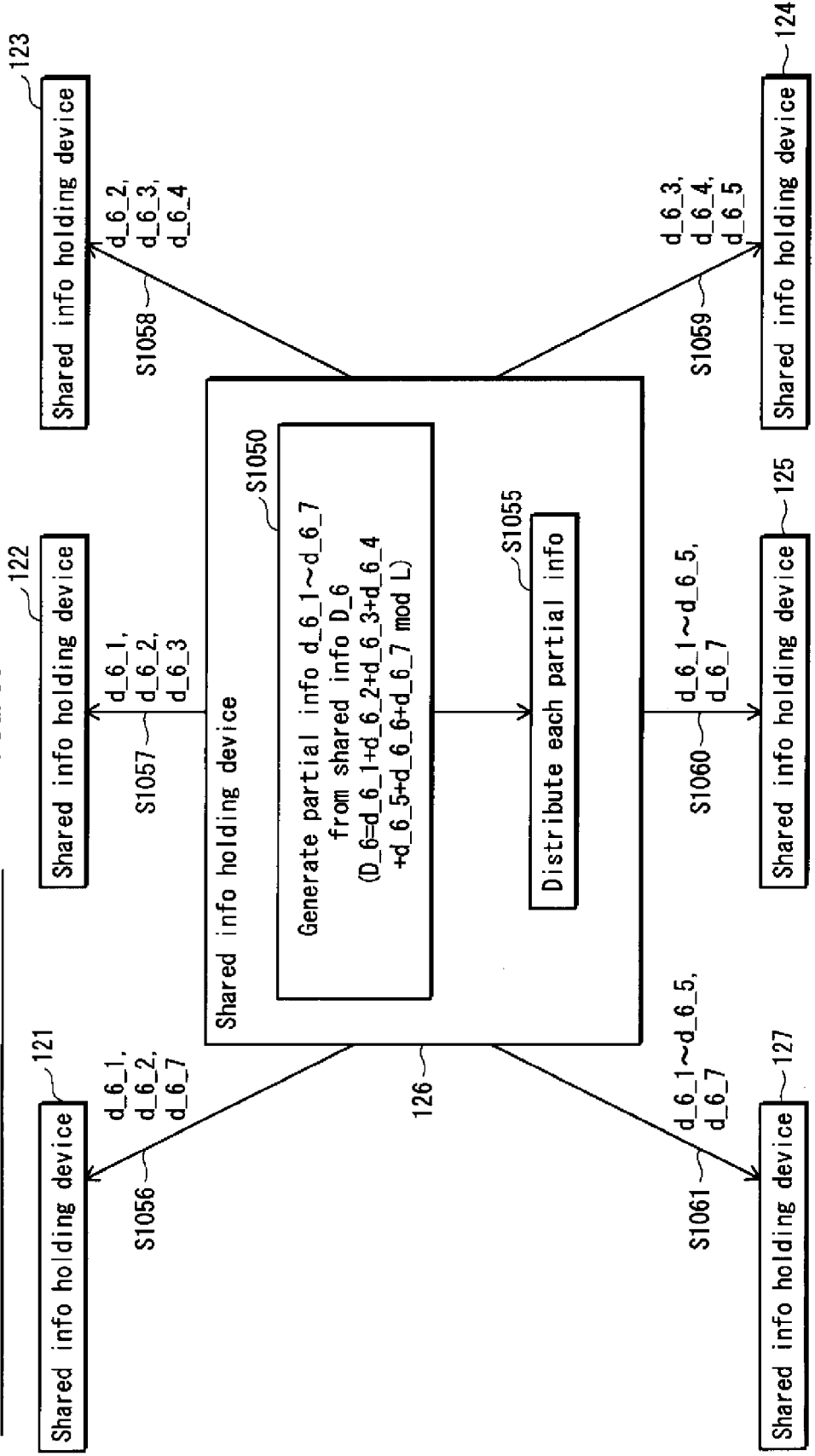
FIG. 33 is a flow diagram showing the operational flow of the second division process during the addition process.

Here, the second division process during the addition process performed in step S750 of FIG. 25 will be described with reference to the flowchart shown in FIG. 33.

The shared information dividing unit 261_6 of the shared information holding device 126 generates seven pieces of partial information (d_6_1 through d_6_7) from the shared information "D_6" (step S1050). In other words, the shared information dividing unit 261_6 divides the shared information "D_6" into seven pieces of partial information (d_6_1 through d_6_7). Here, each piece of partial information should satisfy the following equation.

$$D\_6 = d\_6\_1 + d\_6\_2 + d\_6\_3 + d\_6\_4 + d\_6\_5 + d\_6\_6 + d\_6\_7 \bmod L \quad \text{(Equation)}$$

More specifically, the shared information dividing unit 261_6 generates six pieces of random numbers by using a random number generator, thereby generating partial information (d_6_1 through d_6_6). Next, the shared information dividing unit 261_6 calculates d_6_7 based on the following equation.

$$d\_6\_7 = D\_6 - (d\_6\_1 + d\_6\_2 + \ldots + d\_6\_6)$$

Note that, although a negative value may be obtained as a result of such a subtraction, the obtained negative value is used as partial information as it is.

The shared information dividing unit 261_6 distributes three or six pieces of the generated partial information to the shared information holding devices 121-125 and 127 (step S1055).

More specifically, the shared information dividing unit 261_6 distributes the generated partial information $d\_6\_1$ through $d\_6\_5$ and $d\_6\_7$ to the shared information holding devices 125 and 127 (steps S1060 and S1061). Also, the shared information dividing unit 261_6 distributes the generated partial information $d\_6\_(i-1)$, $d\_6\_i$, and $d\_6\_(i+1)$ to the $i^{th}$ device in the shared information holding devices 121 through 124 (steps S1056, S1057, S1058, S1059). Note that when $i-1=0$, partial information $d\_6\_7$ is distributed.

The shared information holding devices 121-125 and 127 temporarily store the received partial information into the shared information updating unit 260_$j$.

(Second Update Process During Addition Process)

Figure 34:
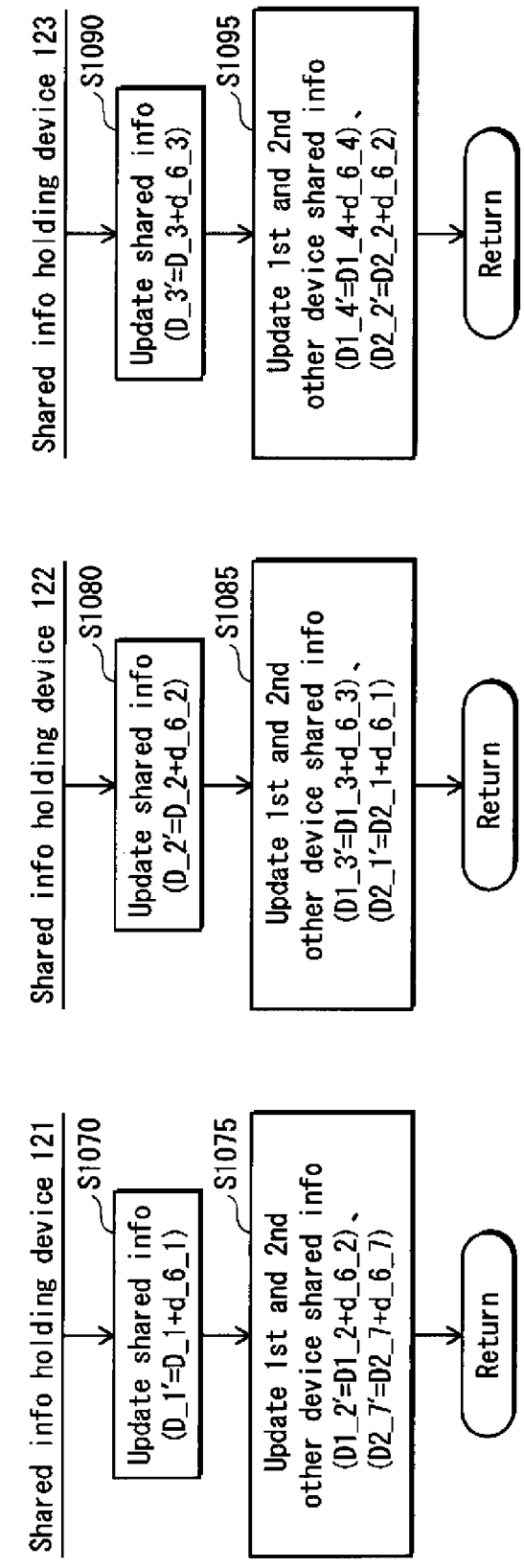
FIG. 34 is a flow diagram showing the operational flow of the shared information holding devices 121, 122 and 123 in the second update process during the addition process.
Figure 35:
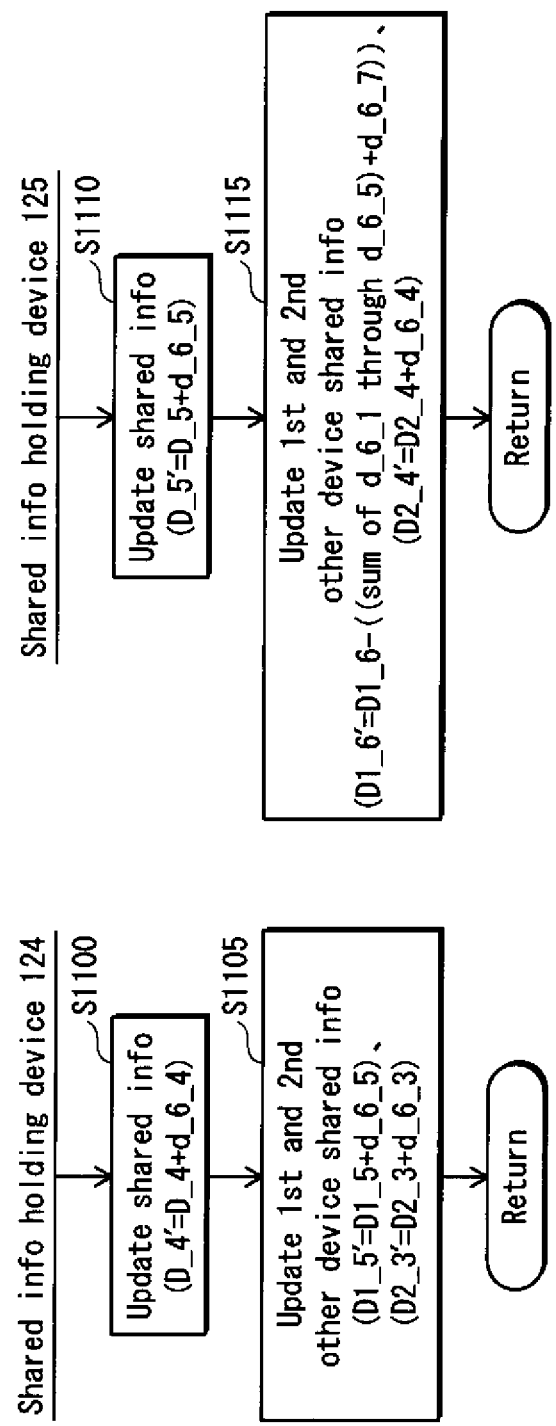
FIG. 35 is a flow diagram showing the operational flow of the shared information holding devices 124 and 125 in the second update process during the addition process.
Figure 36:
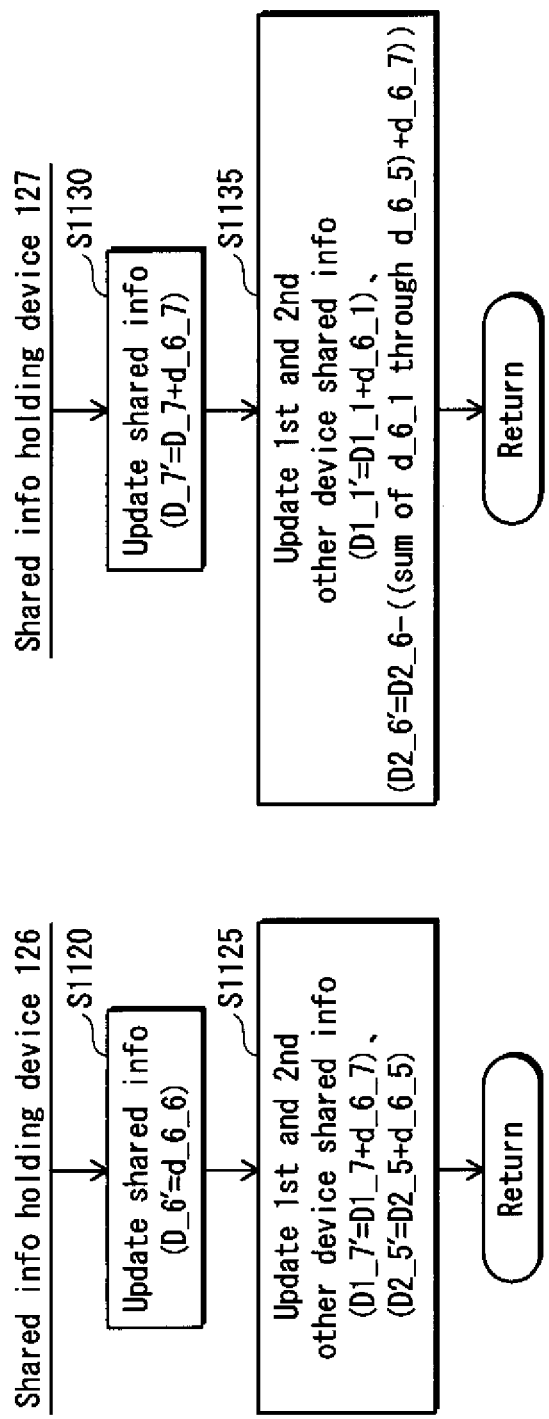
FIG. 36 is a flow diagram showing the operational flow of the shared information holding devices 126 and 127 in the second update process during the addition process.

Here, the second update process during the addition process performed in step S755 of FIG. 25 will be described with reference to the flowcharts shown in FIGS. 34 through 36.

The shared information updating unit 260_1 of the shared information holding device 121 generates new shared information "D_1'(=D_1+d_6_1)" by using the partial information "d_6_1" received from the shared information holding device 125, and updates the shared information "D_1" stored in the shared information storage unit 251_1 with the new shared information "D_1'" (step S1070). The shared information updating unit 260_1 generates new first and second other device shared information "D1_2'(=D1_2+d_6_2)" and "D2_7'(=D2_7+d_6_7)" by using the partial information "d_6_2" and "d_6_7" received from the shared information holding device 126, and updates the first and second other device shared information "D1_2" and "D2_7" stored in the shared information storage unit 251_1 with the new first and second other device shared information "D1_2'" and "D2_7'", respectively (step S1075).

The shared information updating unit 260_2 of the shared information holding device 122 generates new shared information "D_2'(=D_2+d_6_2)" by using the partial information "d_6_2" received from the shared information holding device 126, and updates the shared information "D_2" stored in the shared information storage unit 251_2 with the new shared information "D_2'" (step S1080). The shared information updating unit 260_2 generates new first and second other device shared information "D1_3'(=D1_3+d_6_3)" and "D2_1'(=D2_1+d_6_1)" by using the partial information "d_6_3" and "d_6_1" received from the shared information holding device 126, and updates the first and second other device shared information "D1_3" and "D2_1" stored in the shared information storage unit 251_2 with the new first and second other device shared information "D1_3'" and "D2_1'", respectively (step S1085).

The shared information updating unit 260_3 of the shared information holding device 123 generates new shared information "D_3'(=D_3+d_6_3)" by using the partial information "d_6_3" received from the shared information holding device 126, and updates the shared information "D_3" stored in the shared information storage unit 251_3 with the new shared information "D_3'" (step S1090). The shared information updating unit 260_3 generates new first and second other device shared information "D1_4'(=D1_4+d_6_4)" and "D2_2'(=D2_2+d_6_2)" by using the partial information "d_6_4" and "d_6_2" received from the shared information holding device 126, and updates the first and second other device shared information "D1_4" and "D2_2" stored in the shared information storage unit 251_3 with the new first and second other device shared information "D1_4'" and "D2_2'", respectively (step S1095).

The shared information updating unit 260_4 of the shared information holding device 124 generates new shared information "D_4'(=D_4+d_6_4)" by using the partial information "d_6_4" received from the shared information holding device 126, and updates the shared information "D_4" stored in the shared information storage unit 251_4 with the new shared information "D_4'" (step S1100). The shared information updating unit 260_4 generates new first and second other device shared information "D1_5'(=D1_5+d_6_5)" and "D2_3'(=D2_3+d_6_3)" by using the partial information "d_6_5" and "d_6_3" received from the shared information holding device 126, and updates the first and second other device shared information "D1_5" and "D2_3" stored in the shared information storage unit 251_4 with the new first and second other device shared information "D1_5'" and "D2_3'", respectively (step S1105).

The shared information updating unit 260_5 of the shared information holding device 125 generates new shared information "D_5'(=D_5+d_6_5)" by using the partial information "d_6_5" received from the shared information holding device 126, and updates the shared information "D_5" stored in the shared information storage unit 251_5 with the new shared information "D_5'" (step S1110). The shared information updating unit 260_5 generates new first and second other device shared information "D1_6'(=D1_6-(d_6_1+d_6_2+...+d_6_5+d_6_7) and "D2_4'(=D2_4+d_6_4)" by using the partial information "d_6_1" through "d_6_5" and "d_6_7" received from the shared information holding device 126, and updates the first and second other device shared information, and updates the first and second other device shared information "D1_6" and "D2_4" stored in the shared information storage unit 251_5 with the new first and second other device shared information "D1_6'" and "D2_4'", respectively (step S1115). Note that, although a negative value may be obtained as a result of such a subtraction, the obtained negative value is used as new shared information as it is.

The shared information updating unit 260_6 of the shared information holding device 126 uses the generated partial information "d_1_6" as new shared information "D_6'(=d_6_6)", and updates the shared information "D_6" stored in the shared information storage unit 251_6 with the new shared information "D_6'" (step S1120). The shared information updating unit 260_6 generates new first and second other device shared information "D1_7'(=D1_7+d_6_7)" and "D2_5'(=d2_5+d_6_5)" by using the generated partial information "d_6_7" and "d_6_5", and updates the first and second other device shared information "D1_7" and "D2_5" stored in the shared information storage unit 251_6 with the new first and second other device shared information "D1_7'" and "D2_5'", respectively (step S1125).

The shared information updating unit 260_7 of the shared information holding device 127 generates new shared information "D_7'(=D_7+d_6_7)" by using the partial information "d_6_7" received from the shared information holding device 126, and updates the shared information "D_7" stored in the shared information storage unit 251_7 with the new shared information "D_7'" (step S1130). The shared information updating unit 260_7 generates new first and second other device shared information "D1_1'(=d1_1'+d_6_1) and "D2_6'(=D2_6-(d_6_1+d_6_2+...+d_6_5+d_6_7)" by using the partial information "d_6_1" through "d_6_5" and "d_6_7" received from the shared information holding device 126, and updates the first and second other device shared information "D1_1" and "D2_6" stored in the shared information storage unit 251_7 with the new first and second other device shared information "D1_1'" and "D2_6'", respectively (step S1135). Note that, although a negative value may be obtained as a result of such a subtraction, the obtained negative value is used as new shared information as it is.

Specific Example

Figure 37:
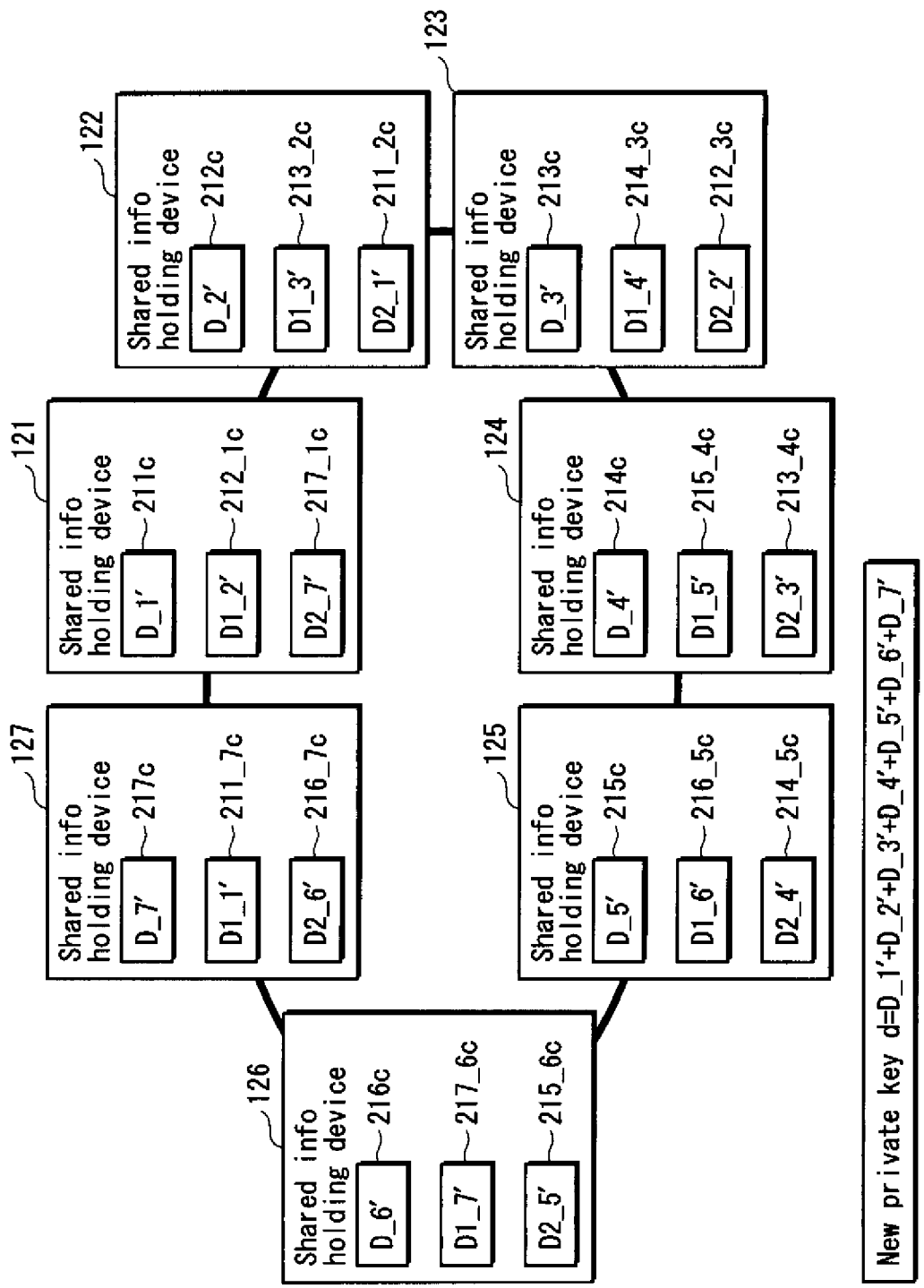
FIG. 37 shows three pieces of shared information held by each of the shared information holding devices 122-127 after the addition process.

FIG. 37 shows the shared information, and the first and second other device shared information held by each of the shared information holding devices 122-127 after the addition process.

For example, the shared information holding device 121 holds the shared information "D_1'" 211c, the first other device shared information "D1_2'" 212_1c, and the second other device shared information "D2_7'" 217_1c, all having been updated in the addition process.

The following indicates that the private key "d" can be restored by using the shared information "D_1'" through "D_7'" after the update.

$$D\_1' + D\_2' + D\_3' + D\_4' + D\_5' + D\_6' + D\_7' =$$
$$(D\_1 + d\_6\_1) + (D\_2 + d\_6\_2) + (D\_3 + d\_6\_3) +$$
$$(D\_4 + d\_6\_4) + (D\_5 + d\_6\_5) + (d\_6\_6) + (D\_7 + d\_6\_7) =$$
$$D\_1 + D\_2 + D\_3 + D\_4 + D\_5 + D\_7 + d\_6\_1 +$$
$$d\_6\_2 + d\_6\_3 + d\_6\_4 + d\_6\_5 + d\_6\_6 + d\_6\_7 =$$
$$D\_1 + D\_2 + D\_3 + D\_4 + D\_5 + D\_6 + D\_7 =$$
$$(d\_1\_1) + (d\_2 + d\_1\_2) + (d\_3 + d\_1\_3) + (d\_4 + d\_1\_4) +$$
$$(d\_5 + d\_1\_5) + (d\_6' + d\_1\_6) + (d\_7 + d\_1\_7) =$$
$$d\_2 + d\_3 + d\_4 + d\_5 + d\_6' + d\_7 + d\_1\_1 + d\_1\_2 +$$
$$d\_1\_3 + d\_1\_4 + d\_1\_5 + d\_1\_6 + d\_1\_7 =$$
$$d\_1' + d\_2 + d\_3 + d\_4 + d\_5 + D\_6' + d\_7 =$$
$$(d\_1 - m) + d\_2 + d\_3 + d\_4 + d\_5 + (d\_6 - n) + m + n =$$
$$d\_1 + d\_2 + d\_3 + d\_4 + d\_5 + d\_6 + d\_7 = d$$

As described above, it is possible to always make the total sum of the shared information held by the shared information holding devices constant even after the shared information holding device 127 is added, and the certificate authority system 100 can add a shared information holding device, without regenerating a new private key "d" and shared information.

(Necessity of First and Second Update Processes During Addition Process)

The first and second update processes are required because the shared information holding device 121 and the shared information holding device 126 hold excessive amount of shared information.

This will be described in more detail. The shared information holding device 121 holds three pieces of shared information: shared information "d_1"; other device shared information "d1_2"; and other device shared information "d2_7". Here, the other device shared information "d2_7" is a sum of the modification information m generated by the shared information holding device 121 and the modification information n generated by the shared information holding device 126. As a result, it is possible to obtain, from the other device shared information "d2_7" and the modification information m generated by the shared information holding device 121, the modification information n transmitted by the shared information holding device 126. Furthermore, the other device shared information "d2_6" before update is also held before the addition process, and thus it is possible to obtain, from the other device shared information "d2_6" before update and the modification information n generated by the shared information holding device 126, the value of the shared information "d2_6'(=d_6')" after update. In this way, although, originally, the shared information holding device 121 should hold three pieces of shared information, actually, the shared information holding device 121 can hold four pieces of shared information, which is excessive amount of shared information. This also applies to the shared information holding device 126. Therefore, to solve the problem that some shared information holding devices hold excessive amount of shared information at the end of the addition process, it is necessary for the shared information holding device 121 and the shared information holding device 126 to update the shared information they hold.

It has been described that two shared information holding devices generate and transmit modification information so that shared information to be held by an addition-target shared information holding device can be generated. However, not limited to this structure, for example, all the shared information holding devices except for the addition-target shared information holding device may transmit the modification information.

1.5 Effects of Present Embodiment

With the above-described structures of the certificate authority device 140 and the shared information holding devices 121-126, it is possible to construct a system that can recover the reliability of the entire system even if the private key 141 of the certificate authority device 140 is leaked. Furthermore, with the structure where a certificate is used as the authenticator for use in verifying the "new private key", and a plurality of shared information holding devices have in common the shared information such that the shared information has redundancy, even if not only the certificate authority device 140 but also any of the shared information holding devices 121-126 operates in an unauthentic manner after receiving an attack, it is possible to generate an authentic private key, and identify and exclude from the system the shared information holding device that operated in an unauthentic manner.

With the structure of the present embodiment, it is also possible to modify the shared information in accordance with a withdrawal or addition of a shared information holding device, without regenerating a "new private key" or changing the value of the "new private key". Also, when a shared information holding device operates in an unauthentic manner (for example, a device that does not update the shared information correctly) during the withdrawal or addition process, it is possible to stop an unauthentic withdrawal or addition process by identifying the device operating in an unauthentic manner and returning the state to the state before the process. Furthermore, in the process for updating the shared information during the withdrawal or addition process, even if the shared information before the update is kept to be held, a "new private key" cannot be obtained from the shared information before the update. This is because the shared information holding devices other than the device have updated the shared information.

1.6 Modification of Embodiment 1

A security maintenance system is composed of a distribution device, n holding devices, and a certificate authority device. All the holding devices are associated with each other such that one or more closed paths are formed. The method for associating the holding devices with each other such that one or more closed paths are formed have been described in the embodiment above, and description thereof is omitted here.

The distribution device, n holding devices, certificate authority device are connected with each other via a communication network represented by the Internet. A path is established among these devices so that confidential information can be transferred among them on the path.

It has been described that the distribution device, n holding devices, certificate authority device are connected with each other via a communication network. However, not limited to this structure, for example, the distribution device, n holding devices, certificate authority device may exchange information with each other via a recording medium such as an SD memory card that can secure the confidentiality.

(1) Structure of Distribution Device

The distribution device assigns n pieces of shared information, which have been generated from one piece of private information, to the n holding devices, respectively. The distribution device includes a generating unit, an information selecting unit, a related device selecting unit, an output unit, and a repeat control unit. The distribution device is specifically a computer system that includes a microprocessor, ROM, RAM, a hard disk unit, a communication unit, a display unit, a keyboard, a mouse and the like. A computer program is stored in the RAM or the hard disk unit. The microprocessor operates in accordance with the computer program and causes the distribution device to achieve its functions.

The generating unit included in the distribution device generates as many (namely, n) pieces of shared information as the number of holding devices (n), from one piece of private information. More specifically, the generating unit generates (n−1) pieces of shared information randomly, and calculates the remaining one piece of shared information by subtracting the generated (n−1) pieces of shared information from the private information by a predetermined method. In other words, the private information is a sum of all pieces of shared information generated by the generating unit by a predetermined method.

The information selecting unit selects one piece of shared information from the generated plurality of pieces of shared information.

The device selecting unit selects, from among a plurality of holding devices, an assignment-target holding device to which the selected piece of shared information should be assigned. The related device selecting unit selects, from among a plurality of holding devices, two or more related holding devices that are related to the assignment-target holding device. More specifically, the related device selecting unit selects at least a first related holding device and a second related holding device that are respectively associated with a first node and a second node disposed on both sides of a node that corresponds to the assignment-target holding device in a same closed path (ring).

The output unit outputs a same selected piece of information to the assignment-target holding device and all the related holding devices.

The repeat control unit controls the information selecting unit, device selecting unit, related device selecting unit, and output unit so that the selection of shared information, the selection of the assignment-target holding device, the selection of the related holding devices, and the output of the selected piece of information are repeated for each piece of shared information generated by the generating device.

As described above, the distribution device outputs the selected piece of information to the assignment-target holding device, and also outputs the selected piece of information to the two or more related holding devices, selected from among a plurality of holding devices, that are related to the assignment-target holding device. With this structure, a plurality of holding devices can receive and hold a same piece of shared information. This increases the redundancy of a same piece of shared information held by a plurality of holding devices, increasing the possibility of dealing with a case where the shared information held by a small number of holding devices was tampered with in an unauthentic manner.

Also, in the above-described structure, the distribution device selects at least a first related holding device and a second related holding device that are respectively associated with a first node and a second node disposed on both sides of a node that corresponds to the assignment-target holding device in a same closed path (ring). With this structure, when a case where the shared information held by a holding device was tampered with in an unauthentic manner is to be dealt with, it is possible to identify, with reliability, related holding devices holding a same selected piece of shared information.

Further, the distribution device causes each holding device to hold (i) apiece of shared information assigned to the holding device itself and (ii) two pieces of shared information assigned to holding devices disposed on both sides of the holding device itself.

It is also possible to restore the private information by adding up a plurality of pieces of shared information respectively assigned to all of the holding devices.

Furthermore, the generating unit generates (n−1) pieces of shared information randomly, and calculates the remaining one piece of shared information by subtracting the generated (n−1) pieces of shared information from the private information by a predetermined method. With this structure, it is possible to ensure the randomness with which a plurality of pieces of shared information are generated, and ensure the restoration of the private information because the private information is restored by adding up the generated plurality of pieces of shared information.

(2) Structure of Each Holding Device

Each of n holding devices is assigned with one of n pieces of shared information by the distribution device, the n pieces of shared information having been generated from one piece of private information. Each holding device is specifically a computer system that includes a microprocessor, ROM, RAM, a hard disk unit, a communication unit, a display unit, a keyboard, a mouse and the like. A computer program is stored in the RAM or the hard disk unit. The microprocessor operates in accordance with the computer program and causes the holding device to achieve its functions.

The holding device is, for example, a portable phone, a portable communication terminal device, a multimedia playback/recording device, a personal computer, an IC card with a memory function, or a contactless IC card with a memory function.

The $i^{th}$ holding device includes an obtaining unit and a storage unit. The obtaining unit obtains a piece of assigned shared information and two or more pieces of related shared information which are distributed from the distribution device via a network. The storage unit stores the obtained assigned shared information and related shared information.

Here, it is presumed that the $i^{th}$ piece of assigned shared information is assigned to the $i^{th}$ holding device. Also, the first and second pieces of related shared information are assigned to the i−1 and i+1 holding devices that respectively correspond to the i−1 and i+1 nodes disposed on both sides of a node that corresponds to the $i^{th}$ holding device in a same closed path (ring).

As described above, each of the n holding devices in the holding system stores a piece of assigned shared information and two or more pieces of related shared information. Thus the holding system as a whole has increased redundancy of a same piece of shared information held by a plurality of holding devices, increasing the possibility of dealing with a case where the shared information held by holding devices was tampered with in an unauthentic manner.

(3) Structure of Certificate Authority Device

The certificate authority device is composed of a receiving unit, a restoring unit, a verifying unit, and an identifying unit. The certificate authority device is specifically a computer system that includes a microprocessor, ROM, RAM, a hard disk unit, a communication unit, a display unit, a keyboard, a mouse and the like. A computer program is stored in the RAM or the hard disk unit. The microprocessor operates in accordance with the computer program and causes the certificate authority device to achieve its functions.

The receiving unit receives, via the communication network, n pieces of shared information having no redundancy among a plurality of pieces of shared information that have been redundantly assigned to all of the n holding devices and stored therein.

The restoring unit temporarily restores the private information by using the received n pieces of shared information.

The verifying unit verifies the authenticity of the restored private information.

The identifying unit, when it is judged that the restored private information is not authentic, identifies a holding device which holds shared information that has been tampered with in an unauthentic manner, by using the remaining pieces of shared information held by each holding device and the n pieces of shared information that were used for restoring the private information. The identifying unit includes a first classifying unit, a second classifying unit, a combination generating unit, a verifying unit, and an excluding unit.

The first classifying unit obtains the remaining pieces of shared information held by each holding device, and classifies all the obtained pieces of shared information into the first to the $n^{th}$ groups such that (a) the $i^{th}$ piece of assigned shared information assigned to the $i^{th}$ holding device, and (b) the $i^{th}$ pieces of shared information held by the i−1 and i+1 holding devices that respectively correspond to the i−1 and i+1 nodes disposed on both sides of a node that corresponds to the $i^{th}$ holding device, belong to the $i^{th}$ group as the same piece of information.

The second classifying unit, for each of the first to the $n^{th}$ groups, classifies a plurality of pieces of shared information included in a group into sub-groups such that shared information that are the same in contents belong to a same sub-group.

The combination generating unit selects one sub-group from each of the first to the $n^{th}$ groups, selects one piece of shared information from each of the selected n sub-groups, and generates a combination composed of the selected n pieces of shared information.

The verifying unit verifies whether or not the shared information is authentic by generating private information by using all pieces of shared information included in the generated combination.

The excluding unit, when the verifying unit verifies that the shared information is authentic, recognizes a holding device that holds the shared information included in the sub-groups, as authentic, and excludes the authentic holding device.

The identifying unit identifies a holding device that holds shared information having been tampered with in an unauthentic manner, from among the remaining holding devices after the authentic holding device is excluded.

After the holding device having been tampered with is identified in this way, the restoring unit further restores the private information by using the shared information received from holding devices other than the holding device that was identified as holding shared information having been tampered with in an unauthentic manner.

As described above, the certificate authority device can identify the holding device holding shared information having been tampered with in an unauthentic manner, from among a plurality of holding devices.

(4) Withdrawing from n Holding Devices

The following describes how a holding device (withdrawal target holding device) withdraws from a group of n holding devices. Holding devices may withdraw for various reasons such as a failure or aging of the device, or, as described above, tampering with of shared information.

As described above, all the holding devices are associated with one or more closed paths (ring-like). In the following description, it is presumed that one withdrawal target holding device withdraws from the holding devices.

All the holding devices are classified into the withdrawal target holding device, holding devices adjacent to and associated with the withdrawal target holding device, and other holding devices.

Here, the holding devices adjacent to and associated with the withdrawal target holding device, and the other holding devices will be described.

(a) Structure of Holding Devices Adjacent to and Associated with Withdrawal Target Holding Device The $i^{th}$ holding device adjacent to and associated with the withdrawal target holding device includes, in addition to the above-described components, a receiving unit, a reading unit, a shared information dividing unit, and an output unit. The receiving unit receives a division instruction. The reading unit, upon receiving the division instruction, reads out a piece of shared information assigned to the withdrawal target holding device, from the storage unit. The shared information dividing unit divides the read-out piece of shared information into n−1 pieces of partial shared information. The output unit outputs the n−1 pieces of partial shared information to n−2 holding devices, which are remaining holding devices after the $i^{th}$ holding device and the withdrawal target holding device are excluded, such that a plurality of pieces of partial shared information are assigned to a plurality of pieces of shared information held by the n−2 holding devices that are disposed at the same ordinal positions as the plurality of pieces of partial shared information.

Here, the read-out shared information is obtained by adding up all the pieces of partial shared information generated by the shared information dividing unit by a predetermined method.

(b) Other Holding Devices

Each of the other holding devices includes, in addition to the above-described components, a receiving unit and a calculation unit. The receiving unit receives a plurality of pieces of partial shared information that should be assigned to a plurality of pieces of shared information held by the other holding devices, from the holding devices adjacent to and associated with the withdrawal target holding device. The calculation unit adds each of the received pieces of partial shared information to each corresponding piece of shared information that corresponds to each of the received pieces of partial shared information, among the shared information stored in the storage unit.

Here, the plurality of pieces of partial shared information are generated from the shared information assigned to the withdrawal target holding device, and correspond to a plurality of pieces of shared information stored in the storage unit.

Also, the shared information having been assigned to the withdrawal target holding device is obtained by adding up all the pieces of partial shared information generated by a predetermined method.

(5) Addition to n Holding Devices

The following describes how a holding device (additional holding device) is added to a group of n holding devices.

As described above, all the holding devices are associated with one or more closed paths (ring-like). In the following description, it is presumed that one additional holding device is inserted into the closed path at one position.

All the holding devices are classified into the additional holding device, adjacent holding devices that are adjacent to and associated with the additional holding device, holding devices that are adjacent to and associated with the adjacent holding devices, and other holding devices.

Here, the additional holding device, adjacent holding devices, and holding devices that are adjacent to and associated with the adjacent holding devices will be described.

(a) Structure of Adjacent Holding Devices

Here, the structure of the adjacent holding devices will be described.

Each of the adjacent holding devices includes, in addition to the above-described components, a receiving unit, a reading unit, a generating unit, a calculation unit, and an output unit. The receiving unit receives a notification that a holding device (additional holding device) is to be newly added, where the additional holding device corresponds to a node newly added to be adjacent to a node that corresponds to the adjacent holding device itself. The reading unit, upon receiving the notification, reads out a piece of shared information assigned to the adjacent holding device. The generating unit generates additional partial information. The calculation unit performs a calculation onto the read-out shared information by using the generated additional partial information, and writes a new piece of shared information, which is resulted from the calculation, into the storage unit to replace the read-out shared information. The output unit outputs the generated additional partial information to the additional holding device.

Here, the calculation unit obtains the calculation result by subtracting the additional partial information from the read-out shared information by a predetermined method.

Here, the output unit further outputs the generated additional partial information to other holding devices that hold the same shared information as the shared information assigned to the adjacent holding device.

Also, the receiving unit further receives second additional partial information from another adjacent holding device that corresponds to a node that is one of two nodes adjacent to the node corresponding to the additional holding device and is not the node corresponding to the adjacent holding device itself. The calculation unit further generates additional shared information by performing a calculation onto the additional partial information generated by the generating unit and the second additional partial information received by the receiving unit, and writes the generated additional shared information into the storage unit as the shared information to be assigned to the additional holding device.

Here, the calculation unit obtains the additional shared information by adding up the additional partial information and the second additional partial information by a predetermined method.

As described above, the shared information is newly assigned to each holding device.

When the shared information is newly assigned to each holding device in this way, n+1 pieces of partial shared information are generated from the new shared information, and the generated partial shared information are output to each holding device. Upon receiving the partial shared information, each holding device further updates the shared information thereof by using the received partial shared information. This makes it possible to increase the randomness of the shared information held by each holding device, while ensuring to restore the private information by using the shared information held by all the holding devices.

To achieve the purpose, the reading unit further reads out a piece of shared information newly assigned to the own holding device, from the storage unit. Also, the calculation unit generates n+1 pieces of partial shared information from the read-out piece of shared information. The output unit outputs the generated additional partial information to each holding device.

(b) Structure of Holding Devices Adjacent to and Associated with Adjacent Holding Devices Here, the structure of the holding devices that are adjacent to and associated with the adjacent holding devices will be described.

Each of such holding devices includes, in addition to the above-described components, a receiving unit, a reading unit, and a calculation unit. The receiving unit receives the additional partial information from the adjacent holding device. The reading unit reads out a piece of adjacent shared information assigned to the adjacent holding device, from the storage unit. The calculation unit performs a calculation onto the read-out adjacent shared information by using the received additional partial information, and writes the calculation result, as the shared information assigned to the adjacent holding device, into the storage unit to replace the adjacent shared information.

Also, the receiving unit receives the partial shared information. The calculation unit performs a calculation onto the shared information stored in the storage unit by using the received partial shared information, and writes the calculation result into the storage unit as the new shared information.

(c) Structure of Additional Holding Device

Here, the structure of the additional holding device will be described.

As described above, the additional holding device is newly added to a group of a holding devices each of which holds a plurality of pieces of shared information generated from one piece of private information.

The additional holding device includes a receiving unit, a generating unit, and a storage unit. The receiving unit receives additional partial information from each of at least two holding devices. The generating unit generates shared information to be assigned to the own device by using all the received pieces of additional partial information.

Also, the generating unit generates the shared information by adding up the pieces of additional partial information by a predetermined method.

The receiving unit further receives partial shared information from the holding device. The calculation unit further performs a calculation onto the shared information stored in the storage unit by using the received partial shared information, and writes the calculation result into the storage unit as the new shared information assigned to the holding device.

1.7 Other Modifications

Up to now, the present invention has been described through an embodiment thereof. However, the present invention is not limited to the embodiment, but includes, for example, the following modifications.

(1) In the above-described embodiment, the certificate authority device 140 issues a public key certificate conforming with the RSA encryption/signature. However, the encryption used in the certificate authority device 140 and the terminals A, B and C is not limited to this.

For example, the encryption/signature based on the discrete logarithm problem on the finite field or the elliptic curve encryption/signature based on the elliptic discrete logarithm problem may be used, and the certificate authority device 140 may issue a public key certificate conforming with the elliptic curve encryption/signature. The signatures may be, for example, the El Gamal signature, DSA signature, or elliptic DSA (ECDSA) signature. Also, the encryption may be, for example, the El Gamal encryption, elliptic El Gamal encryption, or PSEC encryption. For the El Gamal signature, DSA signature, elliptic DSA signature, El Gamal encryption, and elliptic El Gamal encryption, see Non-Patent Document 3 identified earlier, pages 3 to 4. For the PSEC encryption, see Non-Patent Document 4 identified earlier. The following describes a modification for using the discrete logarithm problem on the finite field.

In the following, the sign "p" represents a prime number or a power of a prime number, the sign "g" ($1 \leq g \leq (p-1)$) represents a base source, and the sign "q" represents an order of the base source. The relationship among these is represented as "$g^q = 1 \bmod p$". Here, the sign "$a^b$" represents a result of multiplying "a", "b" times. Here, the private key is represented as "x" ($1 \leq x \leq (q-1)$), and the public key is represented as "y" ($y = g^x$). That is to say, "x" is used as the "new private key". The k pieces of shared information ($x\_1, x\_2, \ldots x\_k$) are divided by the secret sharing method as shown by the following equation.

$$x = x\_1 + x\_2 + \ldots + x\_k \bmod q$$

Also, as the secret sharing method, multiplication/division may be used instead of the above-described addition/subtraction. In this case, the method is shown by the following equation.

$$x = x\_1 \times x\_2 \times \ldots \times x\_k \bmod q$$

In this case, the "multiplication" corresponds to "addition" in Embodiment 1, and the division of "mod q" corresponds to "subtraction" in Embodiment 1.

Similarly, in the case of using the elliptic discrete logarithm problem, when the sign "G" represents a base point (a point on an elliptic curve) and the sign "q" represents an order of the base point, the relationship between them is represented as "$q*G = O$". Here, the sign "*" represents a scalar multiplication of the elliptic curve, and "$q*G$" represents that q pieces of Gs are added in a group of the elliptic curve. Here, the private key is represented as "x" ($1 \leq x \leq (q-1)$), and the public key is represented as "Y" ($Y = x*G$). That is to say, "x" is used as the "new private key". Note that the secret sharing method is used in the same way as when the discrete logarithm problem on the finite field is used. Also, it has been described that in the case of using the discrete logarithm problem on the finite field, the sign "p" represents a system parameter, that in the case of using the elliptic discrete logarithm problem, an equation of elliptic curve or its parameter is used as a system parameter, and that the signs "y" and "Y" respectively represent public keys. However, not limited to this, these system parameters may be included as public keys. Also, although it is preferable that "q" is a prime number, but "q" may not be a prime number.

(2) In the above-described embodiment, the authenticator storage unit 253 of the shared information holding device stores an authenticator (certificate) that is used to verify whether or not the "new private key" has been generated in an authentic manner. However, the present invention is not limited to this structure.

The key distribution device 130 or the certificate authority device 140 may hold the authenticator (certificate).

Here, a modification for a case where the key distribution device 130 holds the authenticator is explained.

When the key distribution device 130 holds the authenticator, the authenticator storage unit 253 is provided in the key distribution device 130. In the initial design process, the key distribution device 130 stores the generated authenticator into the authenticator storage unit 253. In the analysis/recovery process, the key distribution device 130, upon receiving an instruction for starting the recovery process from the certificate authority device 140, transmits the authenticator stored in the authenticator storage unit 253, to the certificate authority device 140. The certificate authority device 140 uses the authenticator to verify whether or not the "new private key" has been generated in an authentic manner.

Here, a modification for a case where the certificate authority device 140 holds the authenticator is explained.

When the certificate authority device 140 holds the authenticator, the authenticator storage unit 253 is provided in the certificate authority device 140. In the initial design process, the key distribution device 130 transmits the generated authenticator to the certificate authority device 140. The certificate authority device 140 receives the authenticator and stores it into the authenticator storage unit 253. In the analysis/recovery process, when a "new private key" has been generated, the certificate authority device 140 uses the authenticator stored in the authenticator storage unit 253 to verify the "new private key".

(3) In the above-described embodiment, the certificate authority device 140 performs the analysis/recovery process. However, the present invention is not limited to this structure.

A device (for example, an analysis device and a recovery device) other than the certificate authority device 140 may perform the analysis/recovery process. Alternatively, a certificate authority device other than the certificate authority device 140 may be booted and the other certificate authority device may perform the analysis/recovery process. With such a structure, even if the certificate authority device 140 is attacked and taken over by a malicious third party, the processes recited in the embodiment can be executed.

Here, a modification for a case where the analysis device and the recovery device perform the analysis/recovery process is explained.

When the recovery device performs the recovery process, the recovery device includes the private key storage unit 401, the private key generating unit 414, the private key verifying unit 415, and the unauthentic device identifying unit 416 shown in FIG. 8, and, in addition, a private key transmitting unit.

The station device 140 includes the private key storage unit 401, the terminal certificate issuing unit 412, the certificate authority certificate storage unit 413, and, in addition, a private key receiving unit. The private key transmitting unit transmits the "new private key" to the certificate authority device 140. The private key receiving unit receives the "new private key" from the recovery device.

The analysis/recovery process is performed by the analysis device and the recovery device as follows. First, when an external device detects a leak of the private key 141 from the certificate authority device 140, the external device notifies it to the analysis device.

Upon receiving the notification, the analysis device, as described in the embodiment above, analyzes the cause of the leakage by checking the log of the certificate authority device 140 or the like. When it determines that the private key of the certificate authority device 140 needs to be updated, as a result of the analysis, the analysis device outputs a request for recovering the private key, to the recovery device.

Upon receiving the recovery request, the recovery device performs the recovery process as described in the embodiment above and generates the "new private key". The recovery device transmits the generated "new private key" to the certificate authority device 140.

Upon receiving the "new private key", the certificate authority device 140 stores the "new private key" into the private key storage unit 401.

Here, the communication path through which the "new private key" is transferred between the recovery device and the certificate authority device 140 may be a security-ensured communication path.

(4) In the above-described embodiment, each shared information holding device holds one piece of shared information in the shared information storage unit. However, the present invention is not limited to this structure.

Each shared information holding device may hold two or more pieces of shared information in the shared information storage unit. That is to say, the key distribution device may assign two or more pieces of shared information to each shared information holding device.

Suppose, for example, that each shared information holding device holds two pieces of shared information. In this case, in the withdrawal/addition process, a plurality of pieces of partial information are generated from a sum of values of the two pieces of shared information.

Also, when the modification information is subtracted from the shared information in the addition process, the modification information is generated such that the sum of values of the two pieces of shared information is equivalent with a sum of the value of modification information and the value of shared information. More specifically, the modification information may be subtracted from any one of the two pieces of shared information. Note that this is merely an example, and, for example, the modification information may be divided into two pieces of partial modification information, and the two pieces of partial modification information may be subtracted from the two pieces of shared information, respectively.

(5) In the above-described embodiment, each shared information holding device holds two pieces of other device shared information. However, the present invention is not limited to this structure.

Each shared information holding device may hold three or more pieces of other device shared information. When each shared information holding device may hold three or more pieces of other device shared information, the processes may be expanded accordingly except that in the withdrawal/addition process, two or more shared information holding devices should verify the partial information and the shared information in the verification processes.

(6) In the above-described embodiment, the private key of the certificate authority device 140 is restored by using the shared information holding devices. However, the present invention is not limited to this structure.

For example, a system without the certificate authority device 140 may be constructed, and in which the shared information holding devices may be used to issue a certificate to the terminals A, B and C. Here, a modification for a case where a certificate is issued to the terminals A, B and C is explained.

In the following explanation, six pieces of shared information ($d\_1, d\_2, \ldots d\_6$) are generated from a private key "d", and the generated six pieces of shared information are distributed to the six shared information holding devices, respectively. Here, it is presumed that a relationship represented by "$d = d\_1 + d\_2 + \ldots + d\_6$" is satisfied.

To issue a certificate to the terminals by using the shared information holding devices, first, each shared information holding device generates partial signatures ($s\_1, s\_2, \ldots s\_6$) by raising the hash value "h" of the signature-target data, with the shared information of the own device being the exponent, and transmits the generated partial signatures to the terminals. The partial signatures generated by the shared information holding devices are represented as follows: $s\_1 = h^{d\_1}; s\_2 = h^{d\_2}; \ldots; s\_6 = h^{d\_6}$. The terminals calculate a product of the partial signatures received from each shared information holding device, and generates a certificate by using signature data "S", based on "$S = s\_1 \times s\_2 \times \ldots s\_6 \mod n$". The terminals further verify the certificate. When the verification of the certificate results in the failure, a process similar to the recovery process is performed. In this case, the shared information cannot be transmitted to the terminals. Therefore, the terminals collect the partial signatures by using the other device shared information, and identify an unauthentic shared information holding device. In this case, the partial signature, instead of the shared information, is divided into sub-groups, and "generate a certificate by using partial signatures indicated by each combination and verify the generated certificate", instead of "generate a certificate by generating a new private key by using shared information indicated by each combination and verify the generated certificate" as in Embodiment 1.

The information of a detected unauthentic shared information holding device is transmitted to each shared information holding device. Alternatively, each shared information holding device, by itself, may identify the unauthentic shared information holding device. Even with this structure, the withdrawal/addition process can be performed in the same manner.

In the initial design or next-round preparation process, a key distribution device may be booted to generate the private key and shared information, and after distributing these information to each shared information holding device, the key distribution device may be dismantled.

Also, the following two structures may be used depending on the conditions: the certificate authority device 140 issues a certificate to the terminals when the certificate authority device 140 can be built for use; and each shared information holding device issues a certificate to the terminals when the certificate authority device 140 cannot be built for use. Further, it is possible to use the same private key in both of the structures by dividing the private key of the certificate authority device 140 into key pieces and distributing the key pieces respectively to the shared information holding devices when switching from a structure with the certificate authority device 140 to a structure without the certificate authority device 140; and by restoring the private key from the shared information held by the shared information holding devices and using the restored key as the private key of the certificate authority device 140 when switching from a structure without the certificate authority device 140 to a structure with the certificate authority device 140.

The following describes the issuance of the certificate and a specific operation of an unauthentic device.

<Issuance of Certificate>

The shared information holding devices 121-126 generate partial signatures (s_1 to s_6) by using the shared information 211 to 216 of their own.

The shared information holding devices 121-126 transmit the generated partial signatures to a terminal 150 that has requested to issue a certificate.

Figure 38:
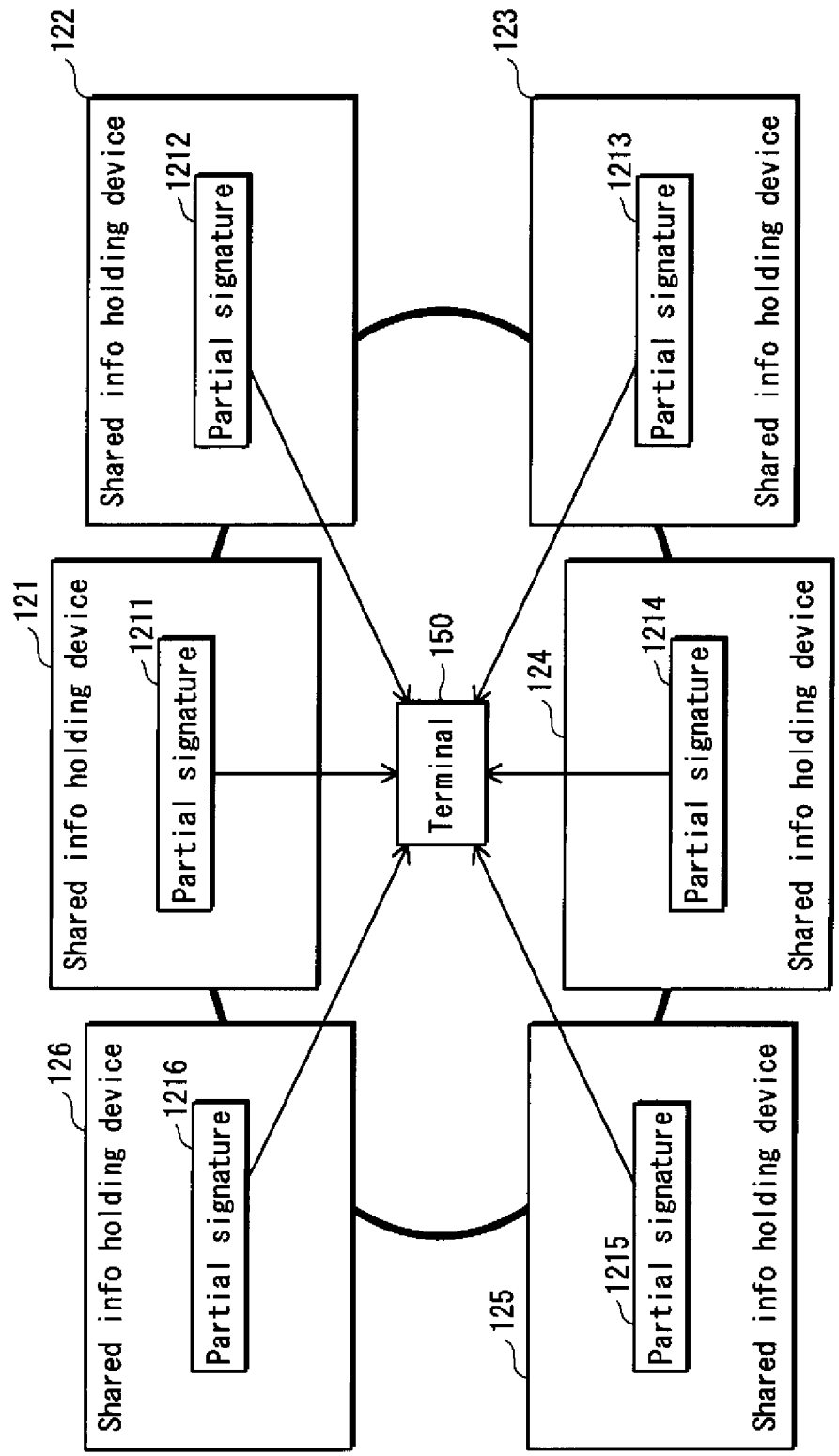
FIG. 38 shows an example of the distribution of the partial signatures.

Also, the shared information holding devices 121-126, as shown in FIG. 38, transmit the generated partial signatures to the shared information holding device other than the own device. Here, partial signature 1XXX represents a partial signature generated with use of shared information XXX.

The terminal 150 that has requested to issue a certificate generates a certificate by using all the partial signatures (s_1 to s_6).

The terminal 150 verifies the generated certificate. For example, the terminal 150 verifies the signature data S included in the certificate, by using the public key corresponding to the private key "d". The technology for verifying the signature is known, and thus description thereof is omitted here.

Note that the shared information holding devices may verify the certificate and judge whether or not the certificate is authentic.

<Specific Operation of Unauthentic Device>

When the terminal 150 judges that a certificate is unauthentic as a result of verification thereof, the terminal 150 notifies the result to each of the shared information holding devices 121-126.

Upon receiving the notification, each of the shared information holding devices 121-126 identifies an unauthentic shared information holding device by using the partial signatures.

Here, how to identify an unauthentic shared information holding device will be described with reference to FIG. 39.

Note that other device partial signature 1XXX_Y shown in the drawings represents a partial signature that was generated by using the first or second other device shared information XXX_Y.

Figure 39:
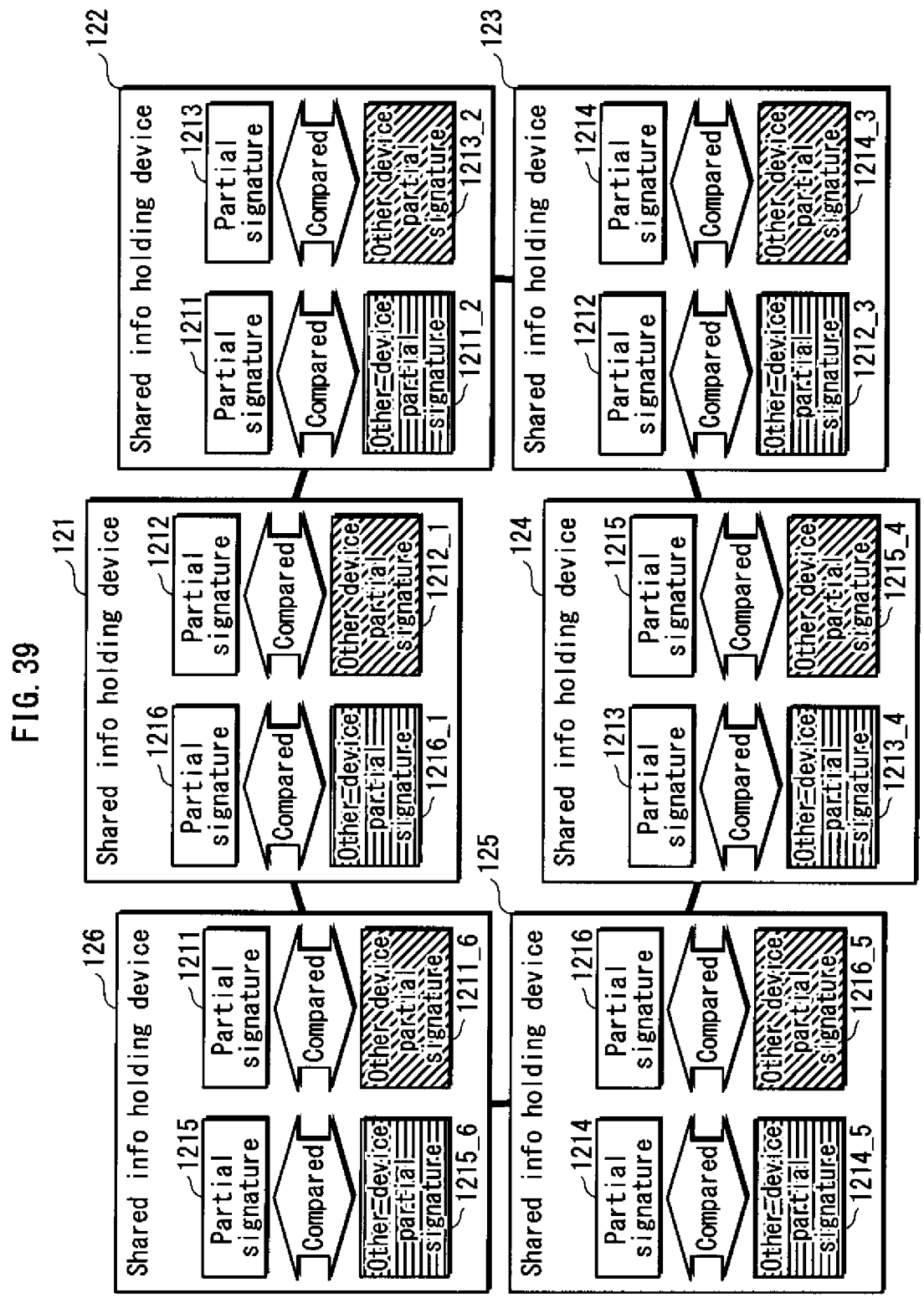
FIG. 39 shows an example of identifying an unauthentic shared information holding device by using the partial signatures.

FIG. 39 shows that each of the shared information holding devices 121-126 compares partial signatures with other device shared signatures that are generated from the other device shared information held by the own device.

With this structure, a shared information holding device having a not-matching partial signature is detected as unauthentic.

Note that in the present example, each shared information holding device compares partial signatures with other device shared signatures that are generated from the other device shared information held by the own device. However, the present invention is not limited to this structure.

For example, all the partial signatures may be collected in one shared information holding device, which then may compare the collected partial signatures with each other.

(7) In the above-described embodiment, the private key is backed up or updated. However, not limited to this, what is to be backed up or updated may be the common key used in the common key encryption system, secret information such as a password, program, or data. When program or data is backed up or updated, the program or data may be contained in a tamper-resistant module.

(8) In the above-described embodiment, the invention is used in a certificate authority system based on the public key. However, not limited to this, the invention may be used in other systems which require a source of reliability such as the certificate authority device 140 in the certificate authority system 100. For example, the invention may be used in secure implementation of software such as tamper-resistant software.

Figure 40:
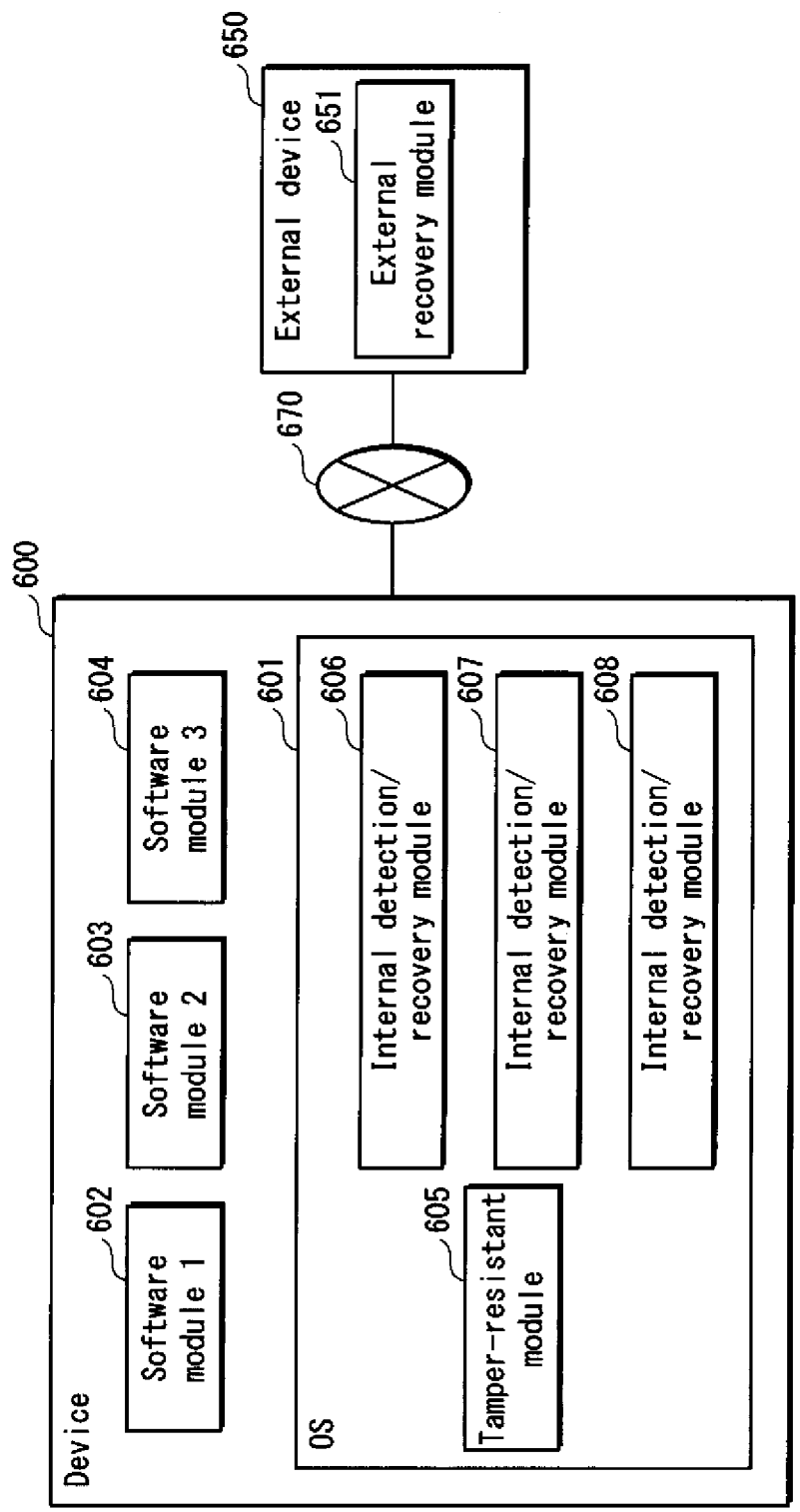
FIG. 40 shows an example of another application of the present invention.

FIG. 40 shows an example of such.

A device 600, which is specifically a television or a portable terminal, performs communications with an external device 650 via a network 670. The device 600 is implemented with a secure configuration (hereinafter referred to as secure implementation).

The device 600 includes an OS (Operating System) 601, a software module 1 602, a software module 2 603, and a software module 3 604.

The OS 601 includes a tamper-resistant module 605 and internal detection/recovery modules 606-608.

The tamper-resistant module 605 stores secret information (in this example, a private key). When the private key is leaked, the private key is restored with use of the software module 1 602, the software module 2 603, the software module 3 604, or the internal detection/recovery modules 606-608.

Also, the tamper-resistant module 605 detects whether an analysis has been performed by any software module operating inside or outside the device and whether any software module has been tampered with, to prevent the software modules operating inside the device from being analyzed or tampered with by the other software modules (not illustrated) operating inside or outside the device.

The internal detection/recovery modules 606-608 correspond to the shared information holding devices described in the embodiment above.

The internal detection/recovery modules 606-608 store shared information generated from a new private key. The internal detection/recovery modules 606-608 output the stored shared information to the tamper-resistant module 605 when the new private key should be restored.

Also, the internal detection/recovery modules 606-608 can detect a functional reduction of the tamper-resistant module 605. Upon detection of a functional reduction, the internal detection/recovery modules 606-608 send a request for a tamper-resistant module for update to the external device 650 via the network 670. Upon receiving the tamper-resistant module for update from the external device 650, the internal detection/recovery modules 606-608 update the current tamper-resistant module 605 with the received tamper-resistant module for update.

Note that the update of the shared information in the internal detection/recovery module withdrawal/addition process is performed in the same manner as described in the embodiment above, and description thereof is omitted here.

The software module 1 602, software module 2 603, and software module 3 604 respectively correspond to the shared information holding devices described in the embodiment above.

The software module 1 602, software module 2 603, and software module 3 604 store shared information generated from a new private key. The software module 1 602, software module 2 603, and software module 3 604 output the stored shared information to the tamper-resistant module 605 when the new private key should be restored.

Note that the update of the shared information in the software module withdrawal/addition process is performed in the same manner as described in the embodiment above, and description thereof is omitted here.

The external device 650 includes an external recovery module 651.

The external recovery module 651, upon receiving a request for a tamper-resistant module for update from the device 600 via the network 670, outputs the tamper-resistant module for update to the device 600 via the network 670.

Here, each software module may be protected by the tamper-resistant software module, or may operate inside the tamper-resistant software module.

(9) In the above-described embodiment, the private key storage unit 401 may be provided in a security-secured module such as a tamper-resistant software module. Also, it has been described that the terminal certificate issuing unit 412 issues a certificate by applying a digital signature to the public key of the terminal. However, not limited to this, a pair of keys of the terminal may be generated in compliance with the public key encryption, and then issued.

(10) In the above-described embodiment, each of the shared information and the first and second other device shared information may be attached with an identifier when these information are distributed by the key distribution device 130.

Here, the identifier is information that is composed of a device ID and an information ID. The device ID identifies the distribution destination. The information ID identifies any of the shared information and the first and second other device shared information. More specifically, when the key distribution device 130 transmits, to the shared information holding device 121, shared information d_1, first other device shared information d1_2, and second other device shared information d2_6, the shared information d_1 is attached with an identifier composed of "ID_1" and "ID_A", the first other device shared information d1_2 is attached with an identifier composed of "ID_1" and "ID_B", and the second other device shared information d2_6 is attached with an identifier composed of "ID_1" and "ID_C". Note that "ID_A", "ID_B" and "ID_C" are information IDs that respectively identify the shared information and the first and second other device shared information.

Each shared information holding device, upon receiving the shared information and the first and second other device shared information and the identifies attached respectively to these information, stores the received information and identifies by associating the information and identifies with each other. Also, when the shared information holding device transmits the shared information and the first and second other device shared information to other shared information holding devices or the certificate authority device 140, it transmits the identifiers respectively associated with these information, as well.

(11) In the above-described embodiment, the shared information holding device 126 generates and distributes five pieces of partial information to the shared information holding devices, and the shared information holding device 122 verifies the shared information that is generated from the partial information. However, the present invention is not limited to this structure.

A shared information holding device holding shared information that is the same as the shared information 211 held by the shared information holding device 121 may generates five pieces of partial information, and a shared information holding device which is different from the shared information holding device having generated the five pieces of partial information and which is holding shared information that is the same as the shared information 211 may perform the verification.

The following is one example of such. The shared information holding device 122 generates five pieces of partial information from shared information 211_2, and distributes the generated shared information to the shared information holding devices. The shared information holding device 126 verifies the partial information. Another example of such is as follows. The shared information holding device 121, which is to withdraw, generates five pieces of partial information from shared information 211, and distributes the generated shared information to the shared information holding devices. The shared information holding device 122 or the shared information holding device 126 or both of them verify the partial information.

(12) In the above-described embodiment, the second update process during the withdrawal process may be performed in the earlier stage of the withdrawal process, such as in the partial information generation process.

In the case where the second update process is performed in the partial information generation process, when the generated partial information d_1_1 and d_1_2 are distributed to the shared information holding device 122, partial information d_1_5 and shared information d_6 need to be transmitted, as well.

Figure 19:
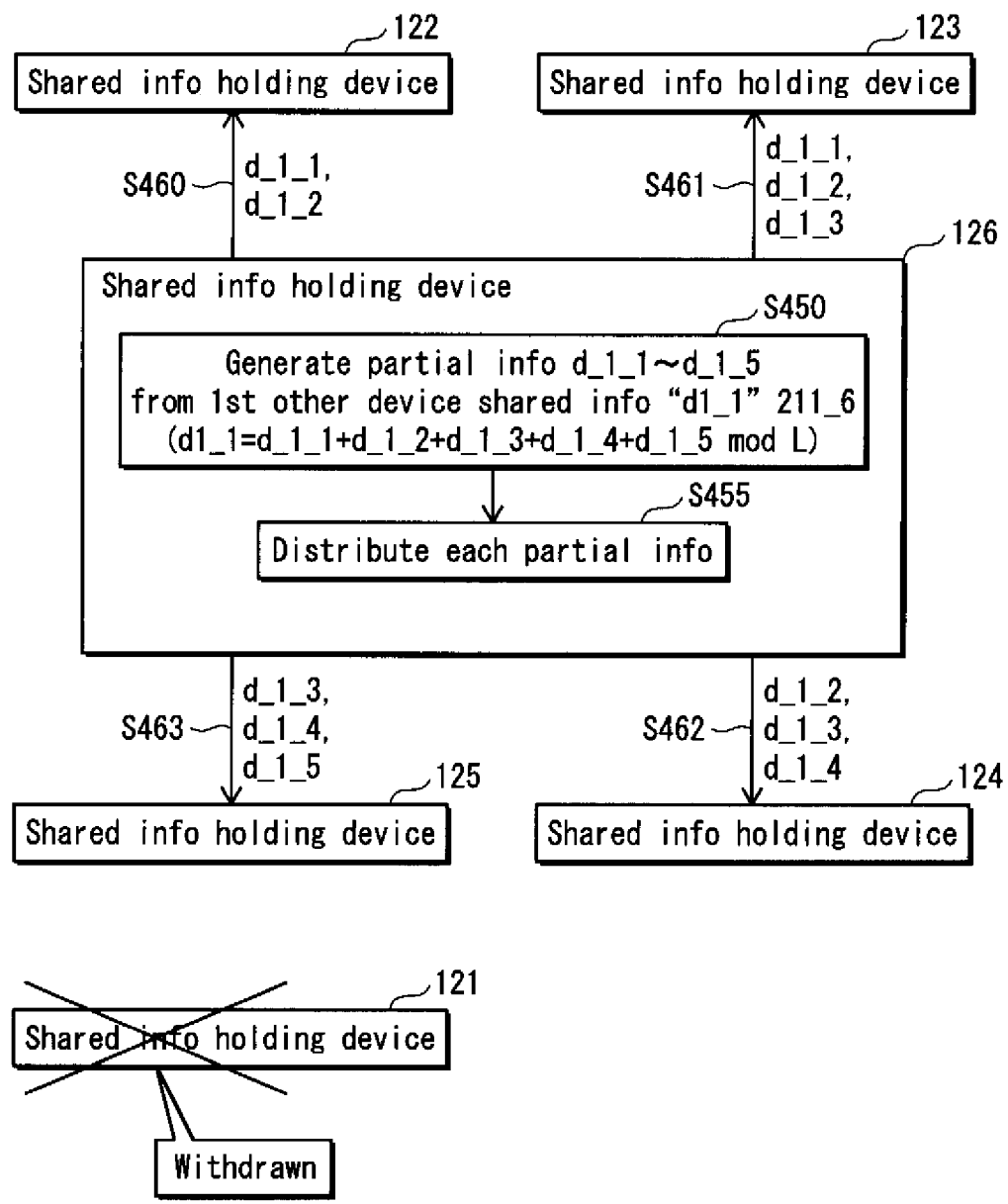
FIG. 19 is a flow diagram showing the operational flow of the partial information generation process.
Figure 20:
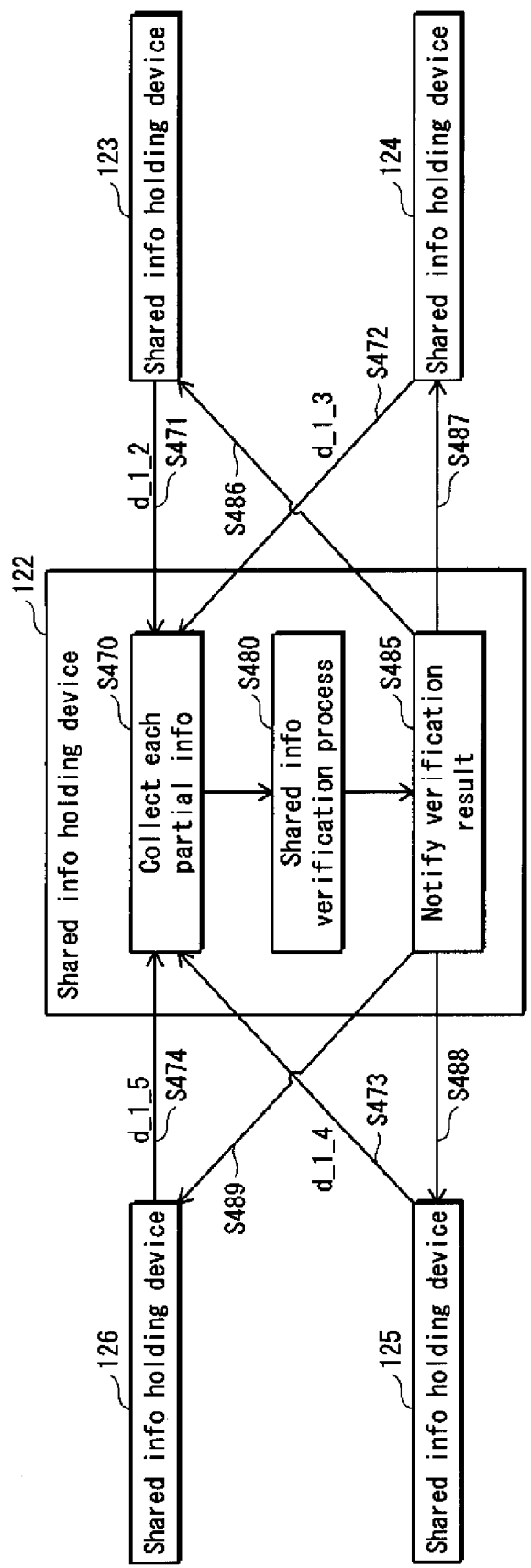
FIG. 20 is a flow diagram showing the operational flow of the shared information verification process.

Also, the steps S460 through S463 shown in FIG. 19 may not necessarily be performed in the stated order, and the steps S471 through S473 and the steps S486 through S489 shown in FIG. 20 may not necessarily be performed in the stated order. Further, the steps S600 and S611 and the steps S605 and S616 shown in FIG. 23 may not necessarily be performed in the stated order.

Figure 18:
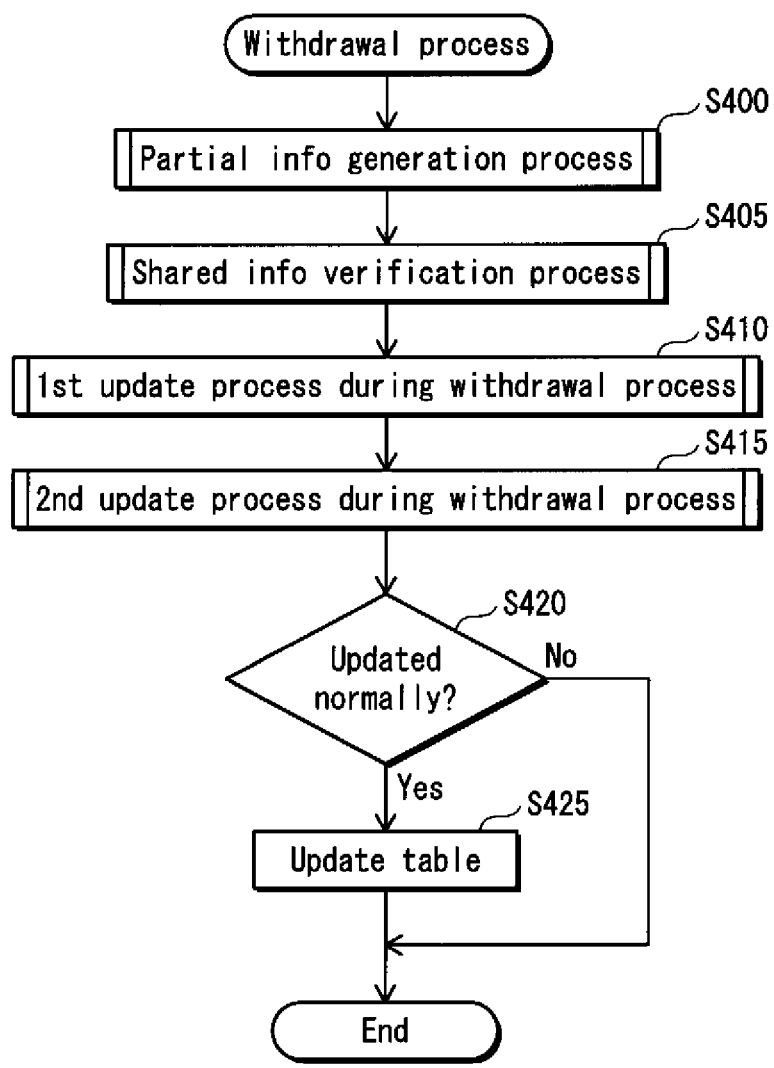
FIG. 18 is a flow diagram showing the operational flow of the withdrawal process.

(13) The judgment process performed in step S420 shown in FIG. 18 in the embodiment above is not indispensable.

Also, it has been described that the withdrawal process is performed by the shared information holding devices. However, the present invention is not limited to this structure. For example, as in the initial design process, the key distribution device may newly generate a "new private key", generate shared information, and re-distribute the generated shared information to shared information holding devices, except for the shared information holding device to withdraw. Alternatively, the key distribution device may restore the "new private key" and distribute the shared information.

(14) In the first and second update processes during the addition process described above, the shared information is divided into seven pieces of partial information and the seven pieces of partial information are distributed. However, the present invention is not limited to this structure. One piece of modification information may be generated, and then each piece of partial information may be updated by using the generated piece of modification information.

For example, in the first update processes during the addition process, the shared information holding device 121 may generate modification information m1, generate six pieces of partial information from the modification information m1, and distribute the generated pieces of partial information to the other shared information holding devices.

In this case, the shared information holding device 121 associates a different piece of partial information to a piece of partial information held by each of the other shared information holding devices, and when distributing to the other shared information holding devices, distributes, to each of the other shared information holding devices, three pieces of partial information respectively associated with the three pieces of shared information held by the destination device.

Upon receiving these, each of the other shared information holding devices generates new shared information, first and second other device shared information by adding the received pieces of partial information respectively to corresponding shared information, first and second other device shared information. Also, the shared information holding device 121 calculates new shared information D__1 by subtracting modification information m1 generated from the shared information held by the own device. The shared information holding device 121 generates new first and second other device shared information by adding pieces of partial information respectively to corresponding first and second other device shared information held by the shared information holding device 121.

The above-described modification can be applied to the second update process in the same manner, and thus description thereof is omitted here.

Figure 25:
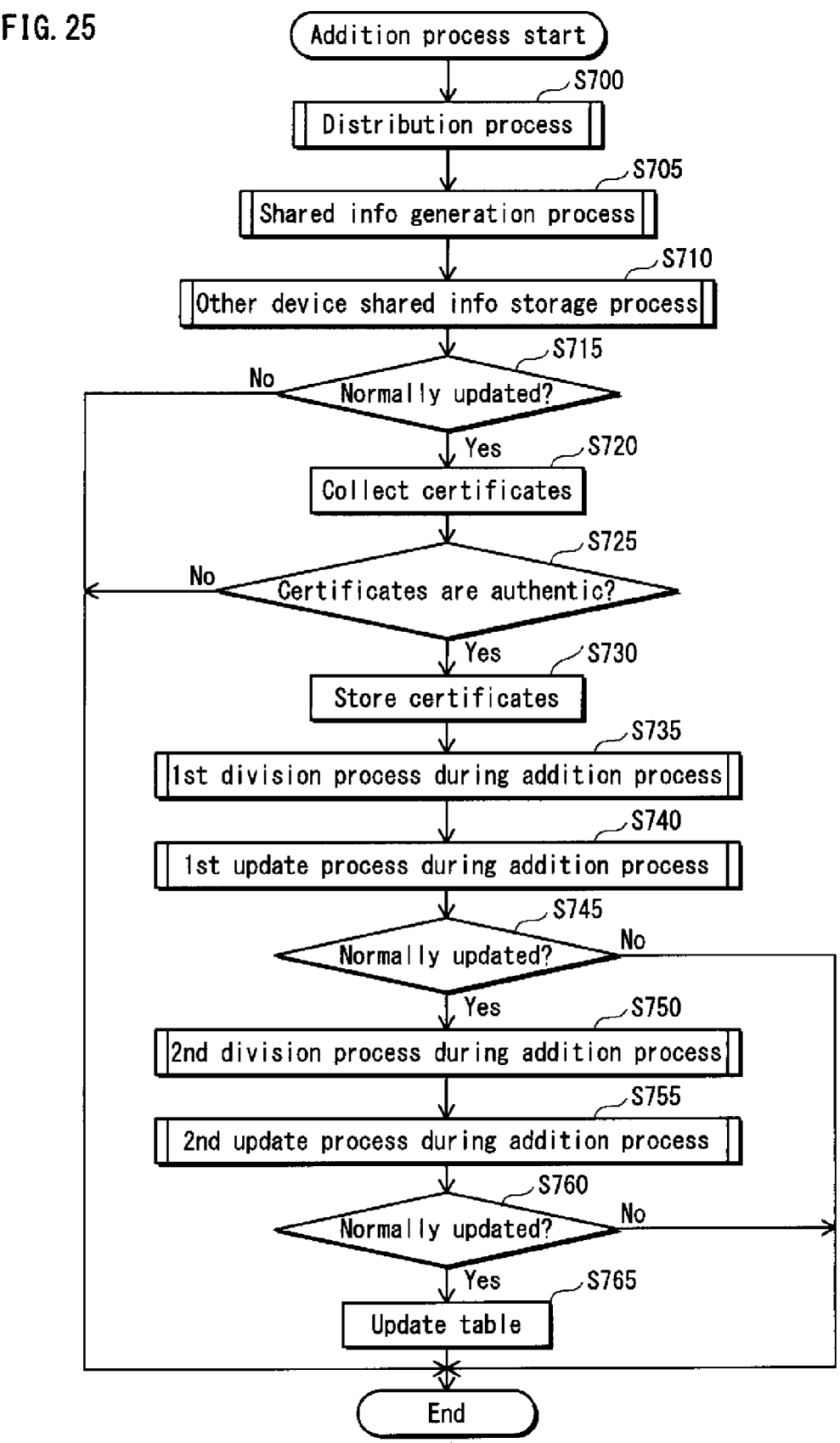
FIG. 25 is a flow diagram showing the operational flow of the addition process.
Figure 26:
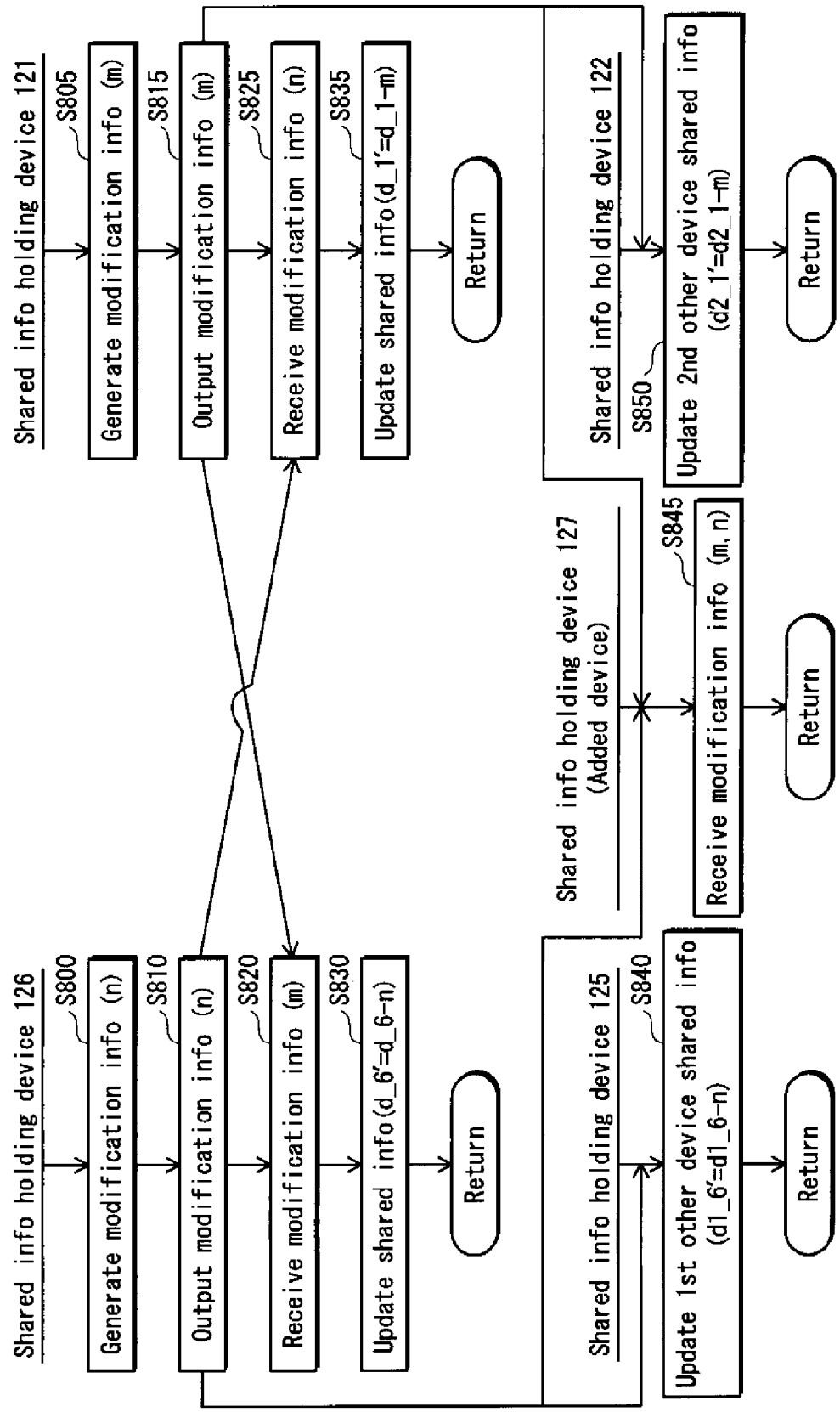
FIG. 26 is a flow diagram showing the operational flow of the distribution process.

Also, the step S705 shown in FIG. 25 may be performed before or within the step S700. Also, the steps S810 and S815 shown in FIG. 26 may not necessarily be performed in the stated order. Also, the devices 126, 127 and 121 shown in FIG. 27 may not necessarily update the shared information in the stated order. Furthermore, the steps S900 through S910 and the steps S915 through S925 shown in FIG. 28 may not necessarily be performed in the stated order. Furthermore, the steps S956 through S961 shown in FIG. 29 may be performed in any order as far as the steps are performed after the partial information are generated.

(15) In the above-described embodiment, the shared information are transferred on a security-secured communication path between devices, and the devices verify whether or not the received shared information matches a stored value. However, the present invention is not limited to this structure.

For example, the verification may be performed with use of an encryption protocol such as the zero-knowledge proof. The zero-knowledge proof and the encryption protocol are explained in detail in Non-Patent Document 1, pages 132-150 and pages 224-225, respectively.

(16) In the above-described embodiment, the processes performed in steps S715, S725, S745, and S760 and steps S735 through S755 shown in FIG. 25 are not indispensable.

Also, it has been described that the addition process is performed by the shared information holding devices. However, the present invention is not limited to this structure. For example, as in the initial design process, the key distribution device may newly generate a "new private key", generate shared information, and re-distribute the generated shared information to shared information holding devices including the additional shared information holding device. Alternatively, the key distribution device may restore the "new private key" and distribute the shared information.

(17) In the above-described embodiment, the shared information updating unit 260__j may not delete the pre-update shared information during the update process, but may delete it at a different timing, such as during the next update process or when a request for deleting the pre-update shared information is received from outside.

(18) In the above-described embodiment, the shared information dividing unit 261__j may generate a plurality of pieces of shared information to keep the sum of the values.

For example, when a plurality of pieces of partial information are generated from a plurality of pieces of shared information, the partial information may be generated so that the sum of the plurality of pieces of partial information is equivalent with the sum of the plurality of pieces of shared information.

(19) In the above-described embodiment, the shared information verifying unit 262__j and the other device shared information verifying unit 263__j verify the shared information by a method of directly comparing the values of shared information with each other. However, not limited to this, other methods may be used for the comparison. For example, the comparison may be performed by using a verification value such as the hash value of the shared information.

(20) In the above-described embodiment, the shared information storage unit 251 or the other device shared information storage unit 252 stores the shared information. However, not limited to this, shared information including an identifier for identifying a shared information holding device that stores the shared information may be stored.

(21) Here, specific examples of key leak detection methods to be applied to in the above-described embodiment are explained.

The first example is as follows. That is to say, a detection device dedicated for detecting a leak of the private key 141 regularly checks whether or not the private key 141 of the certificate authority device 140 has been leaked. More specifically, the detection device detects whether or not an unauthentic certificate, which has not been issued by the certificate authority device 140, has been issued. Upon detecting a leak of the private key 141, the detection device notifies the fact to the certificate authority device 140.

The second example is a method of checking whether or not a private key held by the certificate authority device 140 has been uploaded onto a web site.

Also, the detection device, as well as detecting a leak of the private key, may detect deterioration of the security of the encryption algorithm. When it detects deterioration of the security of the encryption algorithm, the detection device may change the bit length of the "new private key", or change the encryption algorithm itself from the RSA encryption to elliptic encryption, for example.

It has been described that the detection device detects whether or not the private key 141 of the certificate authority device 140 has been leaked. However, not limited to this, the shared information holding devices 121-126, the key distribution device 130, or the certificate authority device 140 itself may detect whether or not the private key 141 has been leaked.

(22) In the above-described embodiment, the new private key "d" is restored in the recovery process. However, the present invention is not limited to this structure.

The certificate authority device 140 may restore the private key 141 that is currently used. In this case, each shared information holding device stores shared information generated from the private key 141.

Note that a plurality of pieces of shared information can be generated from the private key 141 and the private key 141 can be generated from a plurality of pieces of shared information in the same manner as described in the embodiment above, and thus description thereof is omitted here. Also, the shared information can be updated during the withdrawal/addition process in the same manner as described in the embodiment above.

With this structure, when the data of the private key 141 is partially missing, the certificate authority device 140 can restore the private key 141 by using the shared information held by each shared information holding device, eliminating the need for newly generating a private key. This makes it possible to maintain the authentication system by performing a minimum process.

Also, since the certificate authority device 140 restores the private key 141 by using the shared information held by each shared information holding device, it is possible to restore the information that has been encrypted by using the private key 141.

(23) In the above-described embodiment, a plurality of shared information holding devices are associated with each other in a closed path (ring). However, the present invention is not limited to this structure.

A plurality of shared information holding devices may be associated with each other in two or more closed paths (rings).

For example, suppose that p shared information holding devices are associated with each other in a first closed path, and q shared information holding devices are associated with each other in a second closed path, where p and q are each an integer of "1" or higher. Note that the method for associating a plurality of shared information holding devices with each other to form a closed path has already been described in the embodiment, and description thereof is omitted here.

In this case, the devices forming the first closed path are used to generate a new private key d, and the devices forming the second closed path are used to generate a current private key.

Also, for example, the following structure may be used. That is to say, the first closed path is formed by three shared information holding devices that respectively hold the shared information $d\_1$ through $d\_3$ shown in the embodiment, and the second closed path is formed by three shared information holding devices that respectively hold the shared information $d\_4$ through $d\_6$.

When the first through the $r^{th}$ closed paths have been formed, the new private key can be restored by distributing a plurality of pieces of shared information $(d\_1, d\_2, \ldots d\_r)$ that were generated from the new private key d, in the following manner, where "r" is an integer of "2" or higher.

The key distribution device 130 distributes a plurality of pieces of partial information having been generated from shared information $d\_i$ to a plurality of devices forming the $r^{th}$ closed path. Note that the method for distributing the partial information is the same as the method for distributing the shared information having already been described in the embodiment, and description thereof is omitted here.

The certificate authority device 140 generates the shared information $d\_i$ by using the devices forming the first closed path, generates all pieces of shared information $(d\_1, d\_2, \ldots d\_r)$, and then restores the new private key by calculating the sum of the generated pieces of shared information.

Also, when the first through the $r^{th}$ closed paths have been formed, the current private key can be restored by using the above-described method of assigning the shared information, method of distributing the partial information generated from the shared information, and method of restoring the current private key.

(24) In the above-described embodiment, the control unit 403 of the certificate authority device 140 includes the certificate authority certificate storage unit 413. However, the present invention is not limited to this structure.

The certificate authority device 140 may not include the certificate authority certificate storage unit 413. That is to say, the certificate authority device 140 may be composed of the private key storage unit 401, the list storage unit 402, the control unit 403, the first and second transmission/reception units 404 and 405, and the certificate authority certificate storage unit 413. In this case, the control unit 403 includes constitutional elements except for the certificate authority certificate storage unit 413.

Figure 11:
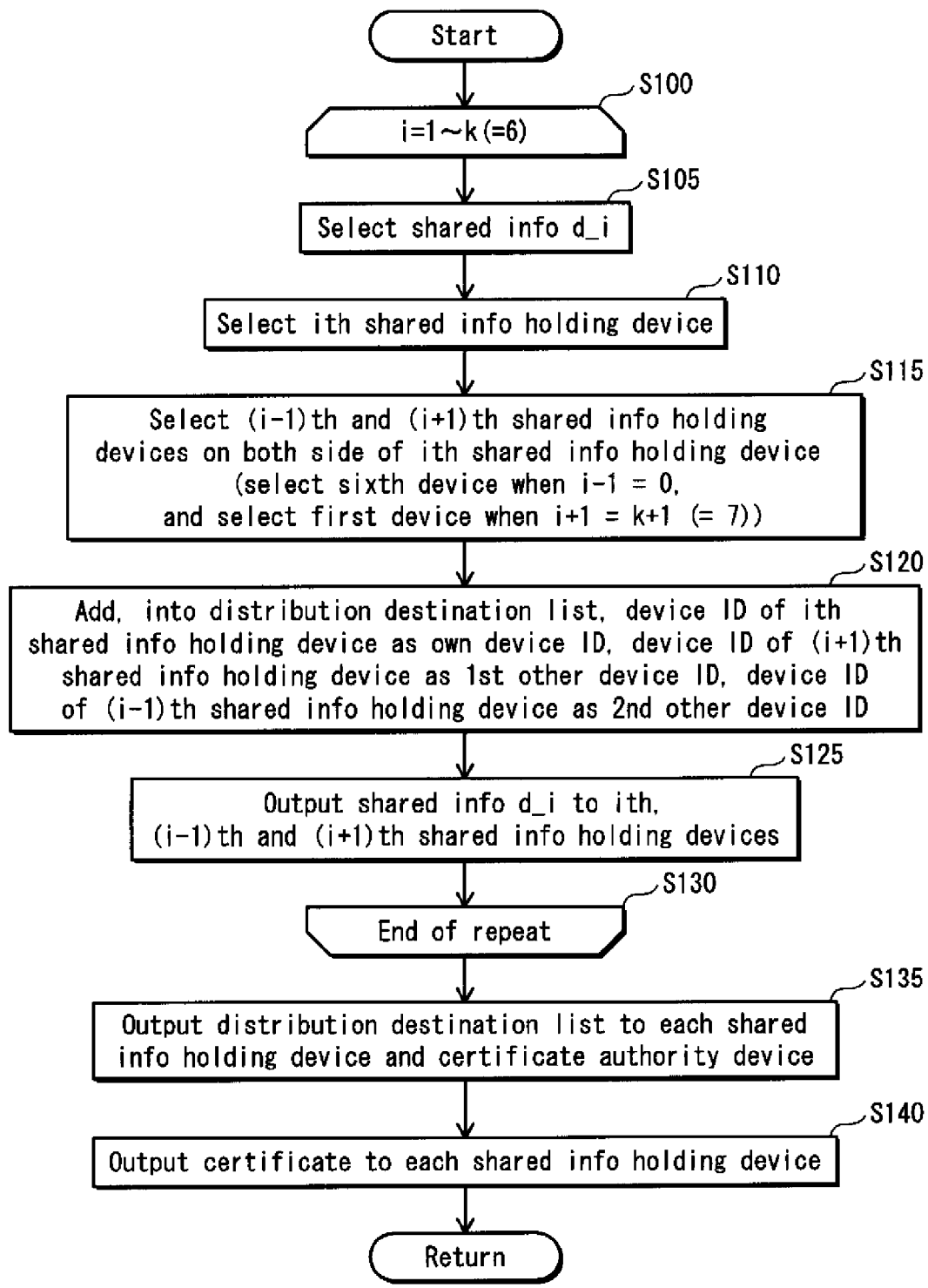
FIG. 11 is a flow diagram showing the operational flow of the process of distributing the shared information, the certificate, and the distribution destination list.

(25) In the above-described embodiment, the method of distributing the shared information from the key distribution device 130 to the shared information holding devices is not limited to the method shown in FIG. 11.

The key distribution device 130 may determine, for each of the shared information holding devices to which the shared information is to be distributed, an information group composed of three pieces of shared information that should be held thereby, and distribute the determined information groups to the shared information holding devices, respectively. In this case, identification information for identifying which among the three pieces of shared information are the other device shared information is attached to each information group.

Alternatively, a plurality of pieces of shared information may be distributed to corresponding shared information holding devices, and then other device shared information that should be held by the shared information holding devices may be distributed thereto.

That is to say, any sharing method may be used as far as each shared information holding device is distributed with a piece of shared information and two pieces of other device shared information, and holds the distributed pieces of information.

(26) In the above-described embodiment, the key distribution device 130 generates shared information and distributes the generated shared information to a plurality of shared information holding devices. However, the present invention is not limited to this structure.

Each of a plurality of shared information holding devices may generate shared information and distribute the generated shared information.

More specifically, the following is possible. Each of the shared information holding devices 121-126 generates shared information and generates a public key complying with the public key encryption, based on the generated shared information.

This generation method is described in detail in Non-Patent Document 5 identified earlier, and description thereof is omitted here.

Each shared information holding device transmits the shared information of the own device based on the device information list T200 which is preliminarily stored therein.

For example, the shared information holding device 121 sends shared information 211 to the shared information holding device 122 and the shared information holding device 126, as shown in FIG. 41.

The shared information holding device 122 and the shared information holding device 126 store the received shared information 211 as other device shared information 211_2 and 211_6, respectively.

(27) In the above-described embodiment, each shared information holding device stores, as the other device shared information, shared information assigned to shared information holding devices that are associated to be adjacent to the own device. That is to say, each shared information holding device stores shared information assigned to other shared information holding devices that are associated with the shared information assigned to the own device. However, the present invention is not limited to this structure.

Each shared information holding device may hold shared information assigned to one or more other shared information holding devices.

(28) In the above-described embodiment, k pieces of shared information are generated by the secret sharing method so that the original private information can be restored from the sum of the generated k pieces of shared information. However, the present invention is not limited to this structure.

The k pieces of shared information may be generated by the secret sharing method so that the original private information can be restored by using other calculations.

For example, k pieces of shared information may be generated by the secret sharing method so that the original private information can be restored by performing multiplications. Note that the method for generating the k pieces of shared information has been described in (1) above, and description thereof is omitted here.

(29) Each of the above-described devices is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each device to achieve the functions. The computer program mentioned above is composed of a plurality of instruction codes which each instructs the computer to achieve a predetermined function.

(30) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip.

It should be noted here that although the term LSI is used here, it may be called IC, system LSI, super LSI, ultra LSI or the like, depending on the level of integration. Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(31) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(32) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(33) The present invention may be any combination of the above-described embodiments and modifications.

1.7 Summary (1) The present invention is achieved as an encryption system comprising: two or more shared information holding devices; and an encryption device that generates a first private key based on shared information received from the shared information holding devices, and stores the generated first private key, each of the shared information holding devices including: a first shared information storage unit storing a first shared information group; a second shared information storage unit storing a second shared information group; and a shared information transmitting unit operable to transmit one or more pieces of shared information included in the first shared information group or the second shared information group to the encryption device, wherein the first shared information group includes one or more pieces of shared information selected from k pieces of shared information that are used to generate the first private key, "k" being an integer of 2 or higher, the second shared information group includes one or more pieces of shared information selected from k pieces of shared information, excluding the shared information of the own device included in the first shared information group, and a same piece of shared information as the shared information of the own device included in the first shared information group is included in any second shared information group other than the second shared information group of the own device, and a sum of values of shared information included in the first shared information group of each shared information holding device is equivalent with a sum of values of the k pieces of shared information, the encryption device including: a shared information receiving unit operable to receive one or more pieces of shared information included in the first shared information group or the second shared information group from the one or more shared information holding devices; a shared information storage unit operable to store the one or more pieces of shared information received by the shared information receiving unit; a private key generating unit operable to generate a restored private key by using the one or more pieces of shared information when a sum of the received one or more pieces of shared information is equivalent with the k pieces of shared information; and a private key storage unit operable to store the restored private key as the first private key.

The above-described structure enables a plurality of shared information holding devices to hold shared information in common.

This makes it possible to detect a shared information holding device that operates in an unauthentic manner.

(2) In the encryption system of (1) above, the encryption device may further include: an authenticator storage unit for storing an authenticator used to verify whether or not the first private key is authentic; and a private key verifying unit operable to verify whether or not the restored private key is authentic by using the authenticator, wherein the private key storage unit stores, as the first private key, the restored private key generated by the private key generating unit when the private key verifying unit verifies that the restored private key is authentic.

With the above-described structure, it is possible to verify whether or not the restored private key has been generated correctly, and verify whether or not correct shared information have been received from the shared information holding devices.

(3) In the encryption system of (2) above, the shared information holding device may further include: an authenticator storage unit for storing the authenticator; and an authenticator transmitting unit operable to transmit the authenticator to the encryption device, and the encryption device may further include an authenticator receiving unit operable to receive the authenticator and store the received authenticator into the authenticator storage unit.

With the above-described structure, the shared information holding devices can hold the authenticator, and the encryption device does not need to hold, until the security of the certificate authority system is destroyed, shared information or the authenticator that are required for the restoration.

(4) In the encryption system of (2) or (3) above, the authenticator may be a hash value that is obtained by applying a hash function to the first private key, and the private key verifying unit may include: a verification information generating unit operable to generate, as verification information, a hash value by applying the hash function to the restored private key; and a verifying unit operable to verify whether or not a value of the authenticator matches a value of the verification information.

With the above-described structure, the hash value of the private key can be used as the authenticator, and it is possible to verify whether or not the restored private key has been generated correctly by calculating the hash value of the restored private key and comparing the calculated hash value with the authenticator.

(5) In the encryption system of (2) or (3) above, the authenticator may be a public key corresponding to the first private key, and the private key verifying unit may include a verifying unit operable to verify whether or not the restored private key and the authenticator constitute a pair of keys complying with the public key encryption.

With the above-described structure, the public key can be used as the authenticator, and it is possible to verify whether or not the restored private key has been generated correctly by verifying the restored private key and the authenticator constitute a pair of keys complying with the public key encryption.

(6) In the encryption system of (2) or (3) above, the authenticator may be a public key corresponding to the first private key, and the private key verifying unit may include: a verification information generating unit operable to generate, as verification information, a verification certificate by using the restored private key; and a verifying unit operable to verify the verification certificate by using the authenticator.

With the above-described structure, the public key can be used as the authenticator, and it is possible to verify whether or not the restored private key has been generated correctly by generating the verification certificate by using the restored private key, verifying the verification certificate by using the public key being the authenticator.

(7) In the encryption system of (2) or (3) above, the authenticator may be a hash value that is obtained by applying a hash function to information generated by concatenating the k pieces of shared information for generating the first private key, and the private key verifying unit may include: a verification information generating unit operable to generate, as verification information, a hash value by applying the hash function to information generated by concatenating the k pieces of shared information; and a verifying unit operable to verify whether or not a value of the authenticator matches a value of the verification information.

With the above-described structure, the hash value generated from the shared information can be used as the authenticator, and it is possible to verify whether or not the shared information from which the restored private key was generated is an authentic piece of shared information.

(8) In the encryption system of one of (2) through (7) above, the shared information receiving unit may attach transmitter identification information to each received piece of shared information, the transmitter identification information identifying shared information holding devices which transmitted each received piece of shared information, and the encryption device may further include an unauthentic device identifying unit operable to, when the private key verifying unit judges that the restored private key is not authentic, identify a shared information holding device that transmitted an unauthentic piece of shared information, by using the shared information, the transmitter identification information, and the authenticator.

With the above-described structure, when the restored private key has not been restored correctly, the unauthentic device identifying unit can identify a shared information holding device that transmitted an unauthentic piece of shared information, and the encryption device excludes the identified unauthentic device, and obtains a correct restored private key.

(9) In the encryption system of (8) above, the shared information included in the first shared information group and the second shared information group further includes identification information for identifying a shared information holding device that includes the shared information in the first shared information group, and the unauthentic device identifying unit includes: a shared information classifying unit operable to classify one or more pieces of shared information, which are included in the first shared information group and the second shared information group held by a first through an $r^{th}$ shared information holding devices being the two or more shared information holding devices, into same identification shared information groups by using the identification information, and further classify the shared information included in each same identification shared information group into groups for each value; a combination generating unit operable to generate all combinations for selecting one group from each same identification shared information group; and an identifying unit operable to cause the private key generating unit to generate the restored private key by using shared information included in groups selected by each of the generated combinations, cause the private key verifying unit to verify the restored private key by using the restored private key, search for a combination for generating the restored private key that passes the verification, attach verification passed identification information to a group selected by the combination, the verification passed identification information indicating that the verification was passed, and identify a shared information holding device from the transmitter identification information of the shared information included in a group which is not attached with the verification passed identification information.

(10) In the encryption system of (1) above, one or more shared information holding devices are to withdraw from a first through an $r^{th}$ shared information holding devices being the two or more shared information holding devices, and when the $r^{th}$ shared information holding device is to withdraw, a sum of values of the k pieces of shared information is the first private key, and a first shared information holding device, which includes the shared information identified as the same as the shared information included in the first shared information group of the $r^{th}$ shared information holding device, further includes: a shared information dividing unit operable to divide the shared information included in the second shared information group, which is identified as the same as the shared information included in the first shared information group of the $r^{th}$ shared information holding device, into two or more pieces of partial information; and a partial information transmitting unit operable to transmit each of the divided pieces of partial information to any shared information holding devices other than the $r^{th}$ shared information holding device, wherein each of the shared information holding devices other than the first and the $r^{th}$ shared information holding devices further includes a partial information receiving unit operable to receive one or more pieces of partial information from the shared information holding device, and each of shared information holding devices other than the $r^{th}$ shared information holding device further includes a first shared information updating unit operable to update at least one piece of shared information included in the first shared information group or the second shared information group by using the partial information, wherein the first private key is equivalent with a sum of values of the shared information, which includes the updated at least one piece of shared information, included in the first shared information group of the shared information holding devices other than the $r^{th}$ shared information holding device.

With the above-described structure, even when a shared information holding device holding shared information is to withdraw, it is possible to cause the withdrawal-target holding device to withdraw without changing the value of the restored private key restored from the shared information.

(11) In the encryption system of (10) above, the partial information transmitting unit transmits one or more pieces of shared information included in the first shared information group or the second shared information group to shared information holding devices, and each of shared information holding devices other than the $(r-1)^{th}$ shared information holding device further includes a verification partial information transmitting unit operable to transmit the received partial information to the $(r-1)^{th}$ shared information holding device, and the $(r-1)^{th}$ shared information holding device, which includes, in the second shared information group, shared information which is identified as the same as the shared information included in the first shared information group of the $r^{th}$ shared information holding device, further includes: a verification partial information receiving unit operable to receive the one or more pieces of partial information; and a partial information verifying unit operable to verify whether or not a sum of values of the received one or more pieces of partial information matches a sum of values of the shared information included in the first shared information group of the $r^{th}$ shared information holding device included in the second shared information group, and each of shared information holding devices other than the $r^{th}$ shared information holding device further includes: a first shared information verifying unit operable to verify, after one or more pieces of shared information included in the first shared information group are updated, whether or not a value of the updated shared information matches a value of the shared information included in the second shared information group of the shared information holding devices other than the own device which is identified as the same as the updated shared information; and a second shared information verifying unit operable to verify, after one or more pieces of shared information included in the second shared information group are updated, whether or not a value of the updated shared information matches a value of one or more pieces of shared information included in the first or second shared information group of the shared information holding devices other than the own device which is identified as the same as the updated shared information, and each of the first and the $(r-1)^{th}$ shared information holding device further includes: a shared information receiving unit operable to receive the one or more pieces of shared information from two or more shared information holding devices other than the own device; a third shared information verifying unit operable to verify, when a plurality of pieces of shared information received from two or more shared information holding devices other than the own device by the shared information receiving unit are identified as the same as each other, whether or not the received plurality of pieces of shared information are the same as each other; and a second shared information updating unit operable to update one or more pieces of shared information included in the second shared information group by using the shared information that was verified as the same by the shared information verifying unit.

(12) In the encryption system of (1) above, an $(r+1)^{th}$ shared information holding device is to be added to a first through an $r^{th}$ shared information holding devices being the two or more shared information holding devices, and a sum of values of the k pieces of shared information is the first private key, and each of the first and the $r^{th}$ shared information holding devices further includes: a modification information generating unit operable to generated first modification information; a modification information transmitting unit operable to transmit the first modification information to other shared information holding devices; and a first shared information updating unit operable to update one or more pieces of shared information included in the first shared information group by using the first modification information, and each of (i) the second and the $r^{th}$ shared information holding devices which include, in the second shared information group, shared information that is identified as the same as the shared information included in the first shared information group of the first shared information holding device, (ii) the first and the $(r-1)^{th}$ shared information holding devices which include, in the second shared information group, shared information that is identified as the same as the shared information included in the first shared information group of the $r^{th}$ shared information holding device, and (iii) the $(r+1)^{th}$ shared information holding device further includes: a modification information receiving unit operable to receive the first modification information, and each of the first, the second, the $(r-1)^{th}$, and the $r^{th}$ shared information holding devices further includes: a second shared information updating unit operable to update one or more pieces of shared information included in the second shared information group by using the first modification information, and the $(r+1)^{th}$ shared information holding devices further includes: a shared information generating unit operable to generate shared information by using the received first modification information; and a shared information setting unit operable to set the generated shared information into the first shared information storage unit as one or more pieces of shared information included in the first shared information group, and the first private key is equivalent with a sum of values of the shared information, which includes the updated shared information, included in the first shared information group of the shared information holding devices.

With the above-described structure, even when a shared information holding device is to be newly added, it is possible to add the shared information holding device without changing the value of the restored private key restored from the shared information.

(13) In the encryption system of (12) above, the partial information transmitting unit transmits one or more pieces of shared information included in the first shared information group or the second shared information group to shared information holding devices, and each of the first and the $r^{th}$ shared information holding devices further includes: a shared information dividing unit operable to divide one or more pieces of shared information included in the first shared information group of the own device into two or more pieces of partial information; and a partial information transmitting unit operable to transmit each of the divided pieces of partial information to any shared information holding devices other than the own device, and the shared information holding device further includes: a partial information receiving unit operable to receive one or more pieces of partial information; a third shared information updating unit operable to update at least one piece of shared information included in the first shared information group or the second shared information group by using the partial information; a first shared information verifying unit operable to verify, after one or more pieces of shared information included in the first shared information group are updated, whether or not a value of the updated shared information matches a value of one or more pieces of shared information included in the second shared information group of the shared information holding devices other than the own device which is identified as the same as the updated shared information; and a second shared information verifying unit operable to verify, after one or more pieces of shared information included in the second shared information group are updated, whether or not a value of the updated shared information matches a value of one or more pieces of shared information included in the first or second shared information group of the shared information holding devices other than the own device which is identified as the same as the updated shared information, and the $(r+1)^{th}$ shared information holding device further includes: a third shared information verifying unit operable to verify, when a plurality of pieces of shared information received from two or more shared information holding devices other than the own device by the shared information receiving unit are identified as the same as each other, whether or not the received plurality of pieces of shared information are the same as each other; and a fourth shared information updating unit operable to update one or more pieces of shared information included in the second shared information group by using the shared information that was verified as the same by the second shared information verifying unit.

(14) In the encryption system of (1) above, the encryption device may further include: an encryption processing unit operable to perform an encryption process by using the second private key; and a private key switching unit operable to, when the second private key is revoked, switch the second private key stored in the private key storage unit to the restored private key generated by the private key generating unit.

With the above-described structure, it is possible to switch the private key used by the encryption device to the restored private key. By preliminarily generating shared information from a private key that is different from the private key used by the encryption device, even if the security of the encryption system is destroyed, the system can be restored by using the private key that is different from the previous private key.

(15) The encryption system of (1) above may further comprise a key distribution device for distributing the shared information or the authenticator to the shared information holding devices or the encryption device, and the key distribution device includes: a key generating unit operable to generate the first private key; a private key dividing unit operable to generate k pieces of shared information that are used to generate the first private key, "k" being an integer of 2 or higher; a shared information distributing unit operable to distribute one or more pieces of shared information selected from the k pieces of shared information to each of the shared information holding devices as the shared information included in the first shared information group of the shared information holding device, and distribute one or more pieces of shared information selected from shared information other than the selected pieces of shared information as the shared information included in the second shared information group of the shared information holding device; an authenticator generating unit operable to generate an authenticator used for verifying whether or not the generated private key is authentic; an authenticator distributing unit operable to distribute the authenticator to the shared information holding device or the encryption device; and a key deleting unit operable to delete the first private key and the k pieces of shared information, wherein the shared information distributing unit distributes the shared information so that a sum of values of shared information included in the first shared information group of the shared information holding devices is equivalent with a sum of values of the k pieces of shared information.

(16) The present invention is also achieved as an encryption system comprising: two or more shared information holding devices; and an encryption device that, when a second private key it holds is revoked, switches the second private key to a first private key generated based on shared information received from the shared information holding devices, each of the shared information holding devices including: a first shared information storage unit storing a first shared information group; and a shared information transmitting unit operable to transmit one or more pieces of shared information included in the first shared information group to the encryption device, wherein the first shared information group includes one or more pieces of shared information selected from k pieces of shared information that are used to generate the first private key, "k" being an integer of 2 or higher, and a sum of values of shared information included in the first shared information group of each shared information holding device is equivalent with a sum of values of the k pieces of shared information, the encryption device including: a private key storage unit storing a second private key; an encryption processing unit operable to perform an encryption process by using the first or second private key; a shared information receiving unit operable to receive one or more pieces of shared information from one or more shared information holding devices; a shared information storage unit operable to store the one or more pieces of shared information received by the shared information receiving unit; a private key generating unit operable to generate, as the first private key, a restored private key by using the shared information when a sum of the received one or more pieces of shared information is equivalent with a sum of the k pieces of shared information; and a private key switching unit operable to, when the second private key is revoked, switch the second private key stored in the private key storage unit to the restored private key generated by the private key generating unit.

(17) The encryption system of (16) above may further comprise a key distribution device for distributing the shared information to the shared information holding devices, and the key distribution device includes: a key generating unit operable to generate the first private key; a private key dividing unit operable to generate k pieces of shared information that are used to generate the first private key, "k" being an integer of 2 or higher; a shared information distributing unit operable to distribute one or more pieces of shared information selected from the k pieces of shared information to each of the shared information holding devices as the shared information included in the first shared information group of the shared information holding device; and a key deleting unit operable to delete the first private key and the generated shared information, wherein the shared information distributing unit distributes the shared information so that a sum of values of shared information included in the first shared information group of the shared information holding devices is equivalent with a sum of values of the k pieces of shared information.

(18) In the encryption system of (1) or (16) above, the encryption device may further include a certificate issuing unit operable to issue a certificate by using the private key stored in the private key storage unit.

INDUSTRIAL APPLICABILITY

In the certificate authority system of the present invention, a plurality of shared information holding devices have shared information in common. This structure makes it possible to detect an unauthentic operation performed by one of the shared information holding devices.

The present invention can be used continuously and repetitively on a business basis in industries for manufacturing and selling the certificate authority device, shared information holding device, and key distribution device.

The invention claimed is:

1. A holding device being an $i^{th}$ holding device among n holding devices to which n pieces of shared information, a first through an $n^{th}$ pieces of shared information, have been assigned on a one-to-one basis, an $i^{th}$ piece of shared information having been assigned to the $i^{th}$ holding device, the n pieces of shared information having been generated by segmentation of one piece of private information, "i" being an integer in a range from 1 to n, the $i^{th}$ holding device comprising:
a storage unit;
a first writing unit operable to obtain the $i^{th}$ piece of shared information having been assigned to the $i^{th}$ holding device, and write the $i^{th}$ piece of shared information into the storage unit;
an obtaining unit operable to obtain one or more pieces of shared information having been assigned to one or more holding devices that are different from the $i^{th}$ holding device, the one or more pieces of shared information being different from the $i^{th}$ piece of shared information in ordinal position among the n pieces of shared information; and
a second writing unit operable to write the obtained one or more pieces of shared information into the storage unit, wherein a first through an $n^{th}$ holding devices have been associated with n nodes that have been virtually arranged to form one or more closed paths,
the obtaining unit obtains an $(i-1)^{th}$ and an $(i+1)^{th}$ pieces of shared information having been assigned to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device,
a node is to be newly added adjacent to the $i^{th}$ node associated with the $i^{th}$ holding device in the same closed path, and an additional holding device is to be associated with the newly added node, and
the $i^{th}$ holding device further comprises:
a receiving unit operable to receive a notification that the additional holding device is to be added;
a reading unit operable to, after the receiving unit receives the notification, read out an $i^{th}$ piece of shared information having been assigned to the $i^{th}$ holding device from the storage unit;
a generating unit operable to generate additional partial information;
a calculating unit operable to perform a calculation onto the read-out $i^{th}$ piece of shared information by using the generated additional partial information, and write a result of the calculation into the storage unit as a new $i^{th}$ piece of shared information to replace the read-out $i^{th}$ piece of shared information; and
an output unit operable to output the generated additional partial information to the additional holding device.

2. The holding device of claim 1, wherein
the calculating unit obtains the result of the calculation by subtracting the additional partial information from the read-out $i^{th}$ piece of shared information by a predetermined method.

3. The holding device of claim 1, wherein
in the $i^{th}$ holding device,
the output unit further outputs the generated additional partial information to one or more other holding devices that hold the $i^{th}$ piece of shared information having been assigned to the $i^{th}$ holding device.

4. The holding device of claim 1, wherein
the receiving unit further receives second additional partial information from the $(i-1)^{th}$ or the $(i+1)^{th}$ holding device, the $(i-1)^{th}$ and the $(i+1)^{th}$ holding devices having been respectively associated with the $(i-1)^{th}$ and the $(i+1)^{th}$ nodes that are adjacent to the newly added node, and
the calculating unit further generates additional shared information to be assigned to the additional holding device by performing a calculation onto the additional partial information generated by the generating unit and the second additional partial information received by the receiving unit, and writes the generated additional shared information into the storage unit as shared information assigned to the additional holding device to replace the $(i-1)^{th}$ or the $(i+1)^{th}$ piece of shared information, the $(i-1)^{th}$ and the $(i+1)^{th}$ pieces of shared information having been respectively assigned to the $(i-1)^{th}$ and the $(i+1)^{th}$ holding devices which have been associated with the $(i-1)^{th}$ and the $(i+1)^{th}$ nodes that are adjacent to the $i^{th}$ node associated with the $i^{th}$ holding device before the addition of the additional holding device.

5. The holding device of claim 4, wherein
the calculating unit obtains the additional shared information by adding the additional partial information and the second partial information by a predetermined method.

6. The holding device of claim 1, wherein
the reading unit further reads out a new $i^{th}$ piece of shared information having been newly assigned to the $i^{th}$ holding device from the storage unit;
the calculating unit further segments the read-out new $i^{th}$ piece of shared information into (n+1) pieces of partial shared information,
the output unit further outputs, in accordance with a predetermined assignment rule, the (n+1) pieces of partial shared information to other holding devices being holding devices that remain after excluding the $i^{th}$ holding device from (n+1) holding devices that include the additional holding device, and
the predetermined assignment rule is that a plurality of pieces of partial shared information should be assigned on a one-to-one basis to a plurality of pieces of shared information held by the other holding devices except for the $i^{th}$ piece of shared information, and all of the plurality of pieces of partial shared information should be assigned to the $i^{th}$ piece of shared information.

7. A holding device being an $i^{th}$ holding device among n holding devices to which n pieces of shared information, a first through an $n^{th}$ pieces of shared information, have been assigned on a one-to-one basis, an $i^{th}$ piece of shared information having been assigned to the $i^{th}$ holding device, the n pieces of shared information having been generated by segmentation of one piece of private information, "i" being an integer in a range from 1 to n,
the $i^{th}$ holding device comprising:
a storage unit;
a first writing unit operable to obtain the $i^{th}$ piece of shared information having been assigned to the $i^{th}$ holding device, and write the $i^{th}$ piece of shared information into the storage unit;
an obtaining unit operable to obtain one or more pieces of shared information having been assigned to one or more holding devices that are different from the $i^{th}$ holding device, the one or more pieces of shared information being different from the $i^{th}$ piece of shared information in ordinal position among the n pieces of shared information; and
a second writing unit operable to write the obtained one or more pieces of shared information into the storage unit, wherein
a first through an $n^{th}$ holding devices have been associated with n nodes that have been virtually arranged to form one or more closed paths,
the obtaining unit obtains an $(i-1)^{th}$ and an $(i+1)^{th}$ pieces of shared information having been assigned to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device,
a node is to be newly added adjacent to the $(i-1)^{th}$ or the $(i+1)^{th}$ node in the same closed path, the $(i-1)^{th}$ and the $(i+1)^{th}$ nodes being adjacent to the $i^{th}$ node associated with the $i^{th}$ holding device, and an additional holding device is to be associated with the newly added node, and
the $i^{th}$ holding device further comprises:
a receiving unit operable to receive additional partial information from the $(i-1)^{th}$ or the $(i+1)^{th}$ holding device that is associated with the $(i-1)^{th}$ or the $(i+1)^{th}$ that is adjacent to the newly added node;
a reading unit operable to read out, from the storage unit, the $(i-1)^{th}$ or the $(i+1)^{th}$ piece of shared information assigned to the $(i-1)^{th}$ or the $(i+1)^{th}$ holding device from which the additional partial information was received; and
a calculating unit operable to perform a calculation onto the read-out $(i-1)^{th}$ or $(i+1)^{th}$ piece of shared information by using the received additional partial information, and write a result of the calculation into the storage unit as a new $(i-1)^{th}$ or $(i+1)^{th}$ piece of shared information assigned to the $(i-1)^{th}$ or the $(i+1)^{th}$ holding device, to replace the read-out $(i-1)^{th}$ or $(i+1)^{th}$ piece of shared information.

8. The holding device of claim 7, wherein
the receiving unit further receives, from an adjacent holding device that is a holding device associated with a node adjacent to the newly added node, one or more pieces of partial shared information that are to be assigned to the $(i-1)^{th}$ through the $(i+1)^{th}$ pieces of shared information stored in the storage unit, and
the calculating unit further performs a calculation onto the $(i-1)^{th}$ through the $(i+1)^{th}$ pieces of shared information stored in the storage unit by using the received one or more pieces of partial shared information, and writes a result of the calculation into the storage unit as new $(i-1)^{th}$ through $(i+1)^{th}$ pieces of shared information, wherein
the received one or more pieces of partial shared information have been generated by segmentation of a piece of shared information having been assigned to the adjacent holding device.

9. A holding method for use in a holding device being an $i^{th}$ holding device among n holding devices to which n pieces of shared information, a first through an $n^{th}$ pieces of shared information, have been assigned on a one-to-one basis, an $i^{th}$ piece of shared information having been assigned to the $i^{th}$ holding device, the n pieces of shared information having been generated by segmentation of one piece of private information, "i" being an integer in a range from 1 to n,
the $i^{th}$ holding device including a storage unit,
the holding method comprising the steps of:
obtaining the $i^{th}$ piece of shared information having been assigned to the $i^{th}$ holding device, and writing the $i^{th}$ piece of shared information into the storage unit;
obtaining one or more pieces of shared information having been assigned to one or more holding devices that are different from the $i^{th}$ holding device, the one or more pieces of shared information being different from the $i^{th}$ piece of shared information in ordinal position among the n pieces of shared information; and
writing the obtained one or more pieces of shared information into the storage unit, wherein
a first through an $n^{th}$ holding devices have been associated with n nodes that have been virtually arranged to form one or more closed paths, and
the holding method further comprises the steps of:
obtaining an $(i-1)^{th}$ and an $(i+1)^{th}$ pieces of shared information having been assigned to an $(i-1)^{th}$ and an $(i+1)^{th}$ holding devices which have respectively been associated with an $(i-1)^{th}$ and an $(i+1)^{th}$ nodes that are adjacent, in a same closed path, to an $i^{th}$ node associated with the $i^{th}$ holding device;
receiving a segmentation instruction when either the $(i-1)^{th}$ or the $(i+1)^{th}$ holding device is a withdrawal-target holding device that is to withdraw from a group composed of the first through the $n^{th}$ holding devices;

reading out, after the segmentation instruction is received, either the $(i-1)^{th}$ or the $(i+1)^{th}$ piece of shared information assigned to the withdrawal-target holding device from the storage unit;

segmenting the read-out $(i-1)^{th}$ or $(i+1)^{th}$ piece of shared information into $(n-1)$ pieces of partial shared information; and outputting the $(n-1)$ pieces of partial shared information to $(n-2)$ holding devices, which are remaining holding devices after the $i^{th}$ holding device and the withdrawal target holding device are excluded, such that a plurality of pieces of partial shared information are assigned to a plurality of pieces of shared information held by the $(n-2)$ holding devices that are arranged at same ordinal positions as the plurality of pieces of partial shared information.

* * * * *